(12) United States Patent
Monroe

(10) Patent No.: US 6,970,183 B1
(45) Date of Patent: Nov. 29, 2005

(54) MULTIMEDIA SURVEILLANCE AND MONITORING SYSTEM INCLUDING NETWORK CONFIGURATION

(75) Inventor: David A. Monroe, San Antonio, TX (US)

(73) Assignee: E-Watch, Inc., San Antonio, TX (US)

( * ) Notice: Subject to any disclaimer, the term of this patent is extended or adjusted under 35 U.S.C. 154(b) by 870 days.

(21) Appl. No.: 09/594,041

(22) Filed: Jun. 14, 2000

(51) Int. Cl.$^7$ ............................................. H04N 7/18
(52) U.S. Cl. ..................................... 348/143; 348/155
(58) Field of Search ......... 348/143–160; 725/102–110

(56) References Cited

U.S. PATENT DOCUMENTS

| | | | | |
|---|---|---|---|---|
| 5,091,780 A | * | 2/1992 | Pomerleau ................... | 348/152 |
| 5,666,157 A | * | 9/1997 | Aviv ........................... | 348/152 |
| 6,424,370 B1 | * | 7/2002 | Courtney .................... | 348/143 |
| 6,504,479 B1 | * | 1/2003 | Lemons et al. ............. | 340/541 |
| 6,628,835 B1 | * | 9/2003 | Brill et al. .................. | 382/226 |
| 6,646,676 B1 | * | 11/2003 | DaGraca et al. ............ | 348/155 |

* cited by examiner

*Primary Examiner*—Andy Rao
(74) *Attorney, Agent, or Firm*—Robert C. Curfiss

(57) ABSTRACT

A comprehensive, wireless multimedia surveillance and monitoring system provides a combination of megapixel digital camera capability with full motion video surveillance with a network, including network components and appliances such as wiring, workstations, and servers with the option of geographical distribution with various wide area carriers. The full service, multi-media surveillance system is capable of a wide range of monitoring techniques utilizing digital network architecture and is adapted for transmitting event data, video and/or image monitoring information, audio signals and other sensor and detector data over significant distances using digital data transmission over a LAN, wireless LAN, Intranet or Internet for automatic assessment and response including dispatch of response personnel. Both wired and wireless appliance and sensor systems may be employed. GPS dispatching is used to locate and alert personnel as well as to indicate the location of an event. Automatic mapping and dispatch permits rapid response. The wireless LAN connectivity permits local distribution of audio, video and image data over a relatively high bandwidth without requirement of a license and without relying on a common carrier and the fees associated therewith. The surveillance system may be interfaced with a WAN (wide area Network) or the Internet for providing a worldwide, low cost surveillance system with virtually unlimited geographic application. Centralized monitoring stations have access to all of the surveillance data from various remote locations via the Internet or the WAN. A server provides a centralized location for data collection, alarm detection and processing, access control, dispatch processing, logging functions and other specialized functions. The server may be inserted virtually anywhere in the Intranet/Internet network. The topology of the network will be established by the geographic situation of the installation. Appropriate firewalls may be set up as desired. The server based system permits a security provider to have access to the appliance and sensor and surveillance data or to configure or reconfigure the system for any station on the network.

34 Claims, 77 Drawing Sheets

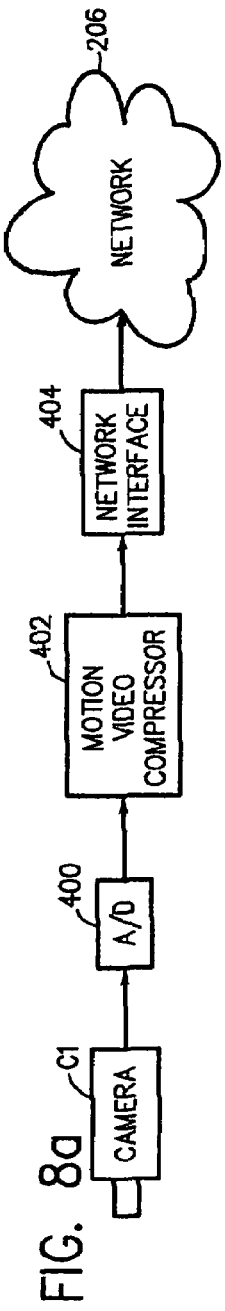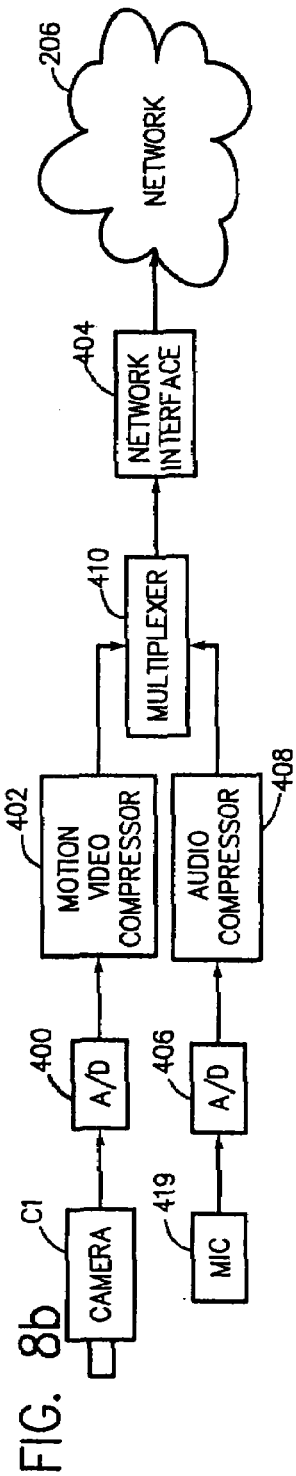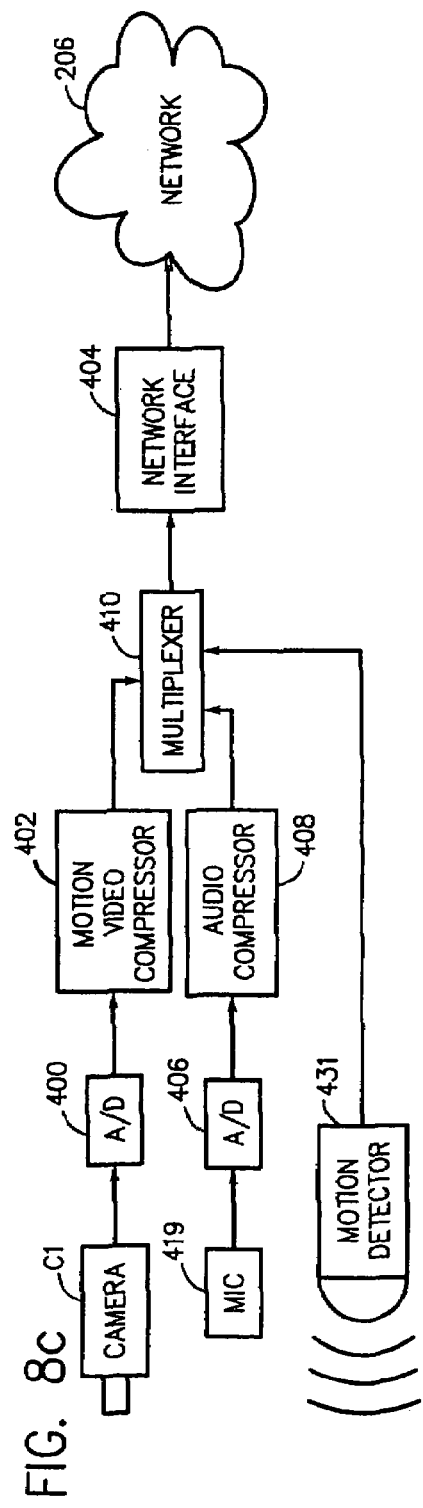

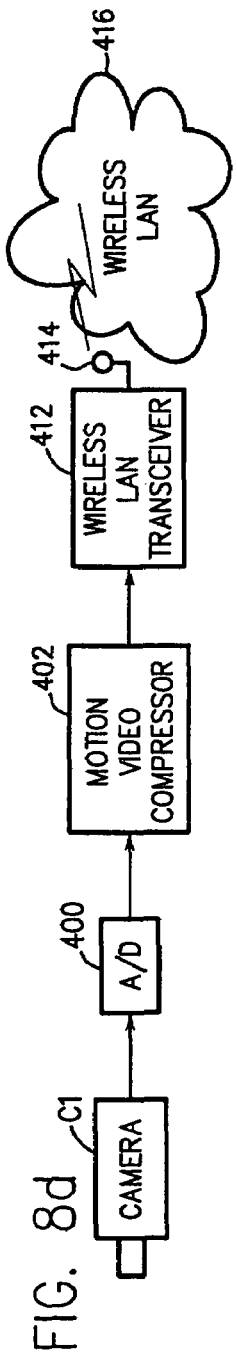
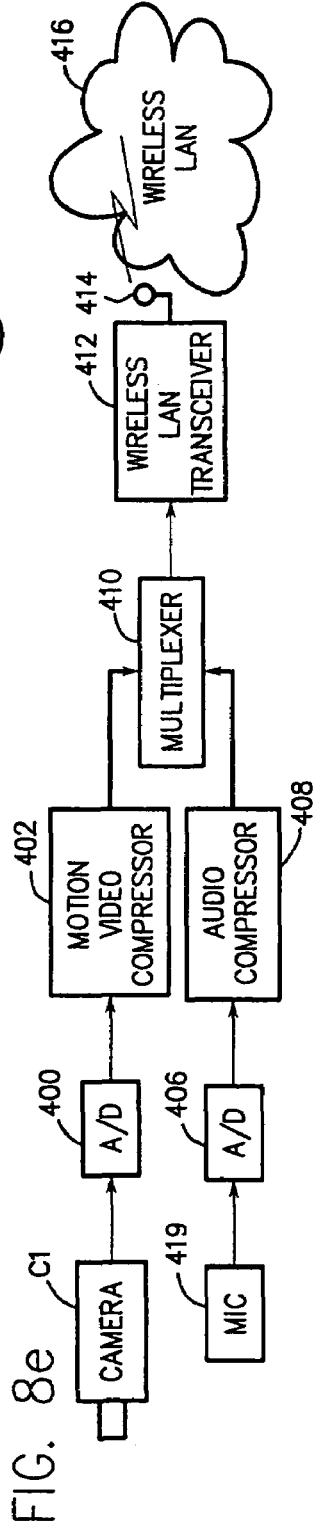
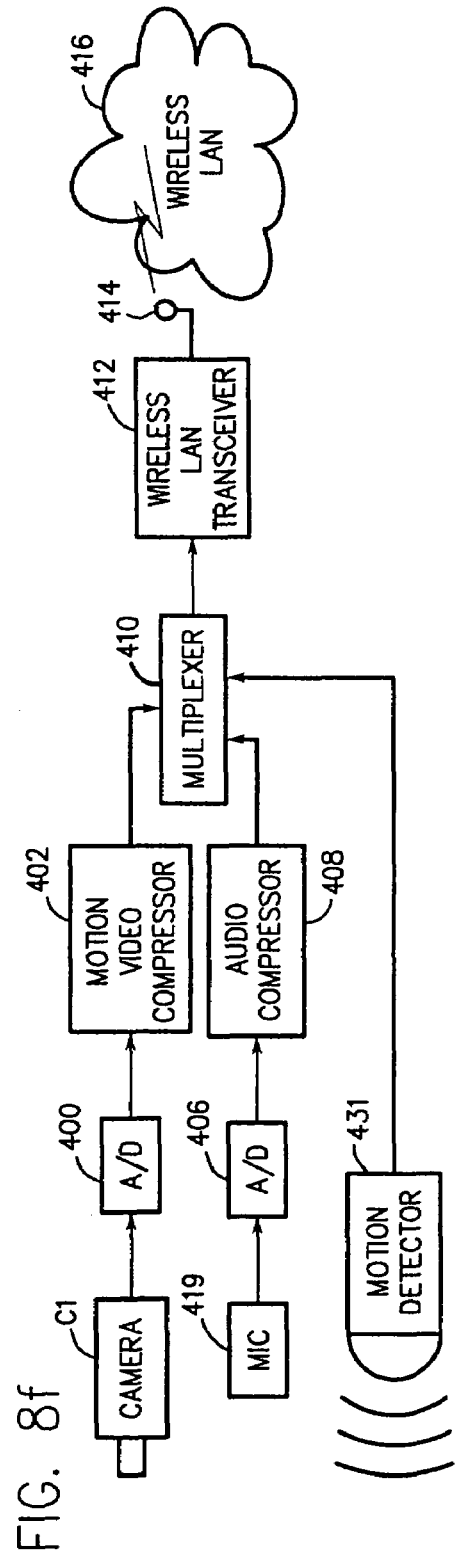

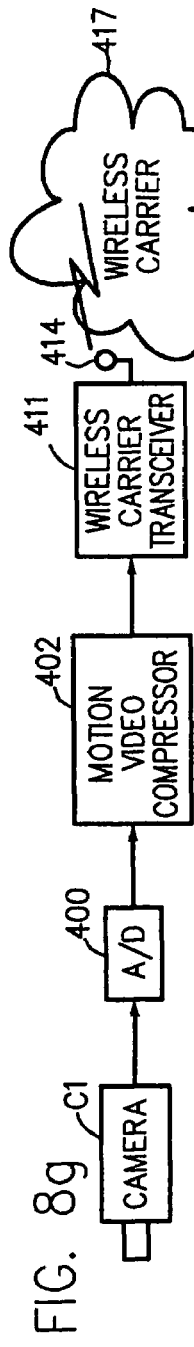
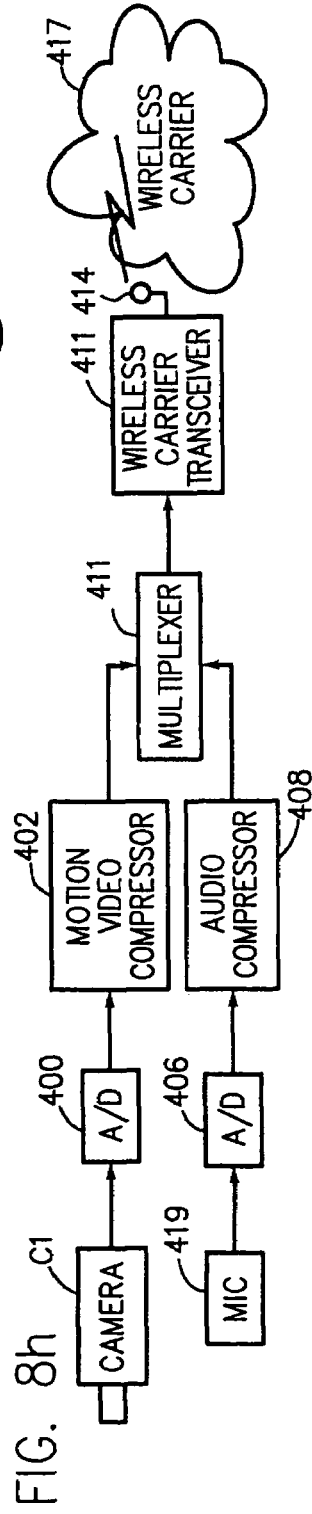
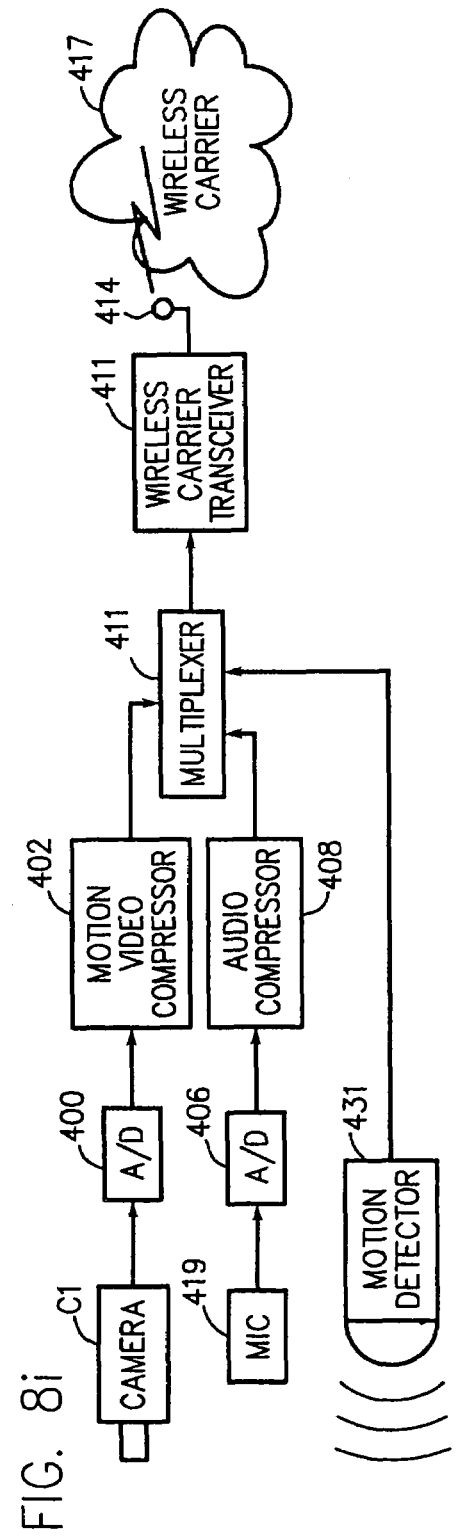
FIG. 8g
FIG. 8h
FIG. 8i

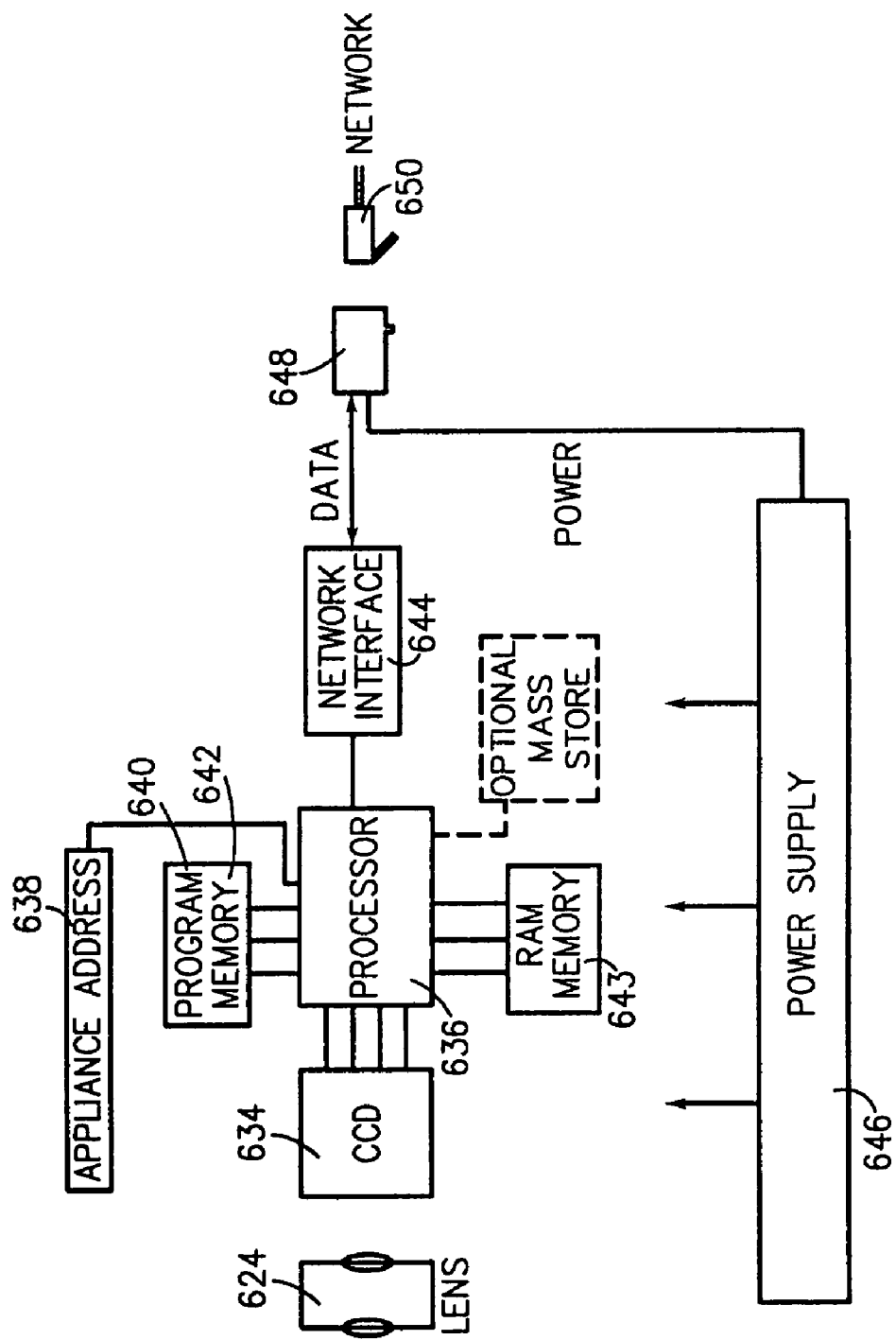

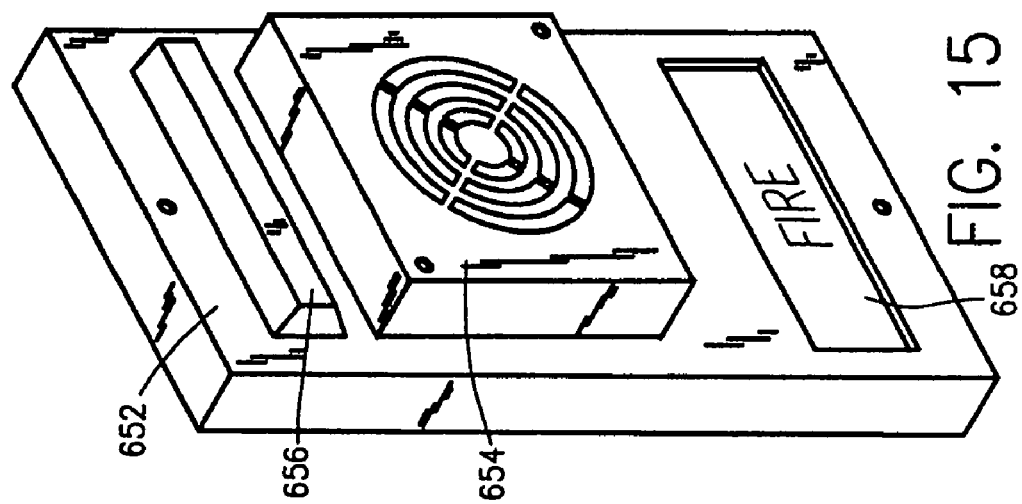

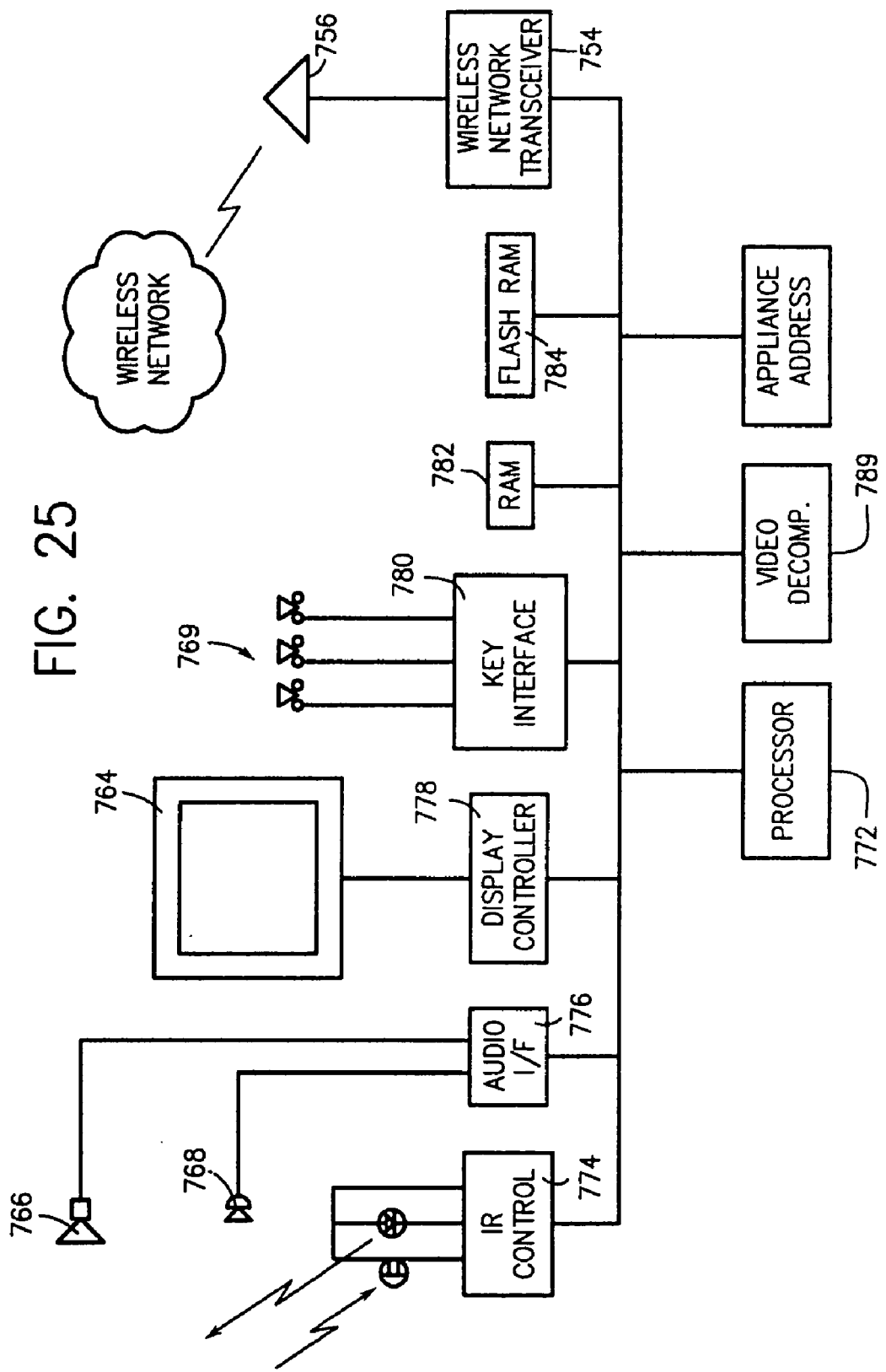

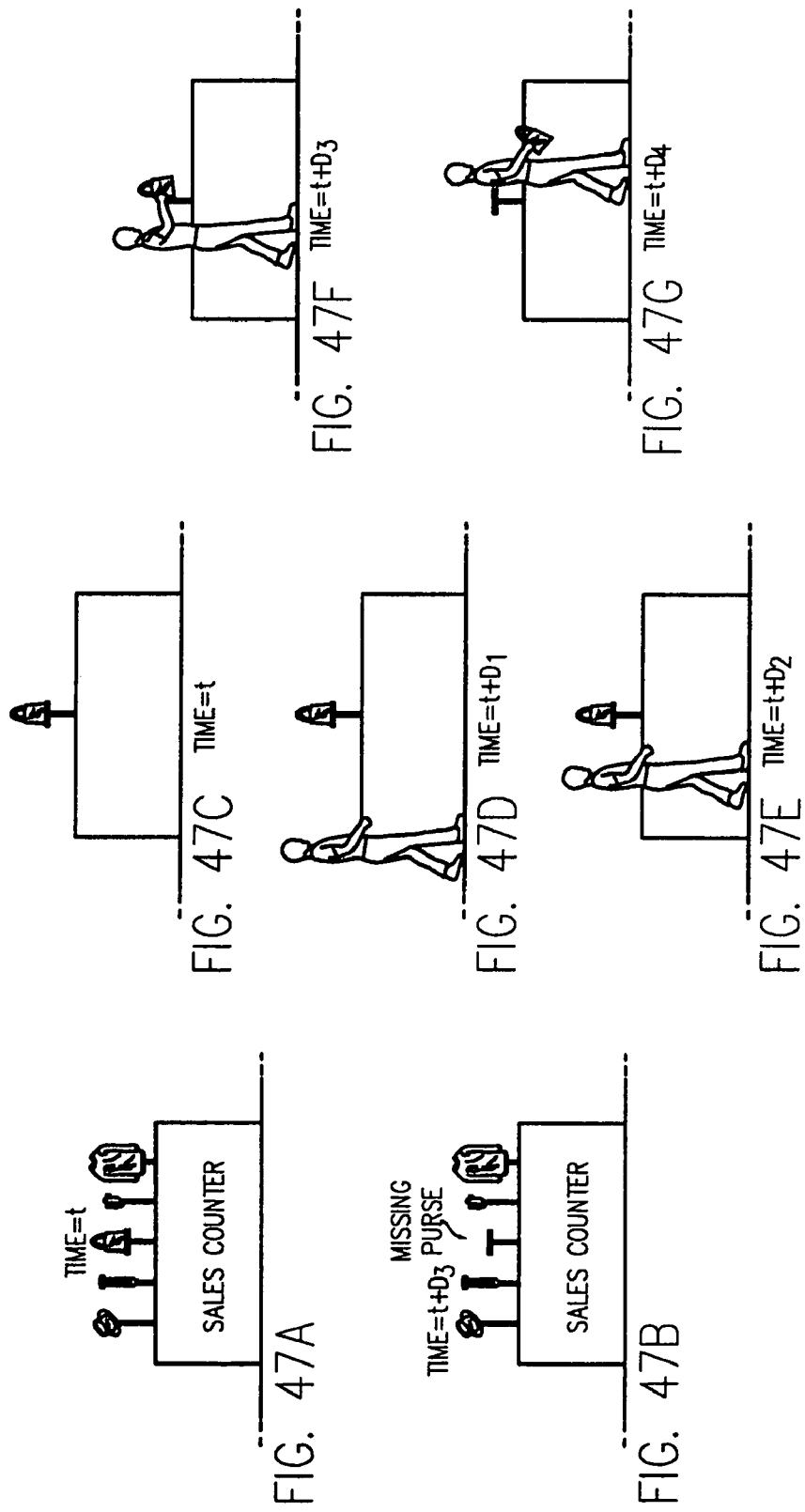

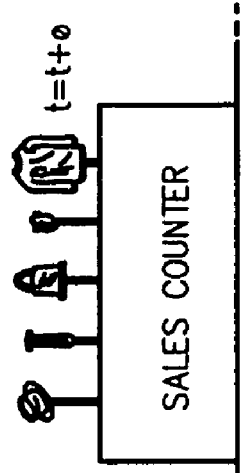
FIG. 47J
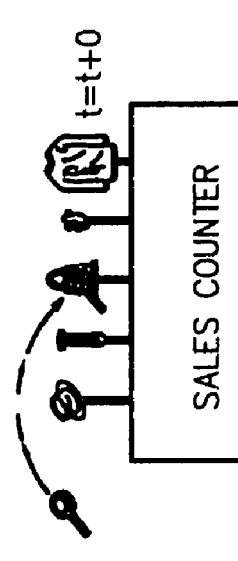
FIG. 47K
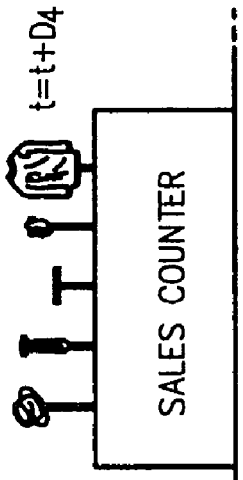
FIG. 47L
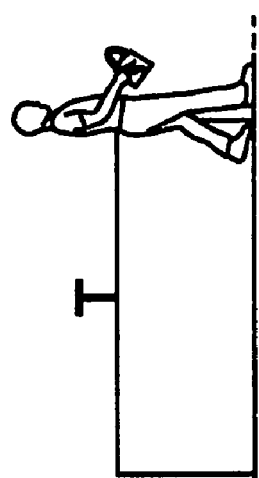
FIG. 47H  TIME=t+D$_5$
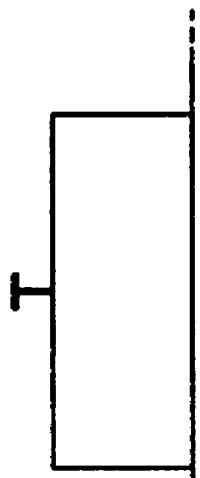
FIG. 47I  TIME=t+D$_6$

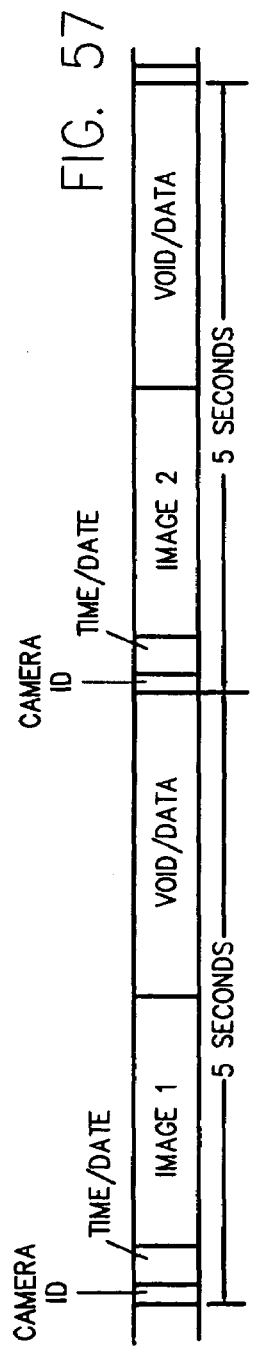
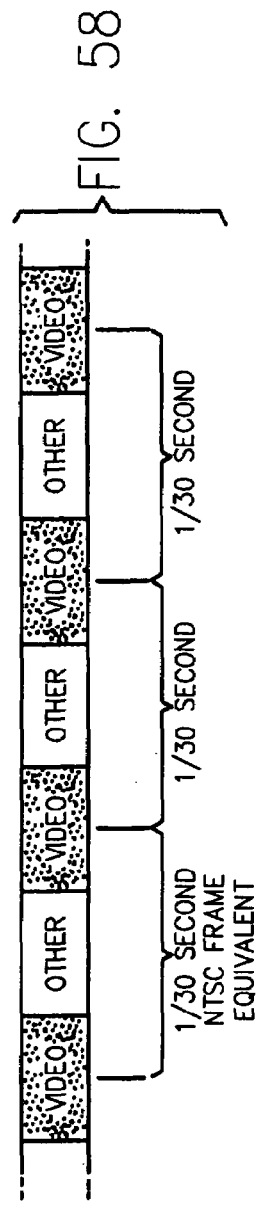
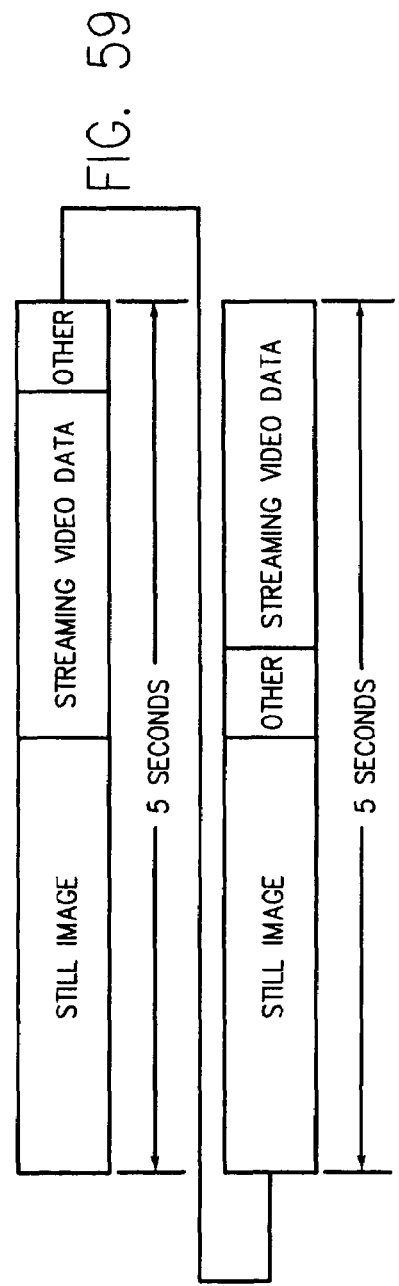

MULTIMEDIA SURVEILLANCE AND MONITORING SYSTEM INCLUDING NETWORK CONFIGURATION

BACKGROUND OF THE INVENTION

1. Field of the Invention

The subject invention is directed to surveillance and monitoring systems and is specifically directed to a comprehensive, hybrid multimedia surveillance system based on wireless data transmission, still image and/or step video, video streaming, audio, motion detection, event detection and/or physical condition detection using various network configurations including both wired and wireless Local Area Network (LAN) and Wide Area Network (WAN) communications and network communication techniques and methods with IP compatibility for communication over the Internet.

2. Discussion of the Prior Art

Video monitoring and surveillance of locations or areas for security, safety monitoring, asset protection, process control, and other such applications by use of closed circuit television and similar systems have been in widespread use for many years. The cost of these systems has come down significantly in recent years as the camera and monitor components have steadily dropped in cost while increasing in quality. As a result, these systems have proliferated in their application and are proving extremely useful for both commercial and residential applications.

These "closed circuit television" systems typically consist of a monochrome or color television camera, a coaxial cable, and a corresponding monochrome or color video monitor, optional VCR recording devices, and power sources for the cameras and monitors. The interconnection of the camera and monitor is typically accomplished by the use of coaxial cable, which is capable of carrying the 2 to 10 megahertz bandwidths of closed circuit television systems. There are several limitations to coaxial cable supported systems. First, the cable attenuates by the signal in proportion to the distance traveled. Long distance video transmission on coaxial cable requires expensive transmission techniques. Second, both the cable, per se, and the installation is expensive. Both of these limitations limit practical use of coaxial closed circuit systems to installations requiring less than a few thousand feet of cable. Third, when the cable cannot be concealed is not only unsightly, but is also subject to tampering and vandalism.

Other hardwired systems have been used, such as fiber optic cable and the like, but have not been widely accepted primarily due to the higher costs associated with such systems over coaxial cable. Coaxial cable, with all of its limitations, remains the system of choice to the present day. Also available are techniques using less expensive and common twisted pair cable such as that commonly used for distribution of audio signals such as in telephone or office intercom applications. This cable is often referred to as UTP (twisted pair) or STP (shielded twisted pair) cable. Both analog and digital configurations are available. Both analog and digital techniques have been implemented. This general style of twisted pair cable is also widely used in Local Area Networks, or LAN's, such as the 10Base-T Ethernet system, 100 Base-T, 1000 Base-T and later systems. Newer types of twisted pair cable have been developed that have lower capacitance and more consistent impedance than the early telephone wire. These newer types of cable, such as "Category 5" wire, are better suited for higher bandwidth signal transmission and are acceptable for closed circuit video applications with suitable interfaces with special interfaces. By way of example, typical audio signals are approximately 3 kilohertz in bandwidth, whereas typical video signals are 3 megahertz in bandwidth or more. Even with the increased bandwidth capability of this twisted pair cable, the video signals at base band (uncompressed) can typically be distributed directly over twisted pair cable only a few hundred feet. In order to distribute video over greater distances, video modems (modulator/demodulators) are inserted between the camera and the twisted pair wiring and again between the twisted pair wiring and the monitor. Twisted pair cable is lower in cost than coaxial cable and is easier to install.

Wireless systems utilizing RF energy are also available. Such systems usually consist of a low power UHF transmitter and antenna system compatible with standard television monitors or receivers tuned to unused UHF channels. The FCC allows use of this type of system without a license for very low power levels in the range of tens of milliwatts. This type of system provides an economical link but does not provide transmission over significant distances due to the power constraints placed on the system. The advantage of this system over hardwired systems is primarily the ease of installation. However, the cost is usually much higher per unit, the number of channels is limited and system performance can be greatly affected by building geometry or nearby electrical interference. Further, the video is not as secure as hardwired systems. The video may be picked up by anyone having access to the channel while in range of the transmitter and is thus, easily detected and/or jammed.

Because of the inherent limitations in the various closed circuit television systems now available, other media have been employed to perform security monitoring over wider areas. This is done with the use of CODECs (compressors/decompressors) used to reduce the bandwidth. Examples include sending compressed video over standard voice bandwidth telephone circuits, more sophisticated digital telephonic circuits such as frame relay or ISDN circuits and the like. While commonly available and relatively low in cost, each of these systems is of narrow bandwidth and incapable of carrying "raw" video data such as that produced by a full motion video camera, using rudimentary compression schemes to reduce the amount of data transmitted. As previously discussed, full motion video is typically 2 to 10 megahertz in bandwidth while typical low cost voice data circuits are 3 kilohertz in bandwidth.

There are known techniques for facilitating "full motion" video over common telecommunication circuits. The video teleconferencing (VTC) standards currently in use are: Narrow Band VTC (H.320); Low Bitrate (H.324); ISO-Ethernet (H.322); Ethernet VTC (H.323); ATM VTC (H.321); High Resolution ATM VTC (H.310). Each of these standards has certain advantages and disadvantages depending upon the volume of data, required resolution and costs targets for the system. These are commonly used for video teleconferencing and are being performed at typical rates of 128K, 256K, 384K or 1.544M bit for industrial/commercial use. Internet teleconferencing traditionally is at much lower rates and at a correspondingly lower quality. Internet VTC may be accomplished at 33.6 KBPS over dial-up modems, for example. Video teleconferencing is based on video compression, such as the techniques set forth by CCITT/ISO standards, Internet standards, and Proprietary standards or by MPEG standards. Other, sometimes proprietary, schemes using motion wavelet or motion JPEG compression techniques and the like are also in existence. There are a number of video teleconferencing and video telephone products available for transmitting "full motion" (near real-time)

video over these circuits such as, by way of example, systems available from AT&T and Panasonic. While such devices are useful for their intended purpose, they typically are limited in the amount of data, which may be accumulated and/or transmitted because they do not rely on or have limited compression. There are also devices that transmit "live" or in near real-time over the Internet, such as Quick-Cam2 from Connectix, CU-See-Me and Intel products utilizing the parallel printer port, USB port, ISA, PCI card, or PCMCIA card on a laptop computer. Many of these are personal communications systems and have neither the resolution or refresh rate required or the security required to provide for good surveillance systems. NetMeeting from Microsoft and Proshare software packages from Intel also provide low quality personal image distribution over the Internet.

All of the current low cost Network products have the ability to transmit motion or "live" video. However, such products are limited or difficult, if not impossible, to use for security applications because the resolution and refresh rate (frame rate) of the compressed motion video is necessarily low because of limited resolution of the original sample and the applications of significant levels of video compression to allow use of the low bandwidth circuits. The low resolution of these images will not allow positive identification of persons at any suitable distance from the camera for example. The low resolution would not allow the reading of an automobile tag in another example.

In many security applications it is desirable to monitor an area or a situation with high resolution from a monitor located many miles from the area to be surveyed. As stated, none of the prior art systems readily available accommodates this. Wide band common carriers such as are used in the broadcast of high quality television signals could be used, but the cost of these long distance microwave, fiber or satellite circuits is prohibitive.

SUMMARY OF THE INVENTION

The subject invention provides a combination of megapixel digital camera capability with full motion video surveillance (such as with a CCTV security system) with a network, including network components and appliances such as wiring, workstations, and servers with the option of geographical distribution with various wide area carriers. The subject invention is a full service, multi-media surveillance system capable of a wide range of monitoring techniques utilizing digital network architecture.

Schools, banks, retail operations and other security conscious businesses and institutions have a need for advanced hardware and software solutions that provide total, user friendly control over their surveillance and monitoring equipment. A system desirably provides:
1. Multimedia data collection;
2. Automated control;
3. Archive storage;
4. Enhanced search and recall of archived event recordings;
5. Preset responses to triggers and triggering events;
6. Remote viewing and management from a wide area network including, preferably, World Wide Web (or Internet) accessibility.
7. Automatic system failure analysis.
8. Common infrastructure and workstations shared with other co-located systems.
9. Wireless infrastructure for sensors, monitors and shared applications/systems The subject invention is a comprehensive multimedia surveillance and monitoring system which is adapted for transmitting event data, video clips, high resolution images, audio signals and other sensor and detector data using digital transmission over both wired, wireless and optical networks. Processors on the networks, private Intranets and the Internet are used for automatic event assessment and response to include the dispatch of response personnel. Geolocation systems are used to locate personnel as well as to indicate the location of one or more events. Automatic mapping, dispatch and response vectoring permit rapid response. Additionally, the system can be used to guide at risk personnel away from harmful events. The wireless components permit local distribution of information with relatively high bandwidth without requirement of a license and without relying on a common carrier and associated fees.

Centralized servers and monitoring stations have access to all of the surveillance data from various remote locations via the Internet or wide area network (WAN). One or more servers provide for data collection, data retention, alarm detection and processing, access control, auto response generation, message transmission, dispatch processing, logging functions, configuration management, "cross point switching" of data, scene analysis, scheduled activation and deactivation detection, display data distribution and sequencing, general control and management, fault detection and diagnosis and/or other specialized functions. The server may be inserted virtually anywhere in the network.

The topology of the system is established by the geographic situation of the installation. Appropriate access codes and firewalls may be set up as desired to protect unauthorized access to the system or the collected data. The server permits the implementation of standard Internet tools and techniques such as TCP/IP, HTML and browser support that will allow nearly universal access to the system with proper security access codes. The system permits a security provider to have access to the sensor appliances and/or surveillance data and/or to configure or reconfigure the system form any station on the Internet, such as from a home PC. It will be understood, the network can be the Internet, and the protocol is preferred to be based on Internet-standard protocols such as TCP-IP, RTP, and the like.

In accordance with the teachings of the subject invention, the comprehensive, wireless multimedia surveillance and monitoring system is adapted for transmitting event data, video and/or image monitoring information, audio signals and other Network appliance sensor and detector data over significant distances using digital data transmission over networks such as a local area network (LAN), a wireless LAN (WLAN), a wide area network such as the Internet for other network automatic assessment and response including dispatch of response personnel. Wired, wireless and optical appliances and sensor systems may be employed. GPS and other geolocation technology is used to locate and alert and dispatch personnel as well as to indicate the location of one or more events. Automatic mapping, dispatch and response vectoring permits rapid response. The wireless LAN connectivity permits local distribution of audio, video and image data with relatively high bandwidth without requirement of a license and without relying on a common carrier and the fees associated therewith. The surveillance system may be interfaced with a WAN (wide area network) such as frame relay or the Internet for providing a worldwide, low cost surveillance system with virtually unlimited geographic application. Centralized monitoring stations have access to all of the surveillance data from various remote locations via the network or the WAN. A server provides a centralized location for data collection, alarm detection and processing, access control, auto response generation, paging, automatic e-mail generation, telephone dialing and message transmission, dispatch processing, logging functions, configuration management, and/or other specialized functions. The server may be inserted virtually anywhere in the Intranet/Internet network. Multiple sensors and appliances may be accommodated, as required. The topology of the network will be established by the geographic situation of the specific installation. Appropriate firewalls may be set up as desired to protect unauthorized access to the system or collected data. The server based system permits a security provider to have access to the appliance, related sensor and surveillance data or to configure or reconfigure the system from any station on the Intranet or Internet. The system of the subject invention permits monitoring of locations over great distances with sufficient resolution to provide widespread use as a security surveillance device. The following applications are fully incorporated herein by reference:

| Ser. No. | Filing Date | U.S. Pat. No. |
| --- | --- | --- |
| 09/005,932 | Jan. 12, 1998 | |
| 09/005,931 | Jan. 12, 1998 | |
| 09/350,197 | Jul. 08, 1999 | |
| 09/006,073 | Jan. 12, 1998 | |
| 09/257,765 | Feb. 25, 1999 | |
| 09/257,769 | Feb. 25, 1999 | |
| 08/729,139 | Oct. 11, 1996 | |
| 08/745,536 | Nov. 12, 1996 | 5,798,458 |
| 08/738,487 | Oct. 10, 1996 | 6,009,356 |
| 09/005,893 | Jan. 12, 1998 | |
| 09/257,802 | Feb. 25, 1999 | |
| 09/257,766 | Feb. 25, 1999 | |
| 09/257,767 | Feb. 25, 1999 | |
| 09/257,720 | Feb. 25, 1999 | |

The subject invention is specifically directed to a system that can collect, process and transmit essential information for surveying and monitoring a selected zone or area. The system includes Network appliances such as video and/or image appliances, detectors and sensors as well as audio, condition and/or event monitoring systems. In its preferred form, the comprehensive multi-media safety and surveillance system of the subject invention provides both visual and audio information as well as critical data such as temperature fire and smoke detection. Manually operated transducers, such as panic buttons, door contacts, floor sensors, and the like may also be included to activate the system in the presence of an event at the sensor location, such as a fire alarm or security alarm panic bar or the like. In my aforementioned copending applications, incorporated herein by reference, numerous appliances, including but not limited to detection and sensor systems, are utilized to provide monitoring stations or personnel, such as security personnel, and/or a base monitoring station critical information from the sensor system and to record the information and permit reconstruction of events after the fact. The system of the subject invention permits detection of unexpected events, breach of security, and other activities in the vicinity of any appliance and/or sensor within the system and identifies the time and location of the event for permitting an appropriate response. A GPS or other geolocation system may be included to provide accurate positioning information of the appliances and/or sensors and roving or mobile response units such as security personnel. Steerable video cameras may be incorporated in order to monitor movements in the range of the sensors. The cameras may be activated and directed based on the location data provided by the integral GPS or geolocation system. It is also desirable to include focusing and timing functions so that selective sequencing, zoom and axial (x,y,z) positioning can be utilized. While the term camera is used throughout the application, this term is meant to include standard camera technology as well as CCD and CMOS camera units and other state-of the-art imaging devices.

In its preferred form, a plurality of sensor units, which may include at least one video image appliance sensor and/or at least one audio appliance sensor and/or at least one motion appliance sensor, are placed strategically about the facility to be monitored. In addition, strategically placed motion detectors, fire sensors, panic switches, smoke sensors and other monitoring equipment are incorporated in the system. Cameras may be placed throughout the facility and in other desired spaces including on the grounds outside the facility. The audio sensors/transducers and other sensors and detectors are also strategically located both internal and external of the facility.

While the system may be hardwired, in its preferred form the system of the present invention is adapted for use in connection with wireless transmission and receiving systems. The wireless system is particularly useful for adapting the system as a retrofit in existing facilities and also provides assurances against disruption of data transmission, as well as permitting roving interactive monitors that can be carried or worn. In the preferred embodiment, the wireless system is fully self-contained with each appliance and/or sensor unit having an independent power supply and, where required for image sensors, a sensor light source. The security system may include either motion sensitive, audio sensitive and/or image processing based activation systems so that the equipment is not activated until some event is detected, i.e., the system is action triggered.

In the preferred embodiment, the system will transmit any detected information to a monitor system located at a base monitoring station, located on site and/or at a remote or roving location, and/or a server for logging, forwarding, archiving same. The base station has instant live access to all of the image and audio signals as they are captured by the sensors, and where desired is adapted to record and make an historic record of the images for archive purposes. Where random access recording techniques are used, such as, by way of example, digital random access memory storage devices, the information by be readily searched for stored information.

If unauthorized personnel breach the security area or a panic handle is activated, for example, and the audio and video equipment is activated, signals will be immediately transmitted to the base station, usually with an alert signal to attract the attention of base personnel. This will give immediate access to information identifying the activity, the location and the personnel involved. Further, in the preferred embodiment of the invention, an appropriate response system will be activated for securing the immediate area and taking counter measures to protect the security of the area. This may include dispatch of personnel, sealing off the area, turning on lights, activating audio devices and/or, where appropriate, transmitting an audible and/or visual alarm as well as instructions.

In the preferred embodiment, when a large number of appliances are utilized in a complex system, the plurality of appliances may be synchronized whereby the plurality of data, including visual image data, may be displayed, recorded, and/or transmitted in either a split screen or serial fashion. A time or chronology signal may also be incorporated in the data scheme, whereby all collected real time streaming media on individual events are time stamped for exact time and date. Any signal which is capable of being captured and stored may be monitored in this manner.

Utilizing the wireless system of the invention in combination with the battery back-up power supply, it is possible to continue collecting information without using a central or public power source. This assures that the system will operate even if power is disrupted for any reason such as, by way of example, tampering by unauthorized personnel. The sensors can detect power outages and generate alarm conditions as reported over the LAN or WLAN. In its simplest form, only triggered sensors are active, and only the signals generated thereby are transmitted to the security station. In the preferred embodiment, a combination of hardwired and wireless devices and components will be used. One advantage with the use of certain wireless components is that the capture, retrieval, monitor and archive system utilizing a wireless transmitting/receiving system assures that transmission will not be lost if wires in a portion of the system are cut or otherwise interrupted, during a fire or an earthquake or tampering, for example. Wireless configurations are also particularly desirable for retrofit installations where it may be difficult to install cable. Further, in addition to ease of installation, wireless components are virtually portable and can be re-deployed based on history of need within a given installation simply by moving the component to a new location. In the preferred embodiment, components of such a system would be completely self-contained with an integrated power supply and, as required for image sensors, an integrated illumination system. The illumination system would provide lighting to permit capture of images in the event the public power system fails.

Of course, it is an important aspect of the invention that all of the collected data, including any video and images, be recorded to provide an historic video record. This will prove invaluable as an aid in reconstructing the events in a "post mortem" investigation. Recording can be local to the appliance for smaller amounts of data, or at a server for large amounts of data.

The system of the present invention is capable of transmitting the collected information over significant distances using typical voice bandwidth carriers in sufficient resolution to accommodate security surveillance and other high-resolution applications.

In one embodiment, one or more wireless cameras or sensor devices are in communication with a local Network system using a wireless LAN (local area network) connection. A monitoring station is also in communication with the Network at any desired location on the LAN. The monitoring station can monitor audio and/or video and/or image data and/or sensor data continuously, periodically as programmed, upon activation of panic button, or upon event detection such as by motion detection, contact closure or detection by an independent system that is in communication with the surveillance system. The wireless LAN connectivity permits local distribution of audio, video and/or image data with a relatively high bandwidth without requirement of a license and without relying on a common carrier and the fees associated therewith.

Where longer distance transmission is required, the surveillance system of the subject invention may be interfaced with a WAN (wide area network) or the Internet or wireless carrier. This provides a worldwide, low cost surveillance system with virtually unlimited geographic application. Such a system is very useful in applications where multiple buildings are part of the surveillance network, such as, by way of example, a college campus, school buildings or districts, or corporate campus or a geographically distributed government installation. One or more centralized monitoring stations can then have access to all of the surveillance data from various remote locations via the Internet or the WAN.

In an enhancement of the invention, a security server is added to the system for expanding and enhancing the capability and functionality of the surveillance system. The server provides a centralized location for data collection, alarm detection and/or processing, access control, dispatch processing, logging functions, data mining capability, configuration and management functions, map serving, format conversions, protocol conversions and other specialized functions. The server may be inserted virtually anywhere in the Intranet/Internet network provided adequate bandwidth is available. The topology of the network will be established by the geographic situation of the installation. Multiple servers may be employed. The server permits the implementation of standard network tools and techniques such as TCP/IP, HTML and browser support that will allow nearly universal access to the system with proper security access codes. Appropriate access controls and firewalls may be set up as desired. The server based system permits a security provider to have access to the appliance and/or sensor and surveillance data and/or to configure or reconfigure the system from any station on the Network, such as from a PC at home. The system supports and manages the collection, logging and archiving of data; data mining; the monitoring, assessment, response and dispatching of alarm conditions; data distribution to remote locations; routing; data format conversion as necessary; and signals the dispatch of response support where required.

An example of a multiple location, server based, Internet supported system in accordance with the subject invention is a typical school district. Using the subject invention, wireless appliances and/or sensors may be located in strategic areas in each school building and/or on each campus of a district. A wireless receiver (or multiple receivers) is then connected to the local area network on the campus and a monitor station is placed at a strategic location, for example, in the administration office. This allows collection of information from wireless appliances and distribution to wireless monitors. The collected data may be displayed on a PC monitor or other monitor such as a CRT console monitor or an LCD, portable and/or personnel communications devices, and/or any of a variety of suitable monitors and display units. In addition, the data is sent via the Network to a server located, for example, at the district office, where all campuses are monitored. Due to the bandwidth it is possible that each facility will require a local server. The server can also distribute and dispatch information upon the occurrence of an event. For example, if a panic button were to be activated at a sensor station, this signal would be immediately transmitted, assessed and a response initiated. If the panic button indicated a fire, a fire response team would be dispatched directly to the scene, as well as other appropriate responsive actions. In a worst case example, if a gunshot were detected using acoustic sensors, the server would be able to identify the appliance or sensor on the specific campus where the event occurred. Information could then be sent to appropriate authorities such as, by way of example, on site roving guards, to a centralized school district monitor point, the closest police station and the closest fire station, providing a fast response after the occurrence of the event.

The wireless nature of the appliances and sensors also minimizes the likelihood of tampering with the signals.

Server functions can be distributed. For example, image, video and event data can be archived locally whereas dispatch data may occur at a central server. As a further example, monitoring can be local during classroom hours, and moved to the central district office after hours. Also, the district office could monitor in parallel at any time, especially when a critical event is being monitored. The multiple communication paths provide redundancy in the system making it unlikely that all monitoring stations would be down at one time. The system is a cost-effective, flexible and comprehensive system for enhancing the campus and building security issues currently facing most institutions and organizations.

One significant advantage to the system of the subject invention is that it permits multimedia surveillance in applications and locations where physical wiring cannot be used, and over distances not possible with other systems. The system of the present invention provides surveillance capability utilizing techniques ranging from closed-circuit, hard wired systems to the Internet and is not limited by the data capacity; or cost associated with systems currently on the market.

It is an important feature of the invention that it is adapted to the use of non-localized wireless carrier links. WLAN systems are generally restricted to distances ranging from 200 to 4000 feet. Greater distances can use common carriers for transmitting the data. CDPD data service, Internet two-way pager service, CDMA and wide band CDMA services, or an Internet satellite service and the like can be used. Even carriers generally not including an Internet gateway can be used if modified to provide an access path to the server or to the Internet gateway. For example, conventional (non-digital) cellular service can be combined with an ISP connection to provide a gateway to the Internet. This would permit a remote unit to be readily transported to a distant or remote location such as a soccer field to provide full communication capability with the networked system. Type of event, location and multimedia data can be dispatched to the mobile unit for initiating immediate action.

The server is the heart of the surveillance system and monitors the status of the wired and/or wireless sensors as well as the status of the monitor stations and network infrastructure anywhere on the system. The server monitors event detection and both manages and monitors response dispatch. The server also manages the collection, dissemination, logging and/or archiving of data. The server manages, monitors, configures and reconfigures the system components. This can be done seamlessly from a remote location, eliminating the requirement that personnel attend to each station except when hardware upgrades are required.

The server-supported system permits a broad range of signal and event processing. For example, the server can arm and disarm appliances and sensors for detection of external events, audio detection or video detection based on predetermined schedules or manual control via Internet or Intranet access. If an activated sensor is triggered, the server can dispatch alarm conditions in several ways, including by not limited to sending:

messages to specifically assigned monitoring stations or mobile units;
a telephone call to a designated land line (such as 911) with an audio message describing the event.
a telephone call to a designated wireless telephone number with an audio message describing the event in order to dispatch a mobile unit;
a numeric pager message with transmitted number signifying a voice mailbox;
a voice pager with audio message;
a text page describing the event;
a text message to wireless personal data assistant (PDA);
E-mail to specific addresses; graphical information showing, for example, a map of the event location to PDA.

The server-based system can be used to notify multiple parties, or can notify and wait for a confirmation and then perform programmed sequenced steps based on response or non-response of the notified entities. Complex alert "decision tree" sequences can be implemented for personnel and organization notification in any desirable hierarchy.

The multimedia surveillance system of the subject invention permits high-resolution still image transmission as well as full motion monitoring and step video. All three types of data may be delivered in any combination to maximize the quality of the data collected against bandwidth and storage requirements.

It is, therefore, an object and feature of the subject invention to provide a wireless communication link between appliances, sensors and/or monitors.

It is an additional object and feature of the subject invention to provide a multimedia surveillance system adapted for any of a plurality of monitoring and surveillance appliances which may be incorporated in the system via network connections through a server to provide a versatile, wide-ranging multi-media system which may be configured to meet specific application needs.

It is another object and feature of the subject invention to provide a multimedia surveillance system for transmitting video and image data over significant distances using typical voice bandwidth carriers such as the public telephone system, and wireless carriers such as cellular telephones, including AMPS, PCS, GSM, CDMA, wide band CDMA and the like, CDPD data links, two-way pagers, satellite networks such as Iridium and the like.

It is also an object and feature of the subject invention to provide a multimedia surveillance system adapted for utilizing wireless video and/or image data collection and/or transmission using the Internet and/or IP protocols.

It is also an object and feature of the subject invention to utilize network communication systems to distribute surveillance data and control data.

It is another object and feature of the subject invention to provide a security surveillance system adapted for use in connection with a wireless LAN (WLAN) communications system.

It is also an object and feature of the subject invention to provide a multimedia surveillance system adapted for making a permanent record of collected data in desired sequence and format such as before, during and after event detection, through programmed monitoring, event response and human control and intervention.

It is a further object and feature of the invention to provide location data, and other graphic information based on correlation of event detection and location data.

It is yet another object and feature of the invention to provide vectoring capability for guiding response personnel to specific locations in response to events and for guiding at risk personnel away from such events.

It is an additional object and feature of the invention to provide for automated dispatch with circuit selection, signaling control and priority dispatch techniques.

It is a further object and feature of the invention to provide remote management and configuration capability of a multimedia surveillance system.

It is a further object and feature of the invention to provide a server supported multimedia surveillance system having an Intranet and Internet compatible server for data retention, alarm processing, configuration management, access control, access logging, "cross point switching" of data, motion detection, scene analysis, scheduled activation and deactivation detection, display data distribution and sequencing and general control and management.

It is a further object and feature of this invention to provide a comprehensive, multi-media surveillance and security system for monitoring one or more selected zones form a remote location.

It is also an object and feature of the subject invention to provide communications between the monitored zone and a surveillance station using wireless communication techniques.

It is another object and feature of the subject invention to provide a comprehensive, multi-media system for generating, collecting, displaying, transmitting, receiving and storing data for security and surveillance.

It is an additional object and feature of the subject invention to provide a video and/or audio and/or data record of events occurring for archival and retrieval purposes.

It is yet another object and feature of the subject invention to provide apparatus for permitting security personnel to receive video images, audio information and data relating to critical components and areas.

It is an additional object and feature of the subject invention to provide interspersed full motion and still video for image surveillance and event reconstruction.

It is also an object and feature of the invention to provide location information of both the personnel and the event in order to dispatch appropriate response personnel in closest proximity of the event.

It is another object and feature of the invention to a system and method for time stamping events, images, and streams of data such as video, audio, and sensor data.

It is another object and feature of the invention to provide a panic button system for alerting as to a crisis.

It is another object and feature of the invention to provide a networked video intercom system.

It is a further object and feature of the invention to provide personnel/ID data base access.

It is an additional object and feature of the invention to provide image based data mining, including image changes, and object appearance, disappearance or significant change of location monitoring.

It is an additional object and feature of the invention to provide lighting control based on events.

It is a further object and feature of the invention to provide event-mapping schemes.

It is a further object and feature of the invention to provide interconnection between multimedia security systems and conventional security systems.

It is an additional object and feature of the subject invention to provide interconnection between multimedia security systems and conventional CCTV camera systems, including retrofit.

Other objects and features will be readily apparent from the accompanying drawings and detailed description of the preferred embodiments.

BRIEF DESCRIPTION OF THE DRAWINGS

FIGS. 1–9 are directed to various system configurations, as follows:

FIG. 1 is a diagrammatic illustration of wireless sensor appliances connected to a network.

FIG. 2 is a diagrammatic illustration of the system of FIG. 1 further connected to a remote station via a network.

FIG. 3 illustrates a wireless configuration and includes a system server and a wireless monitor terminal.

FIG. 4 illustrates a server-based system using network communications.

FIG. 5 illustrates various wireless carrier communication link configurations with gateway.

FIG. 6 is an expansion of FIG. 5 and includes wireless carrier links to monitors via wireless carrier and a wide area network such as the Internet.

FIG. 7 is a comprehensive multimedia surveillance system incorporating the features illustrated in FIGS. 5 and 6 with multiple, potentially different, wireless carriers.

FIGS. 8a, 8b, and 8c are illustrations of various system configurations for networked systems.

FIGS. 8d, 8e, and 8f are illustrations of various system configurations for wireless local area network systems.

FIGS. 8g, 8h, and 8i are similar to FIGS. 8d, 8e, and 8f showing the system configured for use in connection with a wireless carrier.

FIG. 9 is an illustration of a system configuration combining wired and wireless components with wired and wireless gateways to a common carrier and a wide area network such as the Internet.

FIGS. 10–42 are directed to sensor and network appliance configurations, as follows:

FIG. 10 is an illustration of a hardwired fire alarm multimedia network appliance.

FIG. 11 is a wireless configuration of the unit shown in FIG. 10.

FIG. 12 is a perspective view of a multimedia alarm and response network appliance for use in connection with the subject invention.

FIGS. 13 and 13a are illustrations of a basic video wall camera network appliance.

FIG. 14 is a block circuit diagram for the video camera network appliance of FIG. 13, with optional mass storage shown in phantom.

FIG. 15 is an illustration of a signaling transducer network appliance.

FIG. 16 is a block circuit diagram for the signaling transducer network appliance of FIG. 15.

FIG. 17 is an illustration of a sensing/signaling network appliance.

FIG. 18 is a block circuit diagram for the sensing/signaling network appliance of FIG. 17.

FIG. 19 is an expanded block diagram for a highly integrated sensing/signaling network appliance.

FIG. 20 is an illustration of a hardwired video intercom/control network appliance.

FIG. 21 is a block circuit diagram for the hardwired video/control intercom of network appliance of FIG. 20.

FIG. 22 is an illustration of a wireless video intercom/control network appliance.

FIG. 23 is a block circuit diagram for the wireless video intercom/control network of FIG. 22.

FIG. 24 is an exploded view of a basic portable monitor appliance.

FIG. 25 is a basic block diagram circuit for a security PDA appliance.

FIG. 26 is a block circuit diagram of a contact closure output interface wired network appliance with two channels.

FIG. 27 is a block circuit diagram of a contact closure output interface wireless network appliance with two channels.

FIG. 28 is a block circuit diagram of a contact closure input interface wired network appliance.

FIG. 29 is a block circuit diagram of a contact closure input interface wireless network appliance.

FIG. 30 is a block circuit diagram of an analog sensor input wired network appliance.

FIG. 31 is a block circuit diagram of an analog sensor input wireless network appliance.

FIG. 32 is a block diagram of a camera wireless network appliance FIG. 33 is a flow chart of a camera appliance having both motion video and still image capture capability for use in connection with the multimedia surveillance system of the subject invention.

FIG. 34 is a block diagram of the system shown in FIG. 33 showing control processor.

FIG. 35 shows an alternative configuration using a high performance DSP with the embedded functions of FIGS. 33 and 34.

FIG. 36 is a diagrammatic illustration of a collateral-triggering device for use in connection with the multimedia surveillance system of the subject invention.

FIG. 37 is an integrated sensor/wireless network appliance using DSP technology.

FIG. 38 is an integrated sensor network appliance with a digital multiplexer.

FIG. 39 is an integrated sensor network appliance with an analog multiplexer.

FIG. 40 is a perspective view of a multimedia camera tracking network appliance for use in connection with the subject invention.

FIG. 41 is an illustration of the server dispatch capabilities for a system configured with telephone access, voice response and voice mail.

FIG. 42 is an illustration of a telephone system gateway network appliance.

FIGS. 43 through 56 are directed to server functions including: (a) system configuration schemes, (b) clusters, (c) dispatch systems, (d) data logging and (e) data mining, as follows:

FIG. 43 is an illustration of a system including an infrared or acoustic geolocation and panic button capability.

FIG. 44 is an illustration of a stand-alone location code generator beacon.

FIG. 45 is an illustration similar to FIG. 43, utilizing a wireless RF beacon geolocator system.

FIGS. 47a–47i illustrate data mining examples and related imaging processing wherein a subtractive event occurs.

FIGS. 47j–47l illustrate cursor based searching for object appearance or disappearance.

FIG. 48 is an example of the mapping function capability, showing sensor appliances.

FIG. 49 is an illustration of a clustered alarm workgroup scheme.

FIG. 50 is an illustration of a hybrid conventional alarm system in combination with the multimedia system of the subject invention.

FIG. 51 is an illustration of a carrier current interface network appliance.

FIG. 52 is an illustration similar to FIG. 51 for a wireless network.

FIG. 53 is an illustration of a conventional wireless alarm for gateway to a wired network.

FIG. 54 is an illustration of a block circuit diagram for the wireless network gateway of FIG. 53.

FIG. 55 is a block diagram for the gateway of FIG. 53.

FIG. 56 is an illustration of a block circuit diagram for the gateway system of FIG. 55.

FIGS. 57 through 59 are directed to streamed video and still imaging technology as incorporated in the subject invention, as follows:

FIG. 57 illustrates a data protocol as applied to still video.

FIG. 58 illustrates a data protocol as applied to streaming video.

FIG. 59 illustrates a data protocol as applied to combined still video and streaming video.

FIG. 60 illustrates a POTS (plain old telephone service) device applied to multimedia security system.

FIG. 61 is similar to FIG. 60, but includes a voice over IP appliance.

FIG. 62 is an illustration similar to FIG. 60, showing a system incorporating a network such as a LAN, or a wide area network (WAN) such as the Internet for video/images.

FIG. 63 is similar to FIG. 61, showing a network, such as a WAN system with voice over IP appliances.

FIG. 64 illustrates a system utilizing wireless appliances and a wireless communications system such as CDPD or CDMA.

FIG. 65 is an illustration of a camera/telephone appliance association configuration utilizing known locations and/or global positioning systems (GPS) and a communications media network.

FIG. 66 is an illustration of automated and optimized dispatch of emergency response resources and communications to and from the emergency response teams to the location of the emergency call or emergency event.

FIG. 67 is a perspective view of a wireless badge or card reader appliance.

FIG. 68 is a perspective view of an enhanced wireless badge or card reader appliance.

FIG. 69 illustrates a simple system in accordance with the invention, incorporating an access control appliance.

FIG. 70 is an enhanced access control and/or identification appliance.

FIG. 71 is an information flow diagram for an access control appliance in accordance with the subject invention.

FIG. 72 illustrates a network configuration of the multimedia system for accommodating a plurality of multimedia appliances used in accordance with the teachings of the subject invention.

FIG. 73 is a basic system utilizing a one-to-one correlation between each CCTV camera and a video encoder.

FIG. 74 includes a video multiplexer, permitting a plurality of analog video feeds to be digitized by one or more video encoders.

FIG. 75 is a concept illustration for incorporating analog video cameras into the system of the subject invention.

FIG. 76 illustrates the incorporation of a power insertion device into the system.

FIG. 77 illustrates one power insertion technique.

DETAILED DESCRIPTION OF THE PREFERRED EMBODIMENTS

Overview

Figure 1:
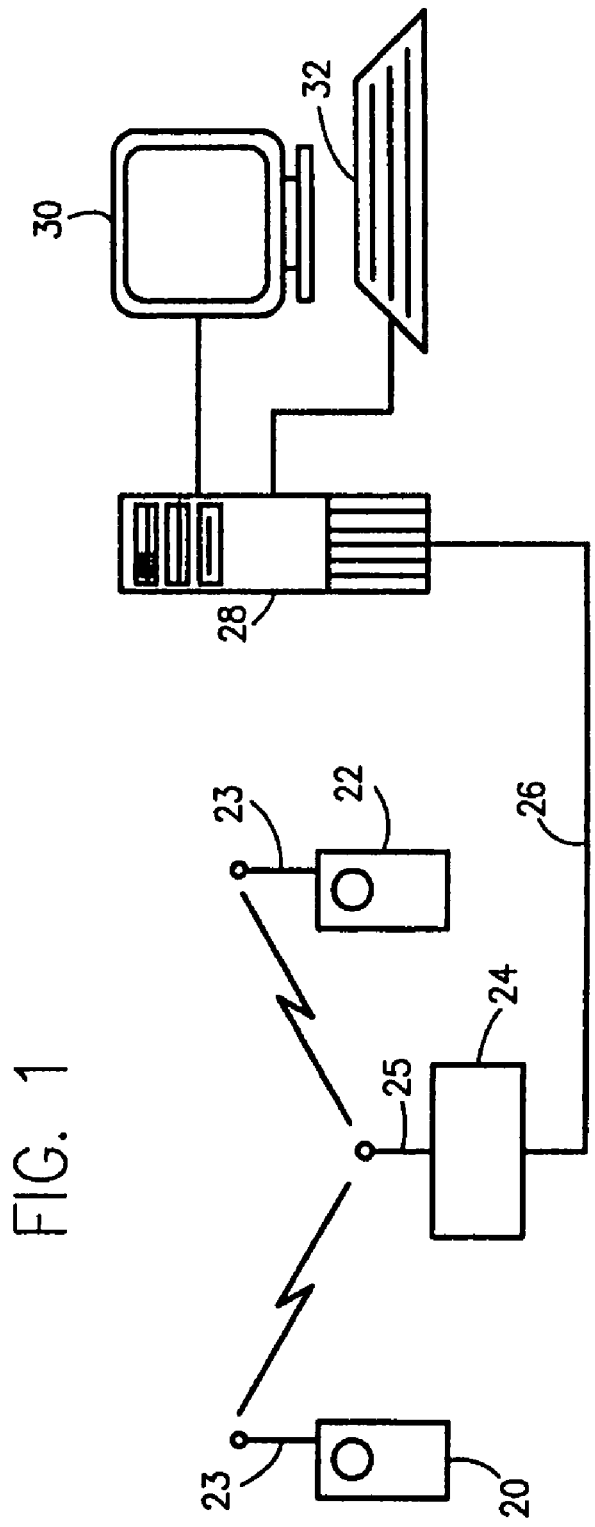

At the outset, it should be noted that the invention is generally described with all network communication and appliance interconnectivity based on a common protocol, most notably IP protocol, for use in providing communication over a wide area network such as the Internet. The network, at its lowest layer, can be implemented on wire, RF or fiber. In some cases in this application a distinction will be made between wired and wireless circuits. In other cases no distinction is made and the implementation of the LAN or WAN can be based on wire, wireless, or optical circuits. The preferred protocols are PPP or TCP-IP and their derivatives. However, it will be understood that other common protocols may be employed without departing from the scope and spirit of the invention. While this is the preferred communications protocol because of its widespread use and use in conjunction with the Internet, the intent of the invention, as described herein, is to provide the means and method for a multi-media surveillance system having local installation and communication capability via a common local network protocol and having wide area communication compatibility using a widely used protocol permitting connection to a wide area network, such as, preferably, the World Wide Web or Internet. Hence, as a matter of convenience, IP protocol is generally used as the preferred communications protocol when describing the features and functions of the invention. However, it should be understood that other protocols can be used without departing from the scope and spirit of the invention and further that the protocol used for the local network installation may, indeed, be different from the wide area protocol as long as a suitable gateway and conversion system is utilized.

While the term camera is used throughout the application, this term is meant to include standard camera technology including CCD and CMOS camera units and other state-of-the-art imaging devices that are adapted to the network.

In a typical operation sequence, the camera/sensor appliances may be utilized to automatically transmit data to a base or may be periodically or selectively polled to collect data, providing a high-resolution image. These images are archived on one or more servers. If an event happens, a full motion stream may be activated from one or more of the camera/sensors in the area of the event. The video stream can be routed to one or more monitor stations, one or more roving PDA monitor stations and can be "recorded" on one or more servers in digital format.

Streaming video can also be established manually for periodically or routinely sending full motion images to the monitor stations.

Sequential camera operation is accomplished by directing a series of identified cameras to switch on and off their respective video streams in a predefined or programmed sequence. This emulates the timed sequential video switches commonly used for CCTV security surveillance. The sequence can be easily configured and reconfigured by directing the control processor such as a server. Any authorized monitor station may be utilized to change configuration. An alternative technique would provide for several camera network appliances that "broadcast" their signal streams intermixed on the network at the same time. The monitor would then extract one camera stream at a time in a predetermined sequence. To view multiple streams at the same time, multiple monitors or split screen technique can be used. Split screen is a multi-window with each window showing a stream. A map of the appliances and sensors can be displayed. Point-and-click technology can be used to configure or modify a sequence. The appliances and sensors can be activated in the order they will be viewed, or by any other desired criteria. Switching can be by name, number or map location, using point-and-click technology. Browser technology can be utilized for the interface. Once an automatic sequence is enabled, manual activation may be accomplished by signaling a camera to turn OFF or deactivate its video stream and another to turn ON. This can also be accomplished by keyboard and/or other input commands such as by a mouse click on the map locator or with touch screen technology.

The data is compressed based on need. Still images may be specified with low-loss compression, such as wavelet, to preserve as much information as possible. Motion video may be specified with higher-loss compression to reduce the bandwidth requirements. MPEG-1, MPEG-2, motion JPEG or other motion algorithms, for example, could be specified for motion sequences. When the system is supporting a "non-alarm" condition of operation, the available network bandwidth may be allocated to support a greater number of streaming feeds at lower resolutions. If a critical alarm condition occurs, an existing feed may be commanded to increase its data bandwidth for higher resolution. This may require reducing the bandwidth and resolution of other less critical feeds, or switching them into an OFF mode. Thus a completely dynamic bandwidth control scheme may be utilized to properly balance the number of streaming sensors, and the resolution and bandwidth of those sensors against the surveillance monitoring requirements at the scene of an event.

Positioning of the cameras may also have an effect on what resolution and bandwidth are needed. For example, a camera in a small space such as an elevator does not need to have as much resolution as a camera in a large area such as an auditorium or a cafeteria. The bandwidth of the cameras can, therefore, be allocated based on need, with the elevator camera programmed for less bandwidth/resolution and the cafeteria camera with more bandwidth/resolution. This can be managed by the server.

System Configuration

As shown in FIG. 1, each of the camera network appliances 20 and 22 has an integral transmitter (not shown) connected to the antenna 23 for transmitting an RF signal to a receiver antenna 25 of a wireless LAN receiver, or access point 24. The receiver 24 is connected to the Network 26 at a location convenient for receiving the RF signal from the cameras 20, 22. The video and/or image signals captured and/or transmitted by the cameras to the receiver are then transmitted to a monitor station 28 via the network 26, wherein the signals are displayed on a monitor 30. The monitor station 28 is generally a CPU such as, by way of example, a Pentium class PC, wherein the raw data signals generated by the cameras and/or transmitted by the receiver are processed for display at a central monitor 28, a lap top, other work station or a PDA or the like. The monitor station 28 may also include an input device such as, by way of example, the keyboard 32. An example of a suitable wireless LAN is the Proxim "Range LAN2" system, Aeronet 4800 series, or products based on the Intersil Prism system chip sets, such as PCMCIA cards for small portable devices and a base station "access point" that provides an Ethernet connection to the network. The appliance wireless LAN and "access point" may also be provided by embedded chips and chip sets integral with the various appliances. The monitoring station can receive data from the wireless camera(s) continuously, periodically as programmed, or upon event detection such as by motion detection, audio detection, contact closure or other independent system link. It will be understood that any number of cameras, image sensors, audio devices and other suitable sensors may be connected to the surveillance system using this wireless system configuration. Of course, hardwired appliances and sensors can be incorporated in the system in combination with the wireless appliances and sensors, without departing from the scope and spirit of the invention. In the typical application, the appliance unit will include a combination of on board transducers or sensors as required to perform the full multimedia monitoring function. In the preferred embodiment, the appliance includes a video camera for visual input.

Figure 2:
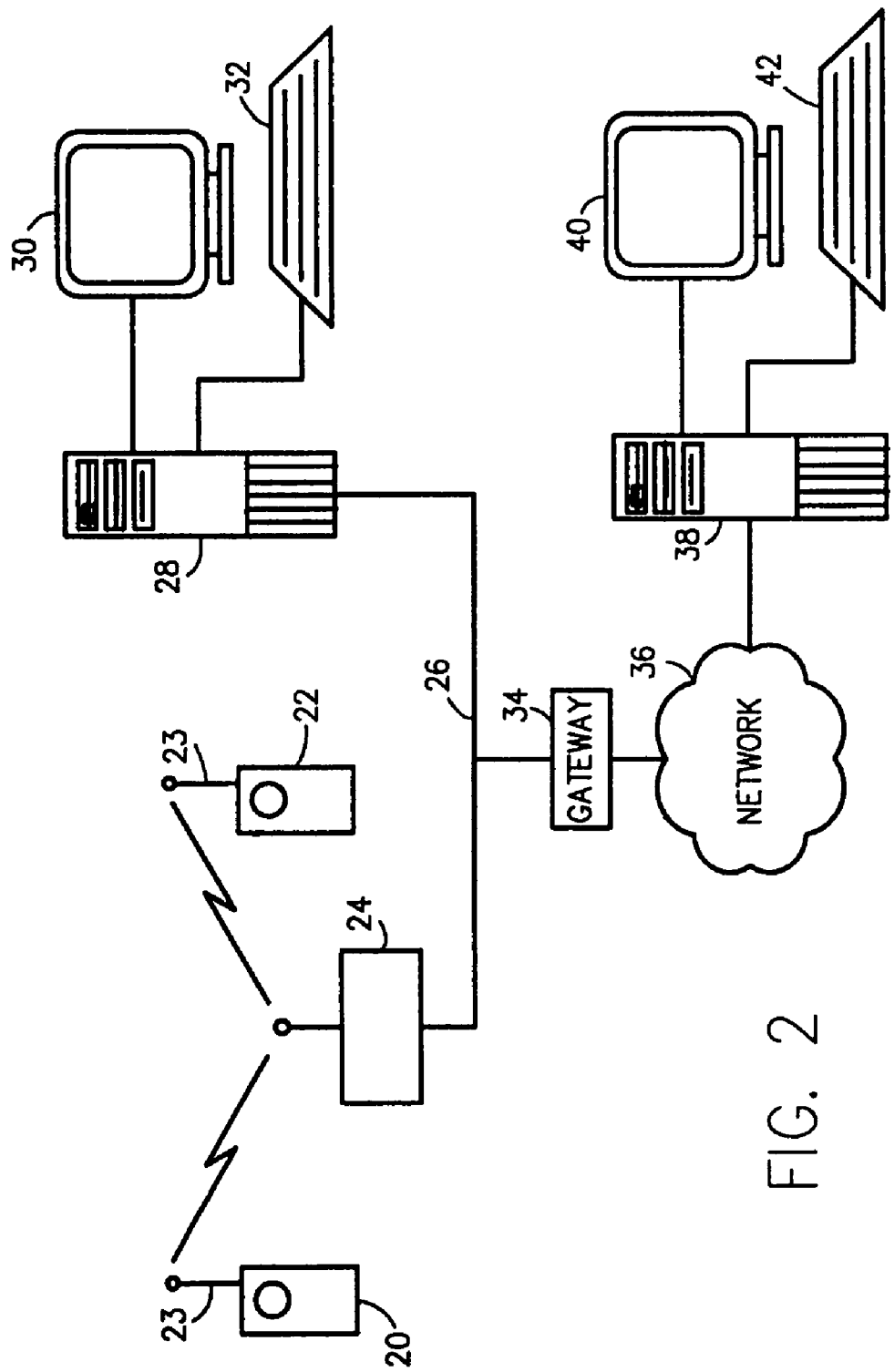

An enhancement of the system of FIG. 1 is shown in FIG. 2, wherein a gateway 34, such as by way of example, a router and firewall, is connected to the network as a gateway to a wide area network 36, such as the Internet. This permits a remote monitor station 38 to be connected to the system anywhere where there is WAN access. As with the local monitor station 28, the remote monitor station 38 is a CPU with an output or display device 40 and an input device 42, which may be either a peripheral or an integrated component of the monitor unit. This system will support an installation requiring remote or centralized monitoring, and is particularly well suited for installations where signal distribution over a large geographic region is required. This system provides essentially worldwide and low cost access to the capability of the system. Any combination of local (such as Intranet) and remote (such as Internet, frame relay, ISDN, DSL, ADSL, T-1, T-2, OC-3 connected and the like) monitoring stations can be employed.

Figure 3:
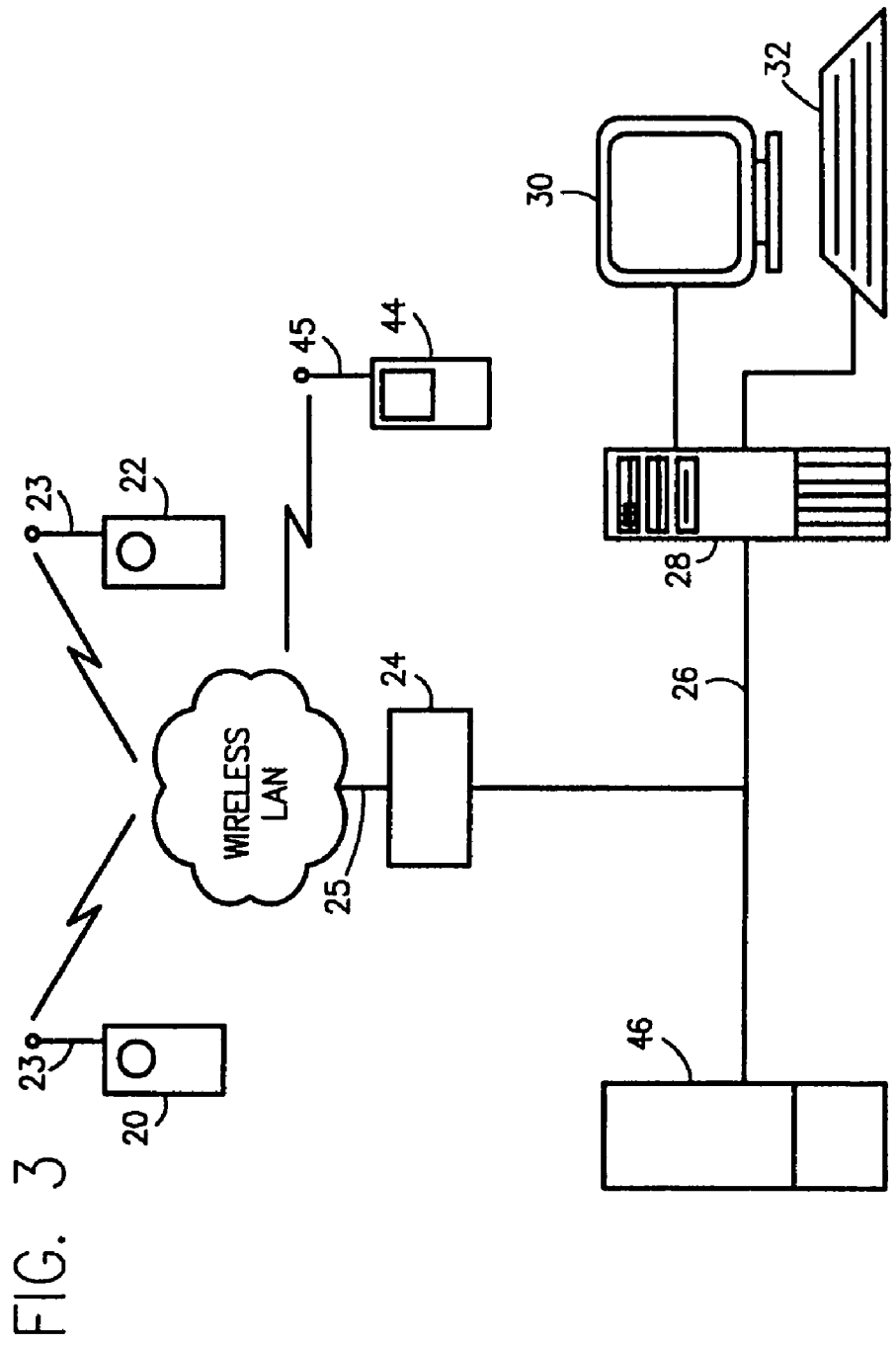

A server-based system is shown in FIG. 3 for use in combination with a wireless LAN system. In this embodiment, a wireless monitor 44 having a transceiver and antenna 45 for communication with the wireless LAN access point is also included. This is typically a portable mobile unit such as a PDA or the like, and is usually used as an adjunct to the base monitor station 28, whereby roving equipment and personnel may have access to the surveillance system in addition to personnel using the base monitor. A security server 46 has also been incorporated in the system. This substantially enhances the functionality of the system over the direct communication systems of FIGS. 1 and 2. The server provides a centralized location for data collection, alarm detection and processing, access control, dispatch processing, logging functions and other specialized functions as described herein. Data is sent to the server, logged and dispatched based on criteria determined by the server. The server can distribute received data from a multitude of appliances and sensors and route it to a multitude of monitors in a specific manner. This is analogous to a "cross point" switch in typical video security systems, but adds significant additional capability such as multipoint distribution, format conversion, automatic switching and the like. One important, but not necessarily essential, feature of the server is the ability to use standard network tools and techniques, such as TCP/IP, HTML and browser support that will allow nearly universal access to the system from conventional PC systems and Internet capable workstations with the proper security access codes. If the system is connected to a WAN, such as the Internet, this allows nearly every network station to participate in the security network if needed.

Figure 4:
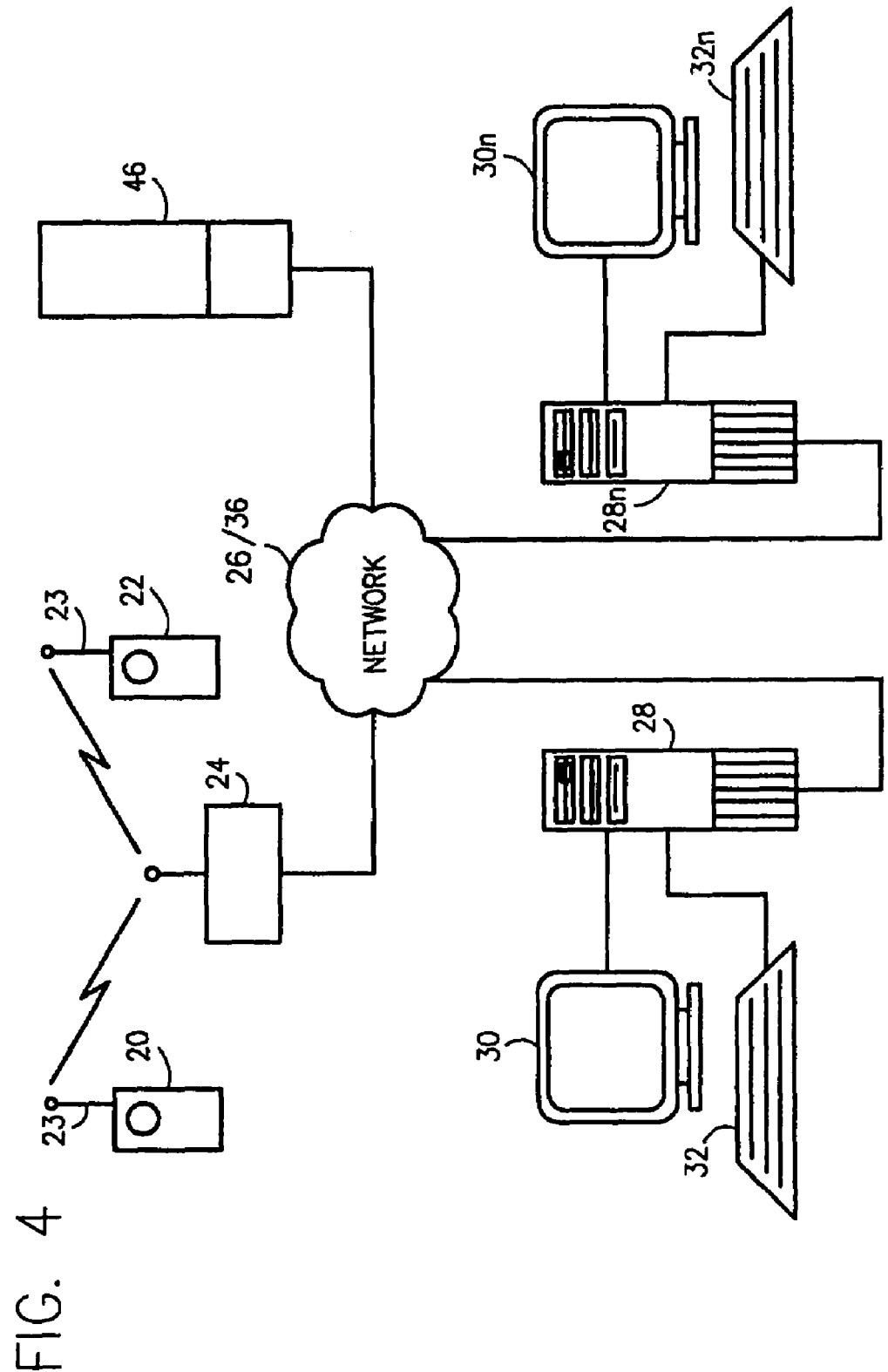
Figure 5:
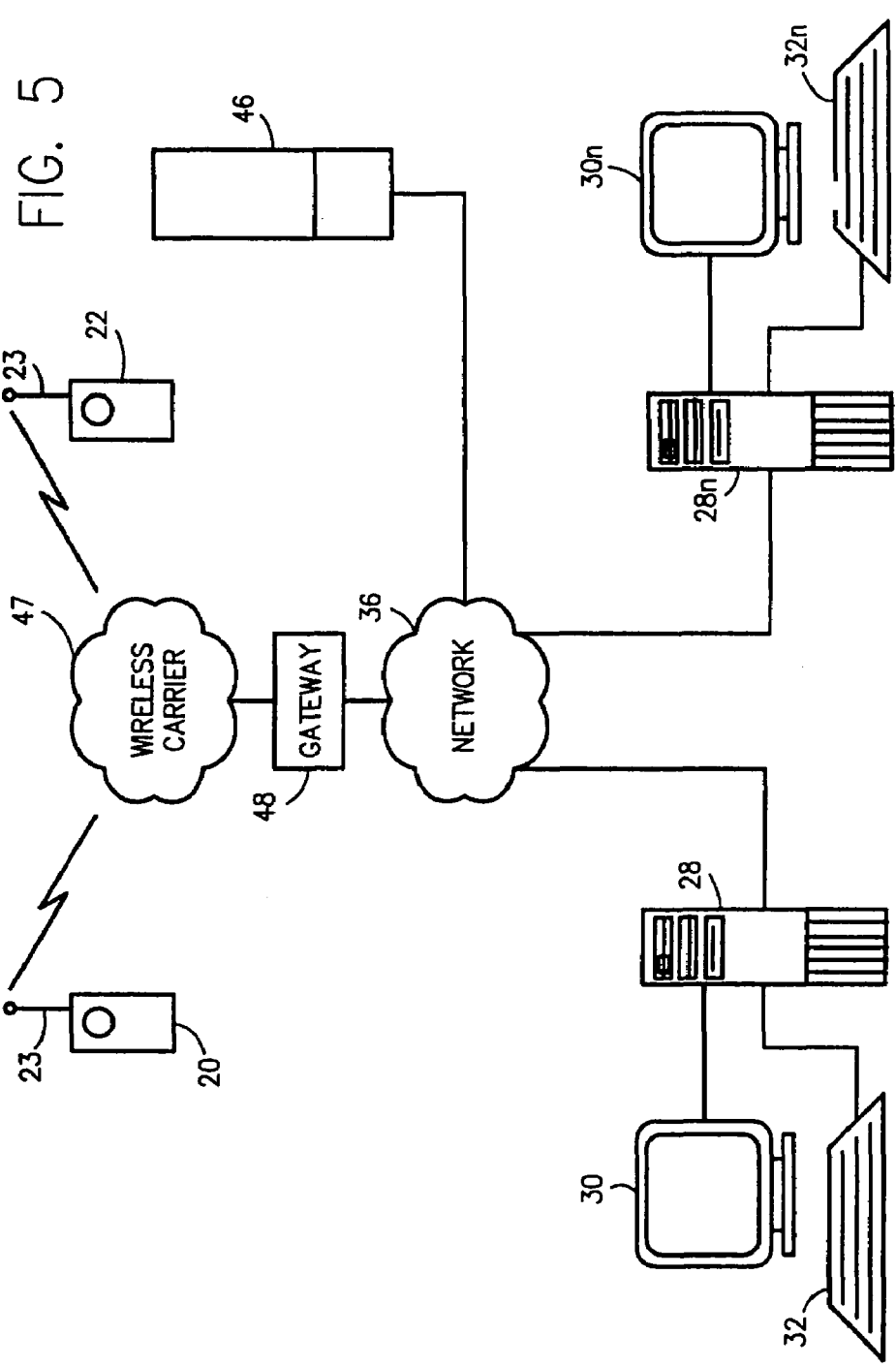

FIG. 4 is an expanded system using network connection between the receiver 24 and the various other components such as the server 46 and one or multiple monitoring stations 28–28n. The server may be located virtually anywhere on the network. This system would be a very useful configuration where a service provider supported a number of surveillance installations for various geographically distributed clients utilizing a single master server. The topology of the network will be established by the geographic parameters of an installation. Multiple servers may also be used for size, performance and/or redundancy issues. Each site may have a server to collect local data. A master server at a central monitor site can collect data from distributed sites, either by manual selection, programmed selection or automatic criteria such as the occurrence of an event or the activation of an alarm signal. The central server can also monitor the operability and condition of the distributed systems and generate corrective functions and/or alarm conditions if equipment failures or malfunctions are detected.

Where it is desired to have mobile sensor and/or monitor capability over a larger geographic area that is greater than can be provided by a wireless LAN, the wireless carrier configuration of FIG. 5 is useful. In this configuration, any one of various wireless common carriers, as indicated at 47, transmit the data directly to the gateway 48, where it is distributed in the manner previously described. Any carrier with a gateway to an Intranet or to the Internet or other network may be used. For example, CDPD data service, CDMA data service, network connected two-way pager service, digital cellular phones, or an Internet connected satellite service such as Iridium can also be used. Other services that do not fundamentally have an Internet gateway can be used once provided with an access path to the server or to any network gateway. For example, conventional (voice) cellular service does not have a network connection. However, an ISP or private gateway can be called to provide Internet connection.

Figure 6:
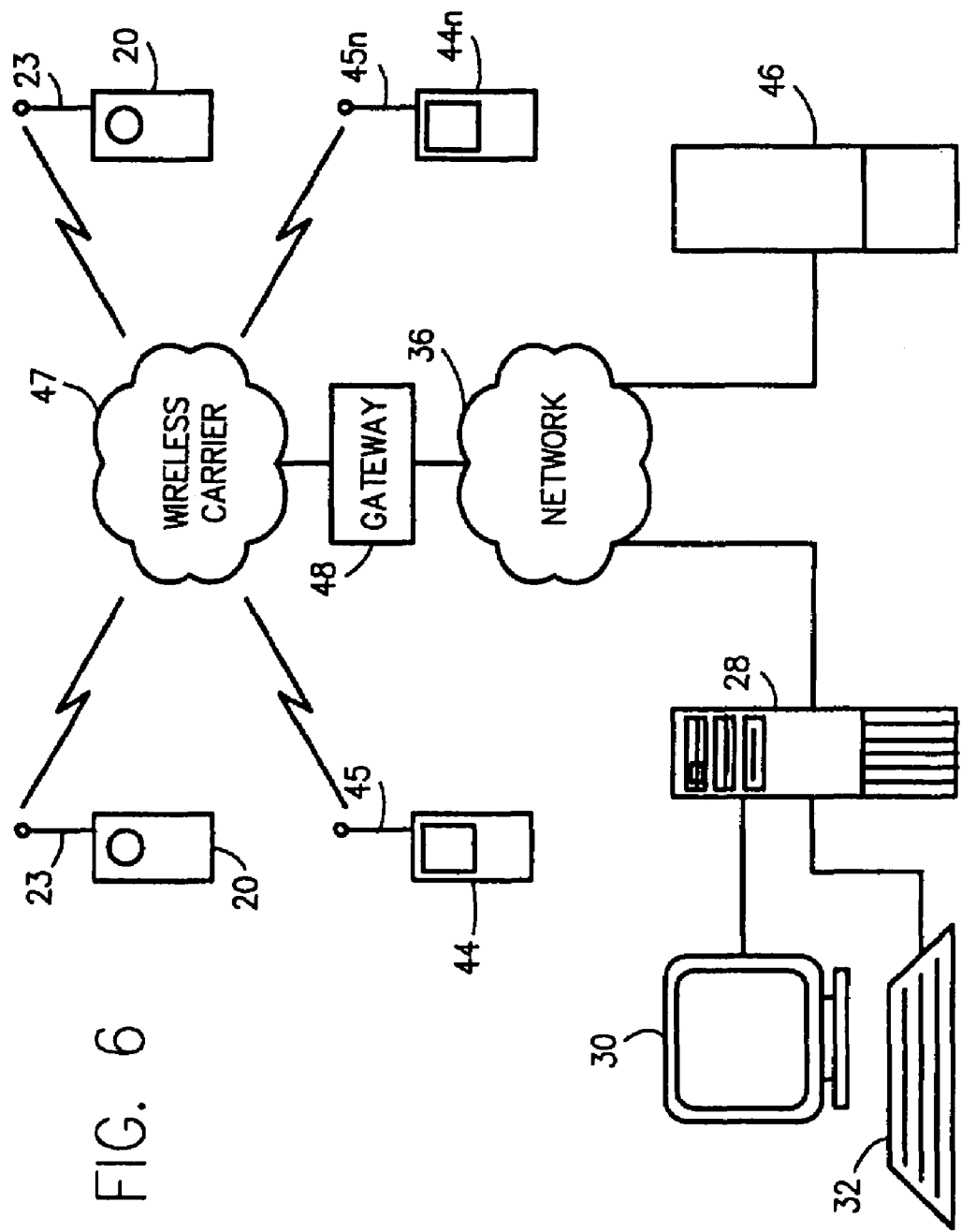

As shown in FIG. 6, one or more wireless mobile monitors 44–44n can also be connected in this fashion. For example, a PDA is outfitted with a CDPD or CDMA link and is adapted for receiving alarm events or multimedia data over a wide region without wires. In this configuration, the wireless carrier can also be a wireless LAN for smaller geographic regions. A wireless link to a monitor device is particularly useful for mobile units such as a roving security officer. When an event occurs, the roving officer can be notified while on rounds with the type of event, the location and supplied with other multimedia data such as images and/or maps and/or audio.

Figure 7:
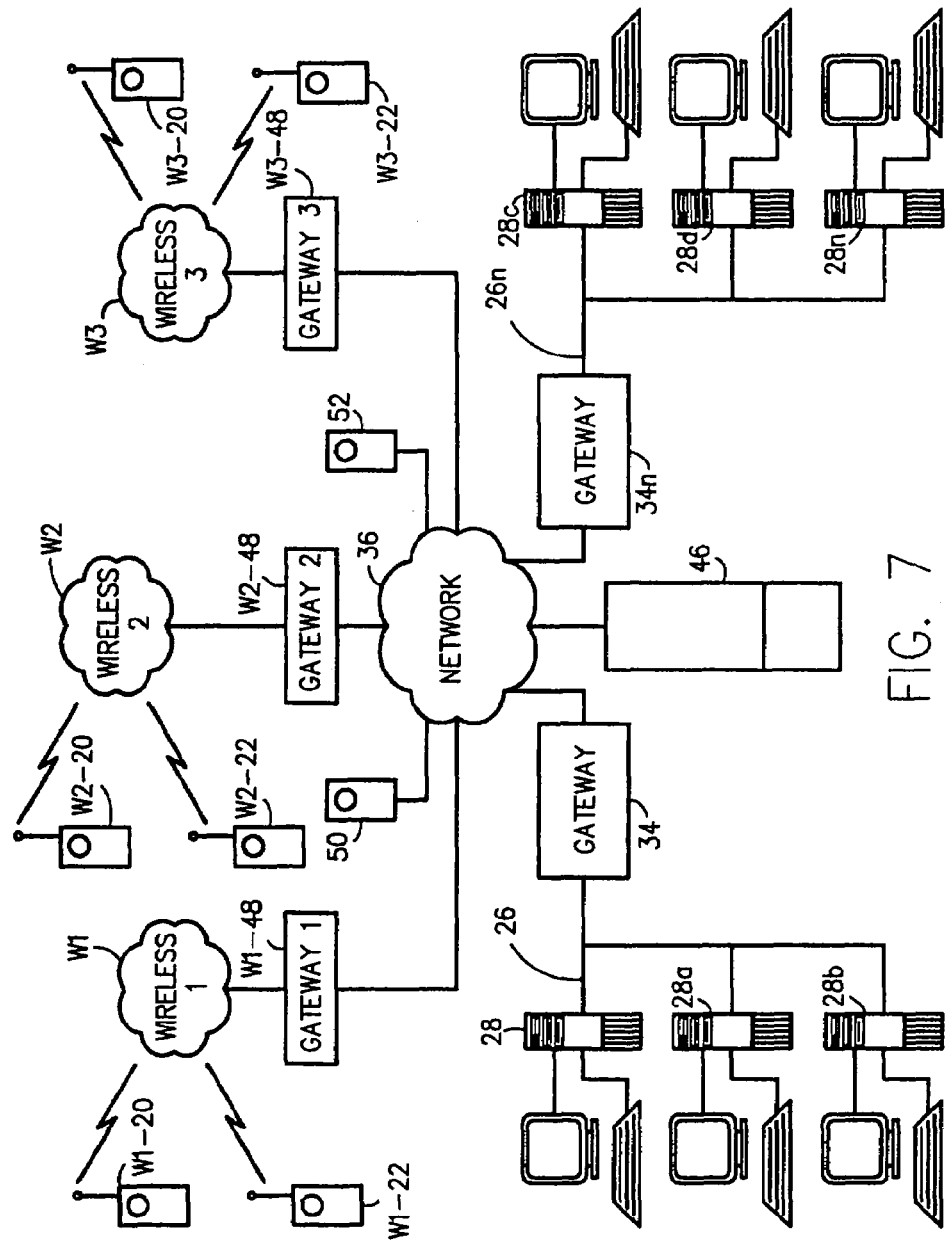

FIG. 7 is an extensive multimedia surveillance system incorporating all of the heretofore-described features of the invention. In this example, three separate buildings or locations in three different geographic regions are monitored and connected to the system as indicated by the three wireless systems Wireless 1 (W1), Wireless 2 (W2) and Wireless 3

(W3). Each location has a plurality of cameras as indicated by W1-20, W1-22; W2-20, W2-22; and W3-20, W3-22. Each wireless carrier or wireless LAN W1, W2, W3 transmits the signals to the associated gateway W1-48, W2-48, W3-48, respectively, which introduces the respective signals to the network 36. As shown, hardwired sensors such as cameras 50 and 52 may also be deployed. The transmitted data is then routed through one or more routers and/or firewalls 34–34n to various monitor stations 28–28n via associated networks 26–26n. A central server 46 is connected to the network and operates as previously described. Additional servers may also be employed as previously described. The network facilities can be protected by traditional firewalls and bridged through the routers. The focus of the system is the server that is shared by all building surveillance sensors and all monitor stations. The server is located on the network and is also firewall protected with controlled access. In a typical installation, the surveillance units in building 1 are supported by Wireless 1 (W1). This will be mapped to a monitor station in building 2 supported by Wireless 2 (W2) and may also be mapped to a monitor station off site, and so on, permitting monitoring from a location remote to the surveyed building. This would be particularly useful, for example, in monitoring school campuses from a remote location. Additional servers may be employed, such as in each building, to reduce network bandwidth requirements and to provide redundancy. The specific network configuration employed, including the type of wireless carrier used (WLAN, CDPD, CDMA, cellular, two-way pager and the like) is determined by geographic configuration, cost and availability of the services in the particular geographic area and the intended functions and scope of surveillance system.

Diagrams of various system configurations for LAN and wireless local area network (W-LAN) systems are shown in FIGS. 8a, 8b and 8c. As shown in FIG. 8a, the camera C1 generates an analog signal, which is converted to a digital signal at converter 400 and then compressed at the motion video compressor 402. The compression can be accomplished by industry standard techniques such as motion-JPEG, MPEG, or motion wavelet compression or other current or future compression algorithms. The compressed digital signal is then packetized by the network interface 404 and transmitted to the network 206 using a selected protocol in well-known manner. An analog audio sensor such as microphone 419 is added in FIG. 8b and is supported by the dedicated converter 406 and compressor 408 for input to the multiplexer 410 where the compressed digital audio signal is combined with the compressed digital video signal to produce a complex multi-media signal for packetization by the interface 404. As shown in FIG. 8c, other sensors such as motion detector 431 may also be included. The motion detector signal, for example, is digital and therefore does not require conversion and is input directly into the multiplexer 410. FIGS. 8d, 8e and 8f show a similar configuration for a wireless LAN (WLAN). In these configurations the wireless LAN interface 412 includes a transceiver and an antenna 414 for transmitting the data signals to a wireless LAN (WLAN) 416. FIGS. 8g, 8h and 8i show the configuration of FIGS. 8d, 8e and 8f modified to incorporate a wireless transceiver 411 for communication over a wide area network wireless carrier, such as CDPD, CDMA, etc. indicated at 417. As previously described, any portion of the system may be wired or wireless depending on ease of installation, mobility requirements and other issues. It may be noted that functions such as the motion video compressor, audio compressor, multiplexer and LAN protocol functions may all be performed as software and could operate on one high speed computer such as a Digital Signal Processor (DSP).

Figure 9:
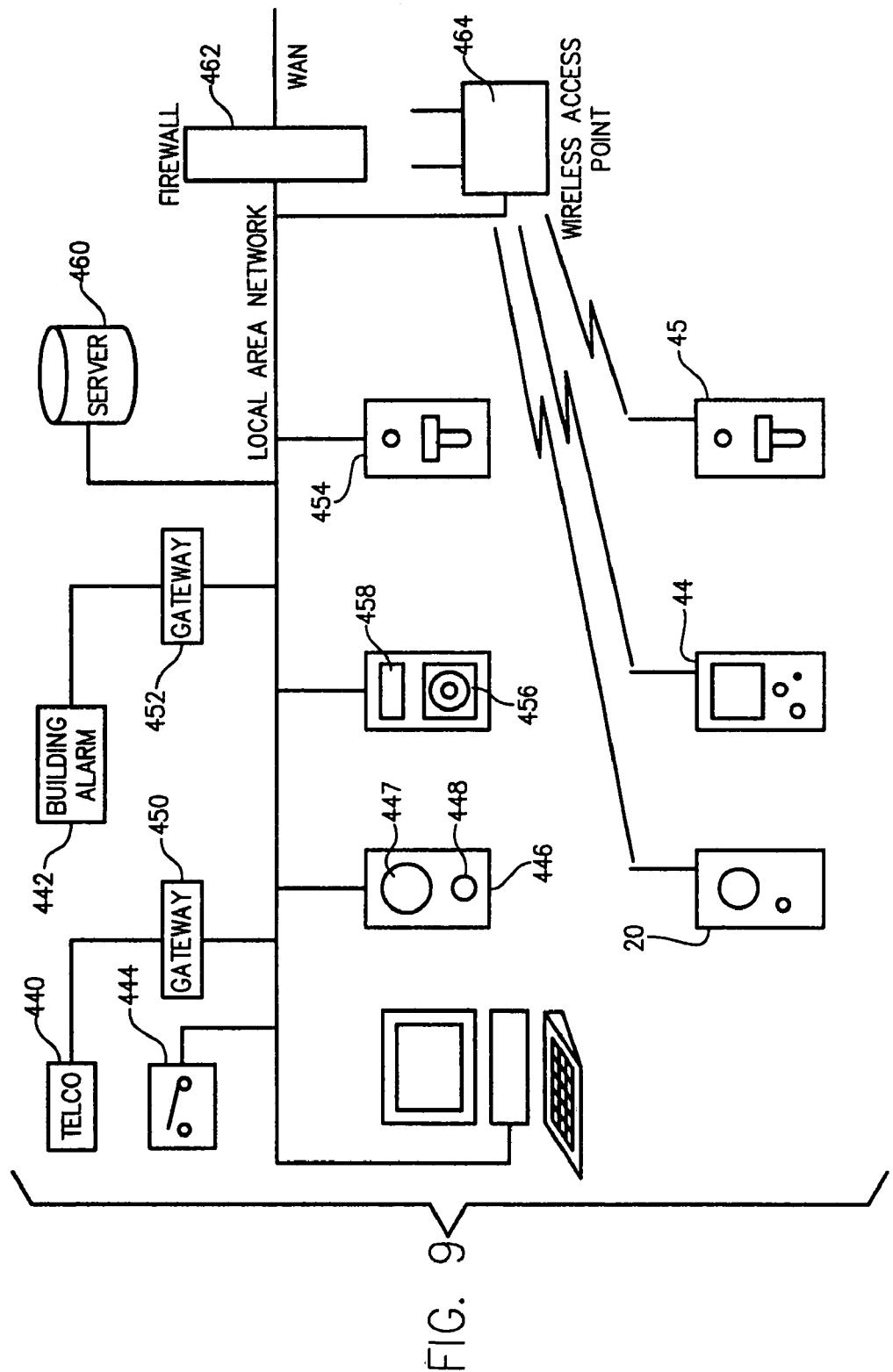

FIG. 9 is an illustration of a system configuration combining wired and wireless components with gateways to a common carrier and a wide area network such as the Internet. This is a comprehensive system illustrating the myriad combinations that may be employed in a full capability multi-media surveillance and monitoring system incorporating the teachings of the present invention. As shown, landline telephone systems 440 may be employed as a hardwired transmission system via the suitable hardwired gateway 450. This provides direct dial-in access by workstations. It also provides dial-out alarm condition indications either to voice devices, such as telephones, pages and cellular telephones, or computer workstations or other computer systems such as alarm company consoles. Various signaling systems such as, by way of example, the building alarm system 442, may also be hardwired via a suitable gateway 452 into the system. This allows the building alarm system to be an extension to the multimedia surveillance system. Other sensor systems such as contact sensor appliance 444, a hardwired camera appliance 447 and audio sensor 448, shown as an integral sensor appliance 446, and other signaling devices such as the "Pull" station appliance 454 may also be hardwired into the system via the wired local network. Warning devices such as the speaker 456 and the visual signal device such as the strobe 458 may also be included in the system appliances. A local server 460 may be connected to the local area network, which provides a gateway to a wide area network such as the Internet, through a suitable firewall 462. Of course, a wireless LAN (WLAN) can also be employed utilizing all wireless appliances where hardwiring is not available. A wireless access point or transceiver 464 is provided whereby various wireless appliances may also be employed. The wireless appliances 20, 44 and 45 correspond to the wired appliances 446, 456 and 454, respectively.

Sensor, Device and Appliance Configurations

Figure 10:
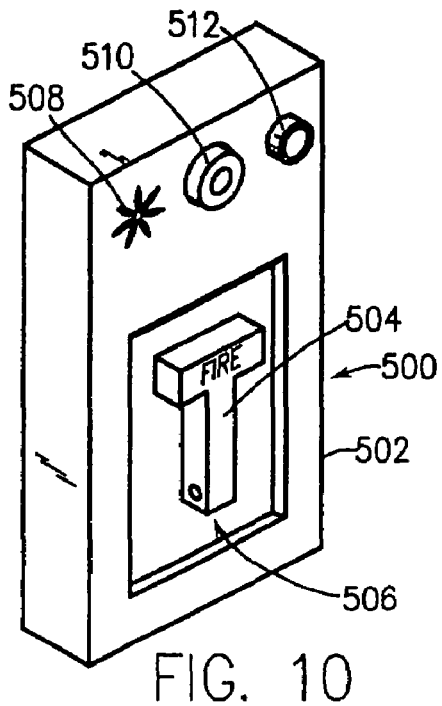
Figure 11:
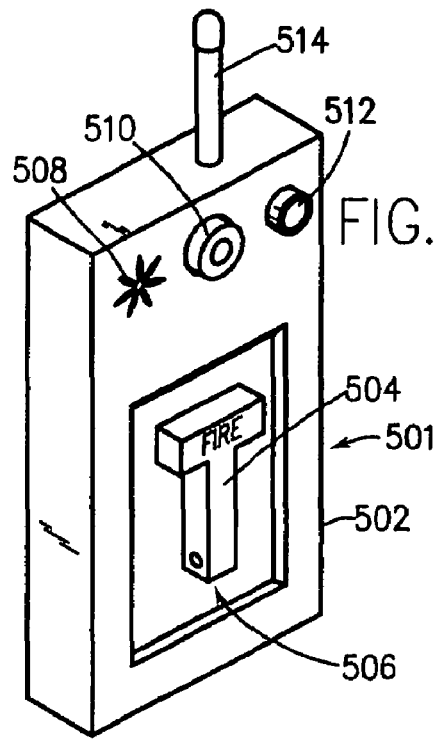

Examples of various appliances used in connection with the comprehensive multi-media surveillance system of the subject invention, and related interfaces, are illustrated in FIGS. 10–40. A hardwired "Pull" station appliance is shown in FIG. 10. A wireless configuration of the same appliance is shown in FIG. 11. The "Pull" station appliance 500 is fully self-contained in a box 502 and resembles a typical "Pull" type fire alarm as employed in many public buildings such as schools and the like. The unit includes a pull-type fire alarm handle 504, often positioned behind a breakable glass window 506. A camera or other image sensor 510 is provided for monitoring the activity around the fire alarm, with an audio sensor such as a microphone 512 also provided. A speaker 508 is included to provide either audio alert signals or audio instructions. The combination of speaker 508 and microphone 512 may be used as an audio intercom with other audio enabled devices such as workstations, telephones and the like. The wireless appliance 501 of FIG. 11 includes all of the same features as the unit of FIG. 10, but further includes an integral transceiver and antenna system 514 for transmitting and receiving data via a wireless LAN (WLAN) or wireless carrier.

Figure 12:
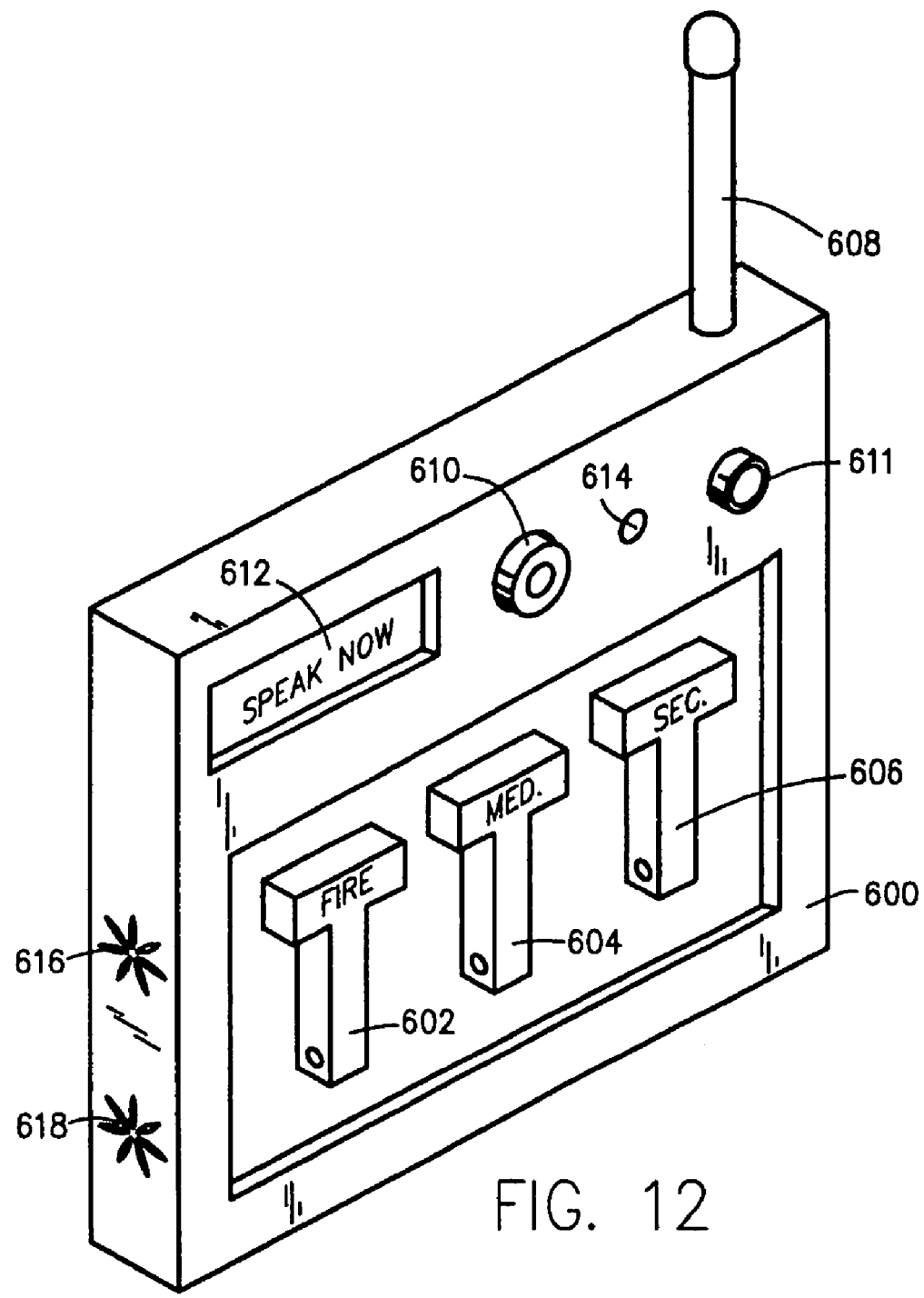

FIG. 12 is a perspective view of a multimedia alarm and response appliance for use in connection with the subject invention. The "box" 600 is shown in a wireless configuration and, therefore may be located in any desired location irrespective of the presence of transmission cabling. A self-contained power supply can be provided or, where available, the box may be connected to the local power source system with integral emergency back-up in the well-known manner. The box may include any combination of signal switches such as "FIRE" 602, "MEDICAL" 604, "SECURITY" 606 and the like. When activated, a signal will be transmitted to another station via the wireless communication system as indicated by the WLAN or wireless carrier antenna 608, by way of example. In the preferred embodiment, the box can include a microphone 611 whereby the user can communicate with the base station, a video camera 610 for provided visual identification of the person operating the system and an display panel 612 where instructions may be presented by the server. An infrared (IR) LED illuminator 614 may be provided to permit illumination in total darkness. For certain types of applications, such as a fire, an audible alarm 616 is incorporated and may be programmed to be automatically activated by pulling the appropriate switch, or programmed to be activated when the base station sends an activation signal. Voice can also be generated at audible transducer 616. Other detectors such as, by way of example, a smoke detector 618 may also be incorporated for automatically sending signals to the base station. Temperature detection may also be provided.

Figure 13:
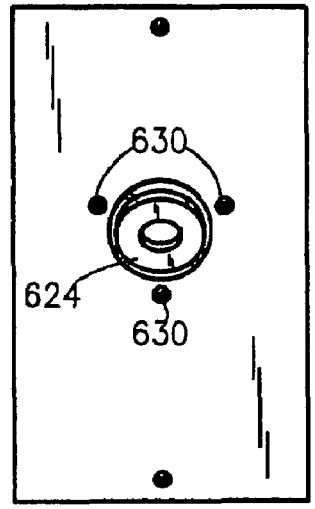
Figure 13A:
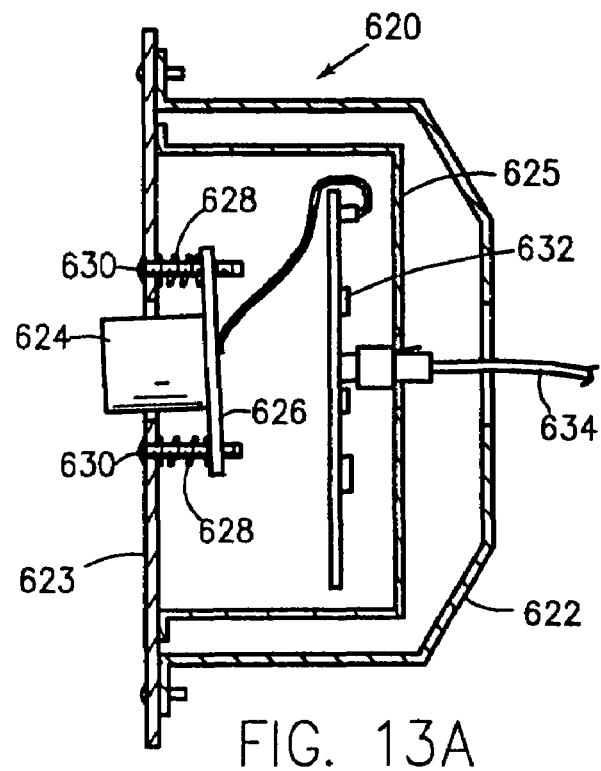

A basic network video camera appliance is shown in FIG. 13. The camera unit 620 includes an electrical box 622 with an open mouth having flanges for supporting a mounting plate 623 in which camera and lens 624 are mounted. In the embodiment shown, the camera and lens are mounted directly on a wobble plate 626 which is spring mounted via compression springs 628 in a triangular arrangement via adjustment screws 630 for providing universal adjustment and aiming of the lens. The circuitry is mounted on a circuit board 632, which is mounted in the chassis 625. A wired network connector is provided at 632 for LAN wiring 634.

The wiring diagram for the camera appliance is shown in FIG. 14. The lens 624 is in communication with a PC imaging chip (CCD and Analog-to-Digital (A/D)) 634 for transmitting the raw image data signal to the processor 636 which is pre-programmed as indicated at program memory 640. The network interface is provided at 644 for connecting to the network via a coupler such as the RJ-45 connector 648. The internal power supply circuitry 646 may also be connected via the RJ-45 coupling or may have a separate connection to a power source such as a wall power unit or battery system. The network wiring connector is indicated at 650.

As shown in phantom in FIG. 14, a mass storage device, such as a flash RAM or a hard drive, is added for local storage of motion video, step video, and/or images. This is recorded in an "endless loop" format. If an event is detected, this provides history before the triggering event. The data can either be removed physically, or preferably, downloaded after the event over the network. The full motion video stored locally may be in higher resolution than the streaming video sent over the bandwidth-limited network. This would provide for a high-resolution archive of full motion video associated with an event. Also, streaming video is switched on and off upon demand. The hard drive may be used to continuously store data even if the streaming video is off. The mass storage device may also be used to store audio, temperature, etc., as sensors provide, and can preserve pre-event historical data.

Figure 16:
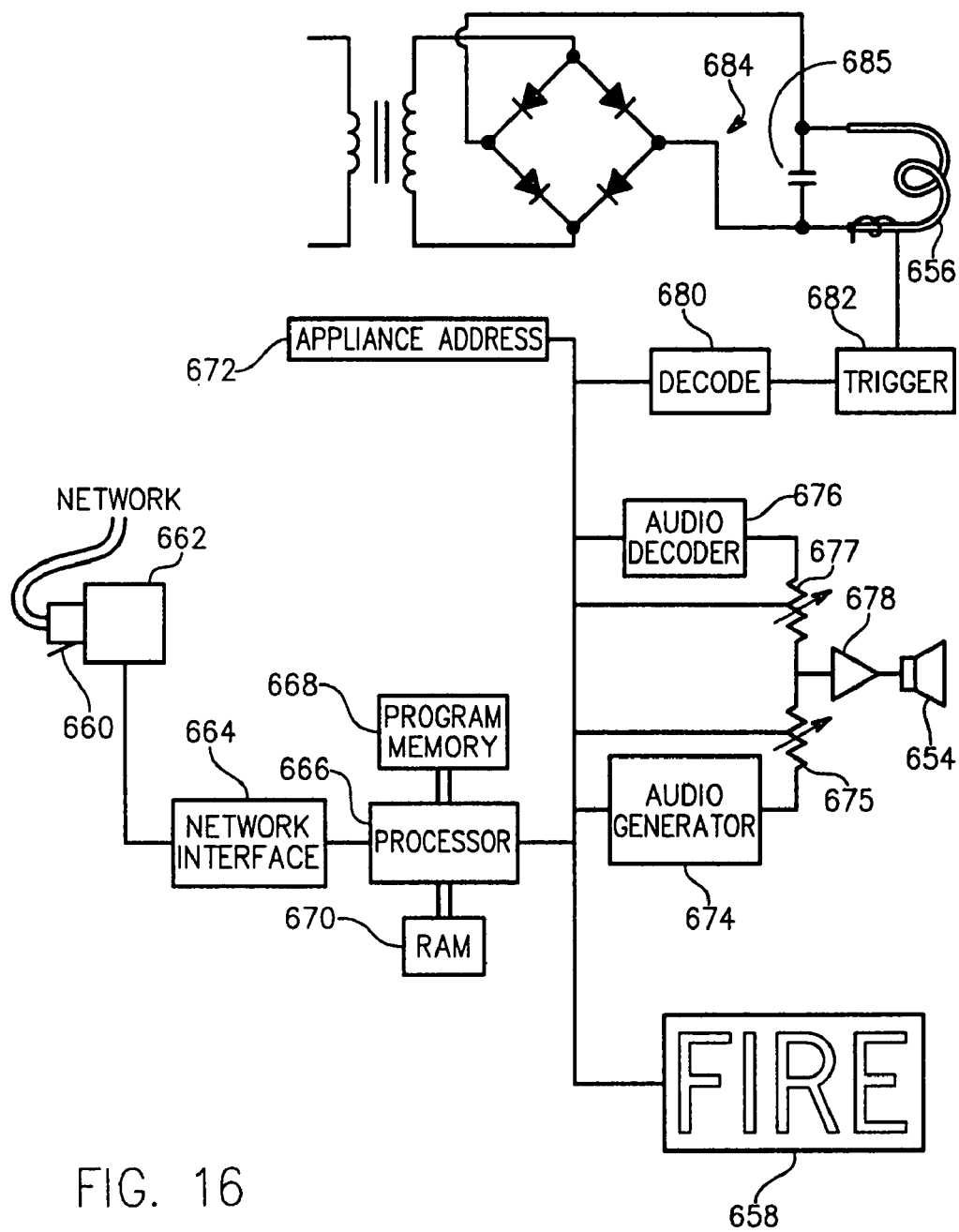

A signaling transducer unit adapted for use in connection with the surveillance system of the subject invention is shown in FIG. 15. An audio transducer 654 such as a horn, a loudspeaker or the like provides audio signals, with an LED, LCD or other display panel 658 providing critical information and an attention drawing device 656 such as a xenon strobe lamp or the like provide, as well. The circuitry for the signaling appliance of FIG. 15 is shown in FIG. 16. The unit is connected to the network via an RJ-45 connector set 660, 662 via a network interface 664. A processor 666 with program memory 668 and RAM memory 670 is provided to control the unit in response to control signals sent via the network for activating the various signaling devices such as the display 658, the horn/speaker 654 and/or the strobe lamp 656. The appliance address store 672 communicates with the processor to provide unique identity and network address in typical manner. Also, as is typical, a decode circuit 680 and a trigger circuit 682 are provided for the xenon flash lamp 656. An integral charging circuit 684 is also provided to charge the energy storage capacitor 685.

Figure 17:
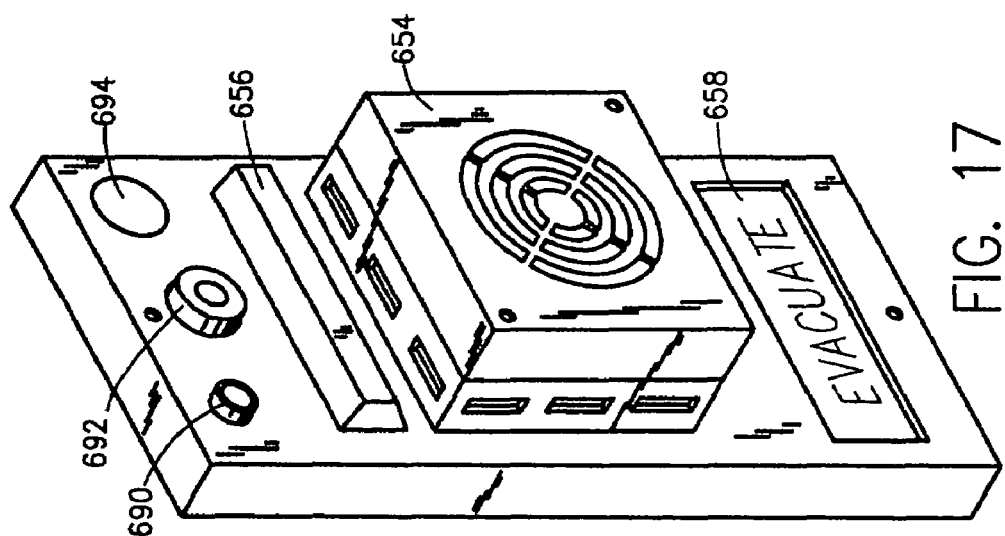
Figure 18:
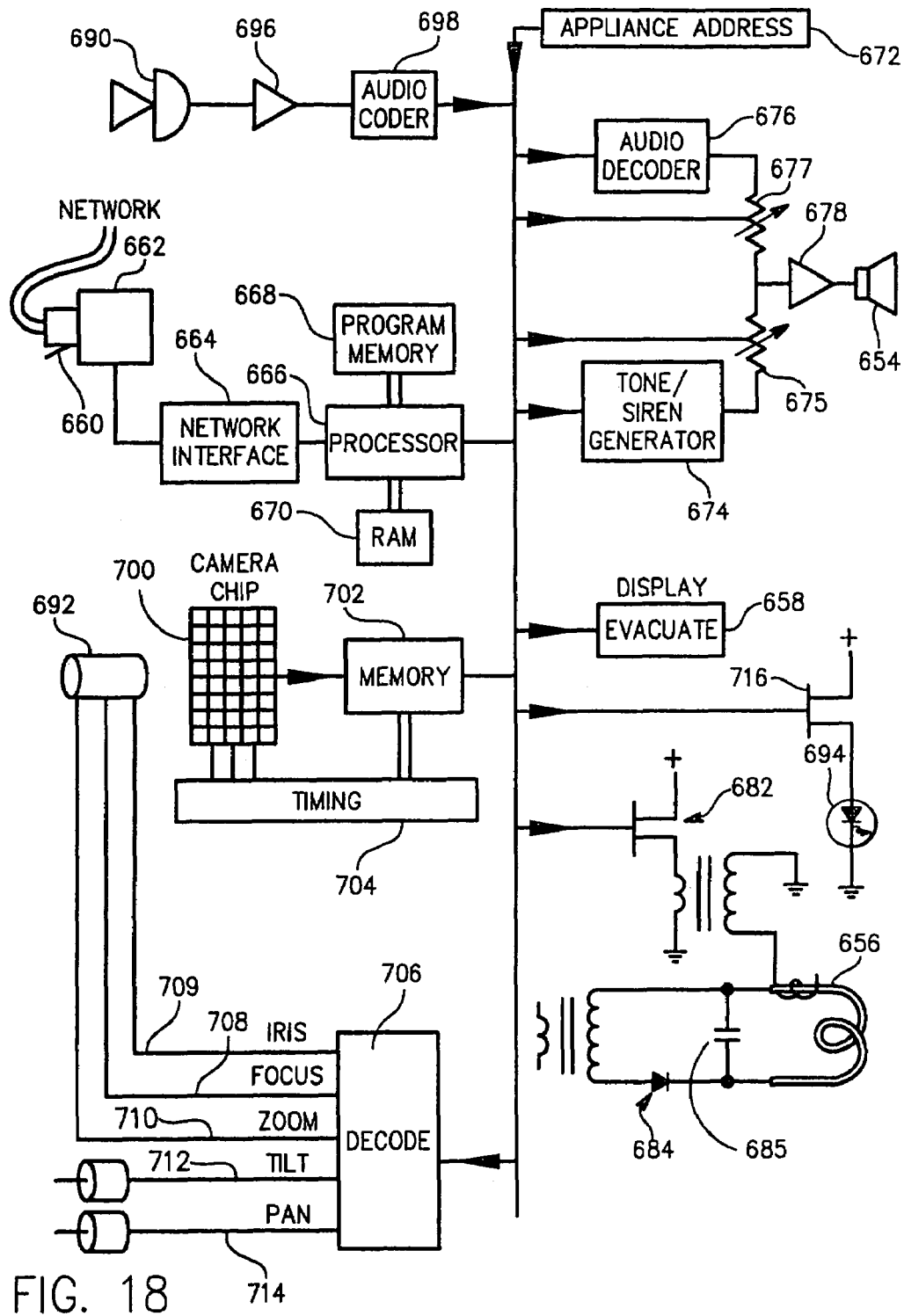

An audio decoder 676 and tonal/siren generator 674 are coupled to respective gain circuits 677 and 675 and introduced to amplifier 678 for driving horn/speaker 654. An expanded signaling transducer appliance with integral sensor capability is shown in FIG. 17. This unit incorporates he signaling transducer of FIG. 15 with a basic camera configuration such as that shown in FIG. 13, an illumination device 694 and an audio sensor 690. The basic circuitry for this unit is shown in FIG. 18. The processor 666 processes the signals from the microphone 690 and the camera 700 for transmission via the network. The microphone signal is amplified at the pre-amplifier 696 and decompressed at audio coder 698. The lens 692 is in communication via the camera module 700 with the memory 702 and the timing circuit 704. The lens is controlled the decoder 706 to provide focus 708, iris 709, zoom 710, tilt 712 and pan 714. An infrared LED 694 provides illumination for the lens during low-light conditions and is controlled by the processor 666 and driven by the transistor 716.

Figure 19:
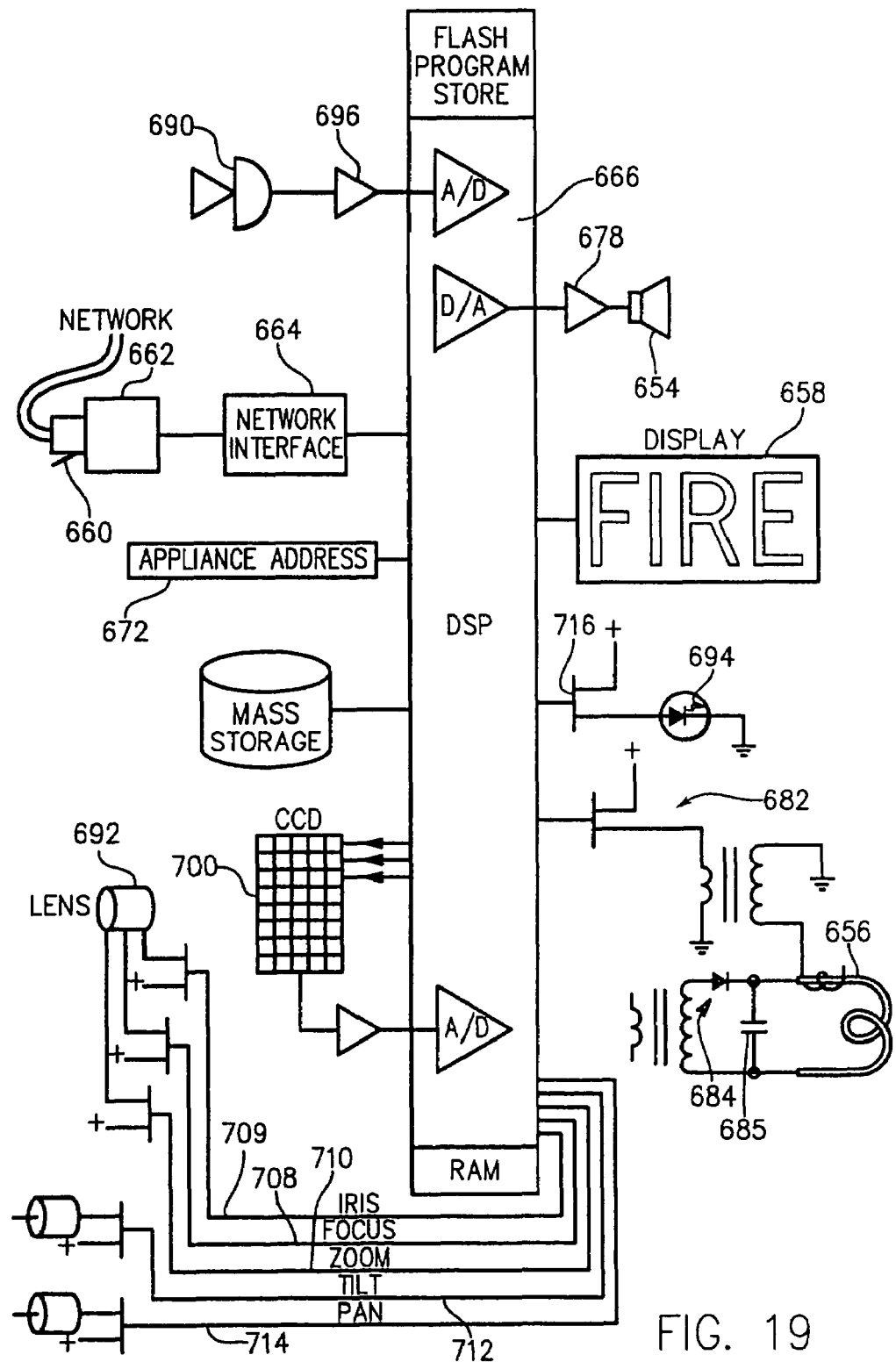

An alternative circuit for appliance system of FIG. 17 is shown in FIG. 19, showing a more highly integrated implementation using the DSP 666 as the control unit. Like reference numerals represent the same components as those in FIG. 18. The DSP processor provides many of the functions of the discrete components of FIG. 18.

Figure 20A:
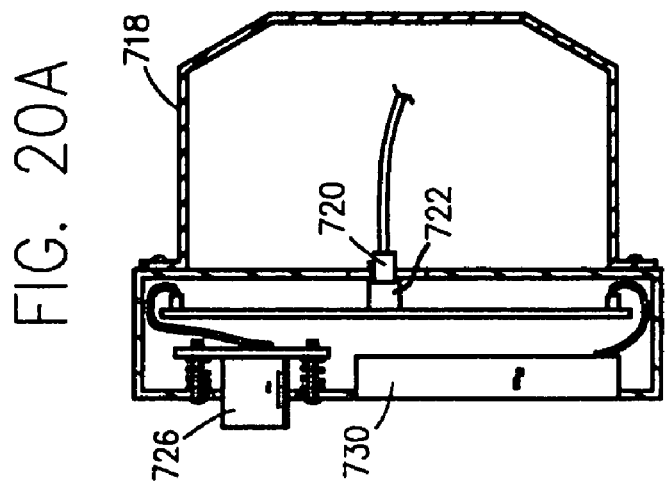
Figure 20:
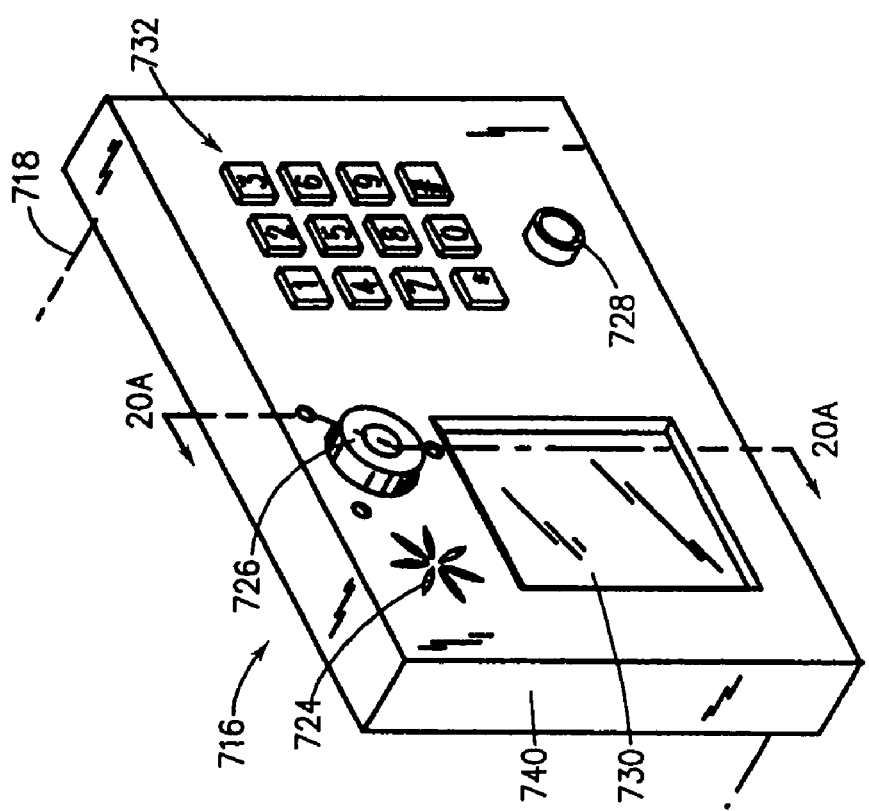
Figure 21:
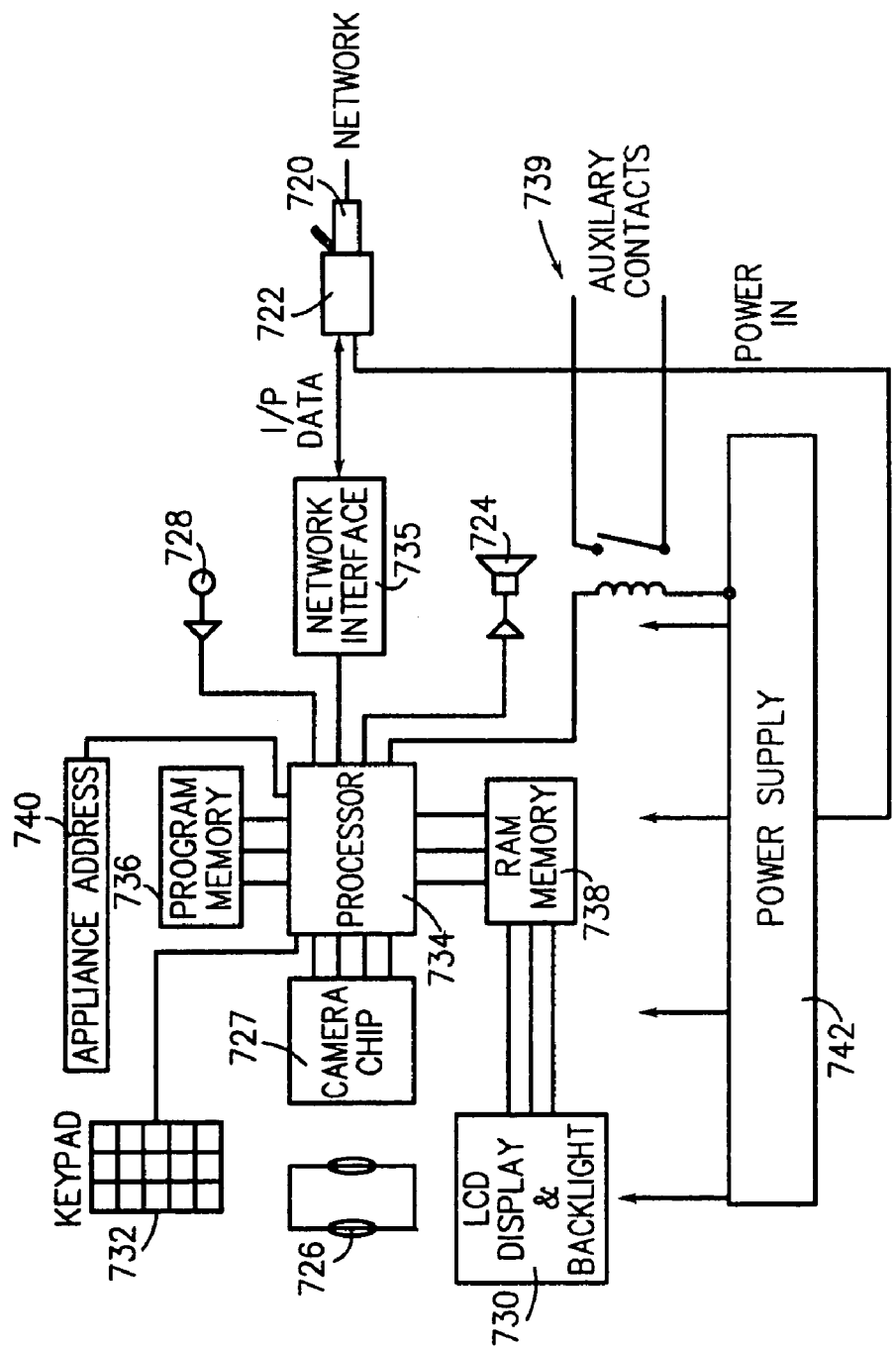

A hardwired network video intercom appliance is shown in FIG. 20 and, as with the various appliances of FIGS. 10 through 19, the intercom 716 is designed to be mounted in a typical electrical wall box 718 with a network connector such, by way of example, the RJ-45 connector jack 722 and plug 720. The intercom includes and integral speaker 724, a camera 726 and a microphone or audio pick-up device 728. A video display screen 730 is provided and a keypad-input panel 732 allows the user to input alphanumeric information as well as audio and video. The basic circuitry for the intercom is shown in FIG. 21 and as with the previously described appliances, relies on a processor 734 for controlling the unit which is in communication with the interface 735 for communicating via the network. The power supply 742 is also connected to the network wiring through the connector plug and jack set 720,722. A separate external power source may also be used when the network is not configured to provide power. The circuit is provided with an appliance address module 740 for identifying the unit, a program memory module 736 and an on board RAM memory component 738. As with the previously described camera units, a camera chip 727 is in communication with the camera lens 726 for collecting the raw video data and introducing it to the processor. The camera chip may have self-contained analog to digital converters, such as shown, or external converters.

Auxiliary contacts 739 are supplied for control of external devices, such as an electric strike to unlock a door. The auxiliary contacts may then be operated in conjunction with a keypad, or the keypad and the server, thus providing access control, whereby an image of the person attempting or completing access may be collected. The camera may also be used for visual evaluation of the person desiring access prior to access and/or the person's identification. This can be done with human assistance or with computer image processing and facial recognition. Other biometric sensors may also be configured.

Figure 22:
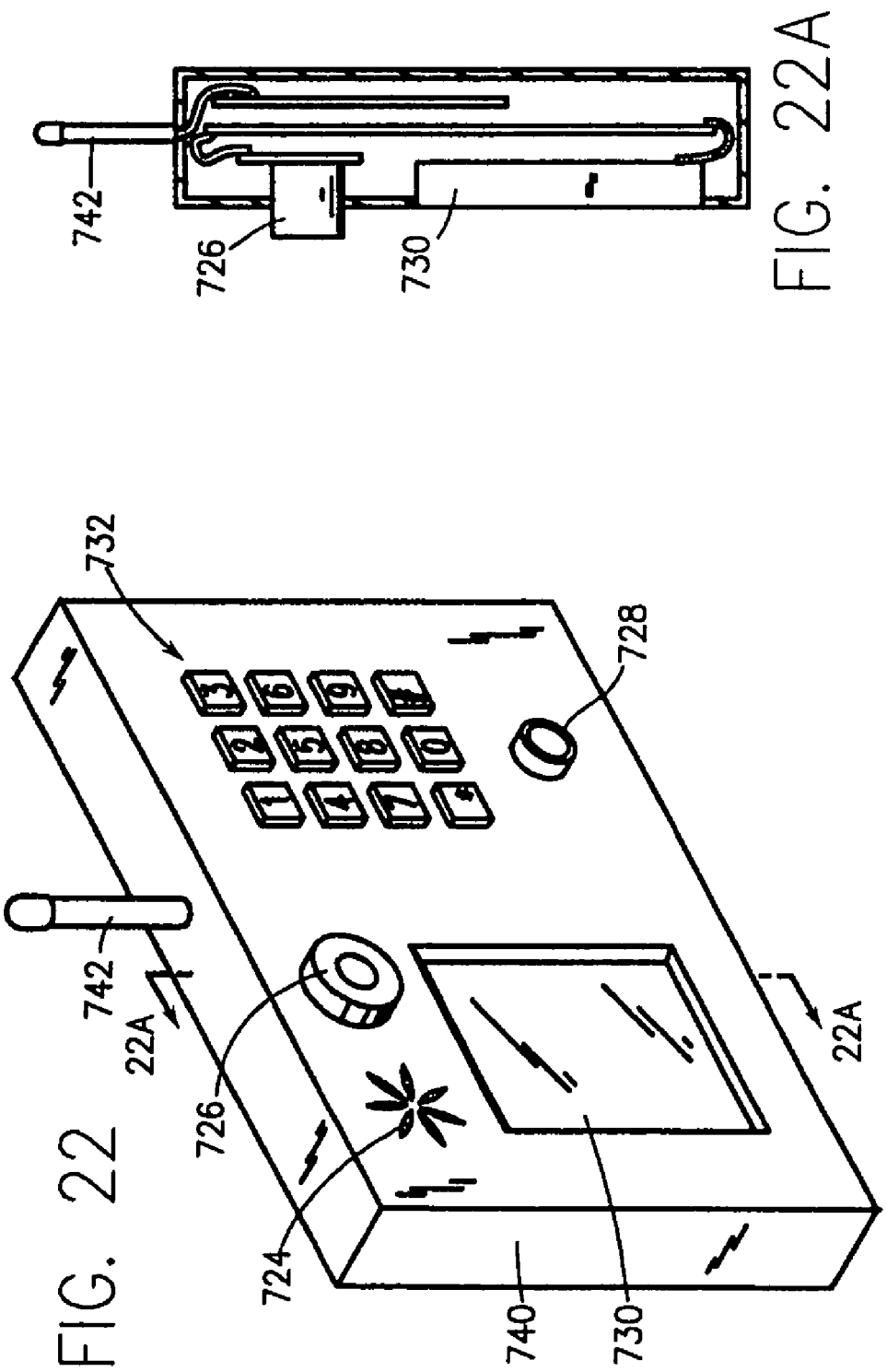
Figure 23:
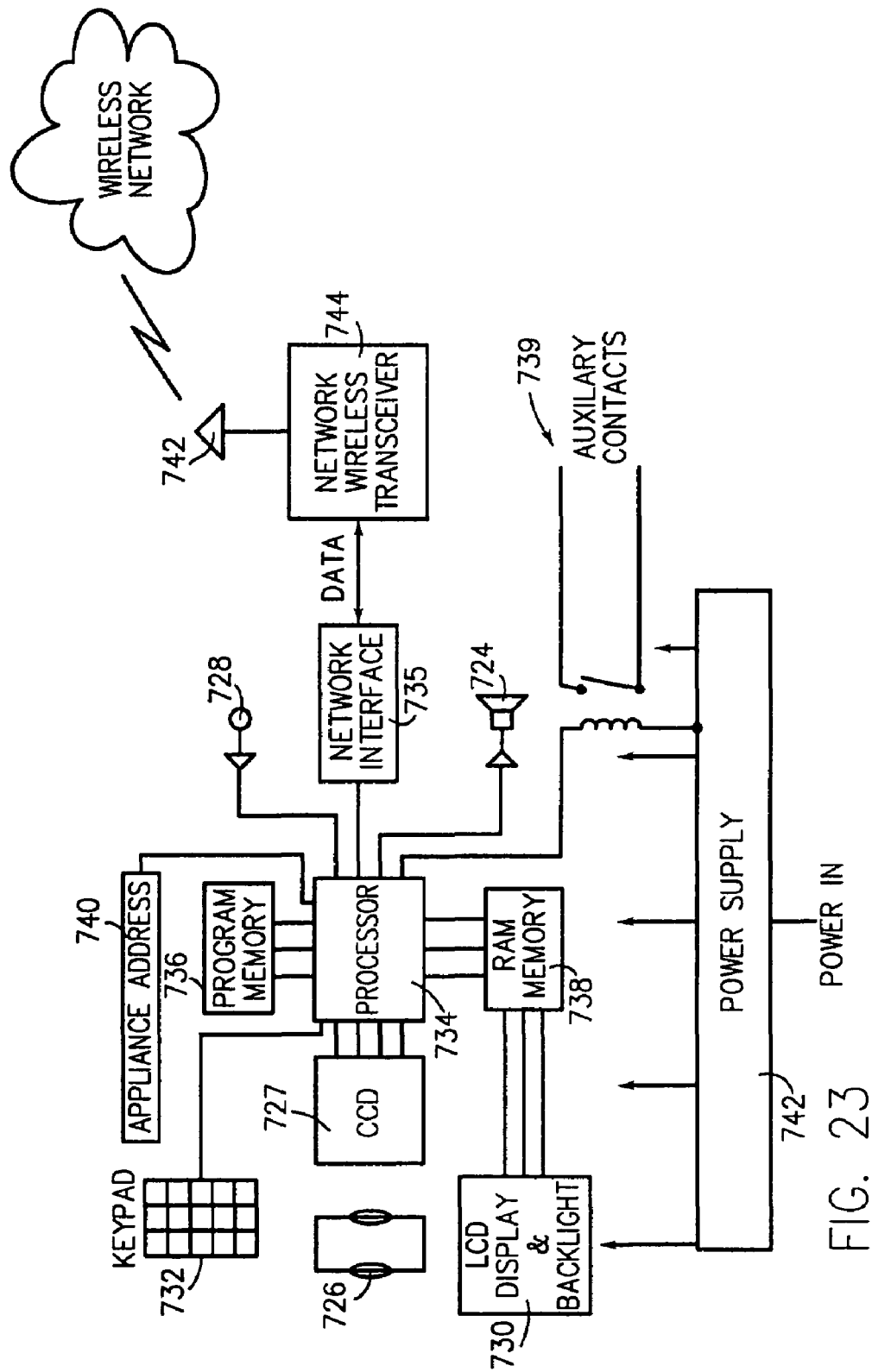

FIGS. 22 and 23 illustrate a wireless version of the network video intercom appliance shown in FIGS. 20 and 21. This device is fully self-contained in a mountable box 740 and includes and integral wireless transceiver and antenna 742 for wireless network communication. All other features of the unit shown in FIG. 22 correspond to like numbered units in FIG. 20. The circuitry is also the same, with the exception that the interface 735 is connect to a wireless network such as a WLAN or wireless carrier via a WLAN or wireless transceiver 744 and the antenna 742.

Figure 24:
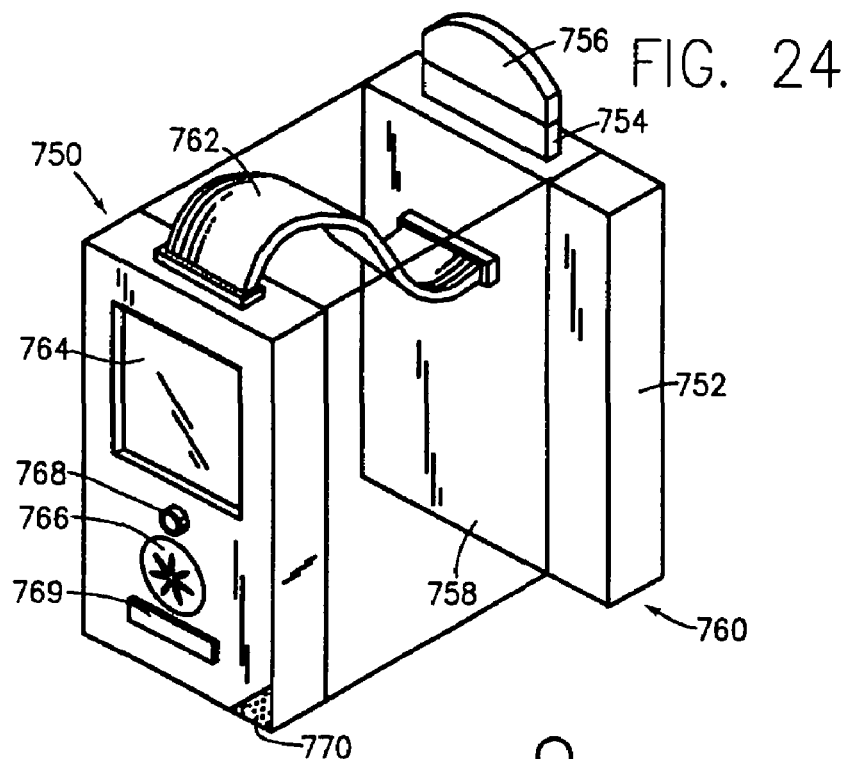
Figure 24A:
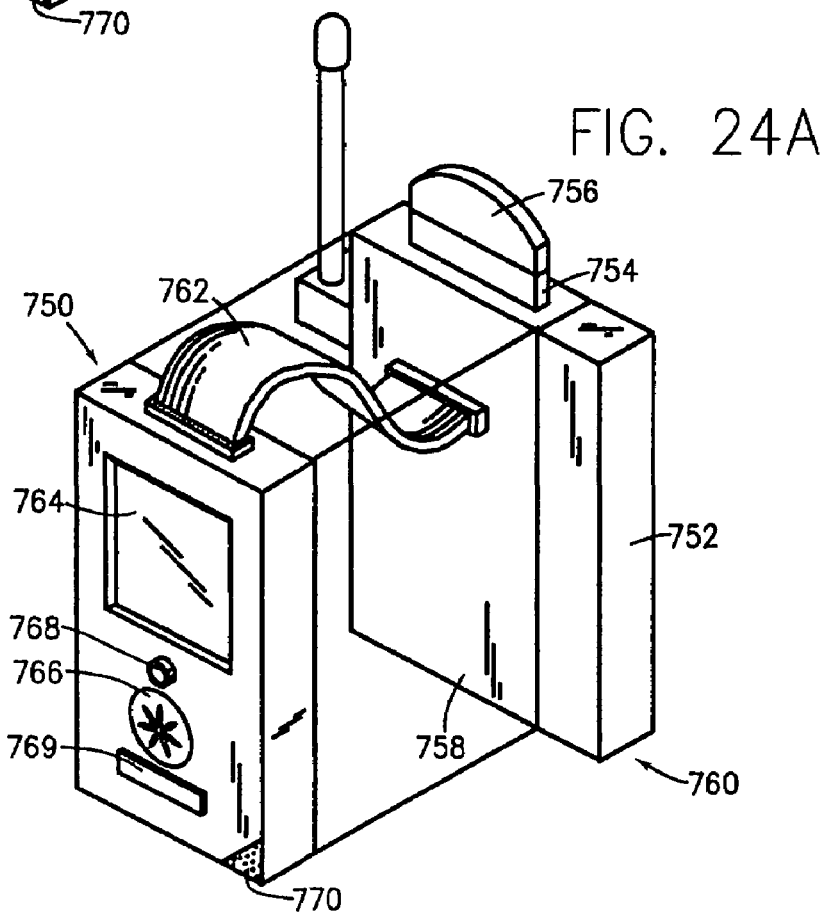
FIG. 24a is an exploded view of a basic portable video unit with an integral GPS capability.

A portable video monitor unit or PDA 750 is shown in FIG. 24 with associated circuitry shown in FIG. 25. This device can be assigned to roving security personnel and the like and is fully self-contained with a battery pack 752, wireless adapter such as the WLAN wireless carrier adapter 754 and antenna 756 mounted on a PCMCIA adapter 758 to provide a compact flash adapter module 760 with auxiliary power source. The module 760 is mounted on the back of the PDA 750 and is electrically connected thereto in suitable manner such as via the flat cable 762. The PDA 750 includes an LCD display screen 764 as a user interface and displays still video, streaming video, graphics, maps and alphanumeric text. A speaker 766 is also provided, as well as a microphone 768, for audio communication. Function keys 769 are also provided. In the illustrated device an infrared element 770 is included for sending and/or receiving an infrared signal to various sensor stations within the system for identifying the precise location of the PDA at any given time. This link may be implemented with RF or acoustic means as well. This is particularly useful even when GPS systems are utilized since GPS signals are unreliable and/or unavailable inside buildings or certain structures. A camera may also be provided. A card reader such as a magnetic strip reader may also be included, as well as a finger print scanner, further increasing the identification capability of the system. This would permit on-site positive identification by fingerprint, and verification of authorization based on data contained in the data storage device of a card, such as, by way of example, a student identification card. Both the finger print scanner and the card reader would convert the input data into a digital data for transmission via the wireless system, in the manner here described.

The basic block circuitry for a preferred embodiment of the PDA 750 is illustrated in FIG. 25. All of the function modules are controlled by an SH-3 or equivalent microprocessor in the well-known manner. The infrared sender unit includes and IR control 774. The speaker 766 and microphone 768 communicate with the microprocessor through an audio interface 776. A display controller 778 provides the interface between the display screen 764 and microprocessor. A keyboard interface and controller 780 is provided for the function keys 769. A RAM module 782 and a FLASH RAM module 784 are also provided. The microprocessor and system communicates with the wireless network through the wireless transceiver 754 and antenna 756.

Figure 25A:
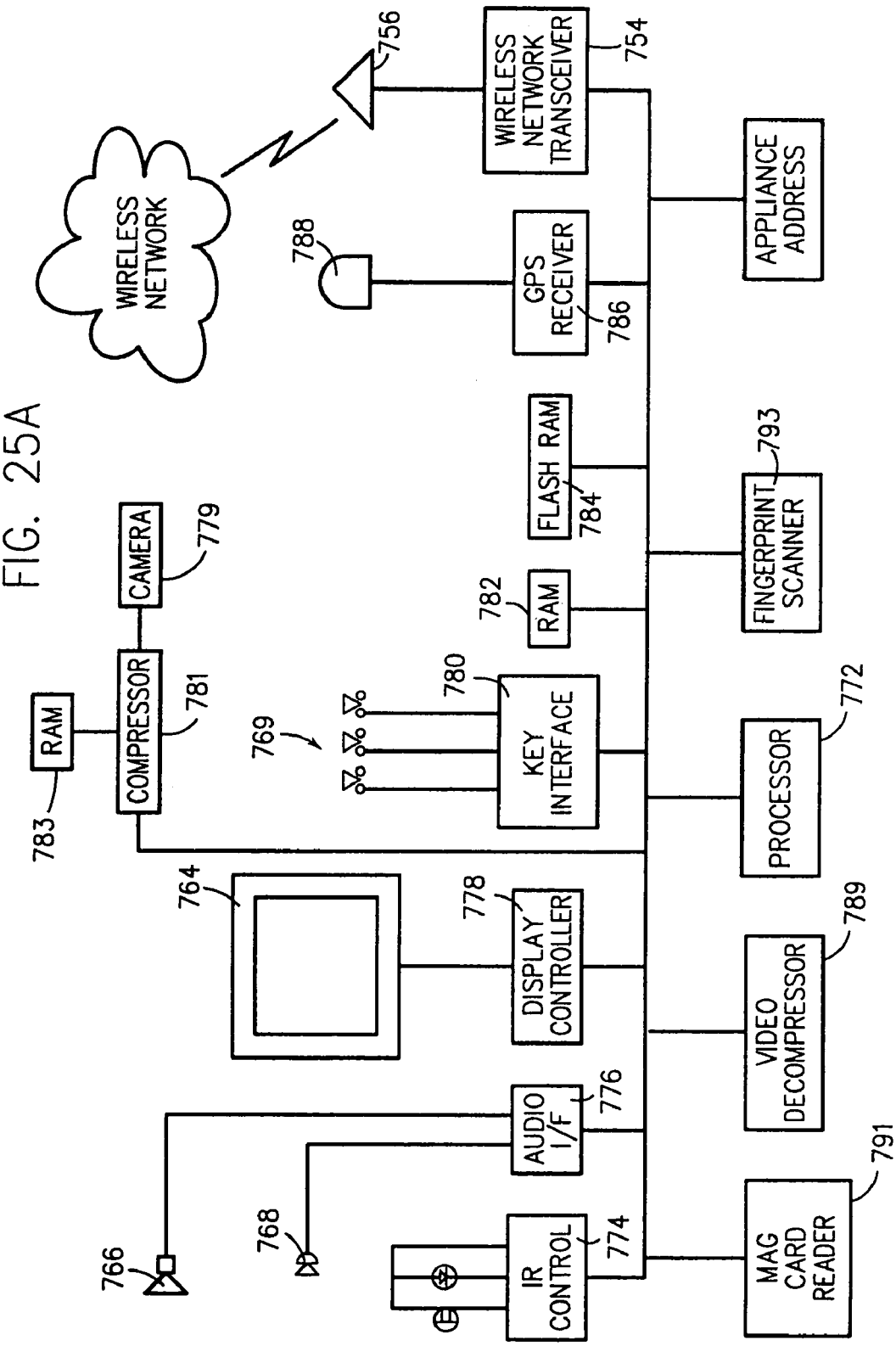
FIG. 25a is a basic block diagram circuit for the security PDA appliance with an integral GPS module, magnetic stripe reader and fingerprint scanner.

The circuit of FIG. 25*a* is an expansion of the system shown in FIG. 25 and includes an integral GPS receiver 786 and a GPS antenna 788, whereby the GPS location of the PDA may be monitored. An optional hardware decompressor 789 is provided for motion video decompression and display for formats that cannot be decompressed in software, such as MPEG-2 format. As shown in FIG. 25*a*, a camera or CCD image device 779 along with a compressor 781 and a dedicated RAM 783 may also be included. Where desired, a magnetic card stripe reader 791 and a fingerprint scanner 793 may also be included as input appliances. A variety of biometric devices may be included as well.

Figure 26:
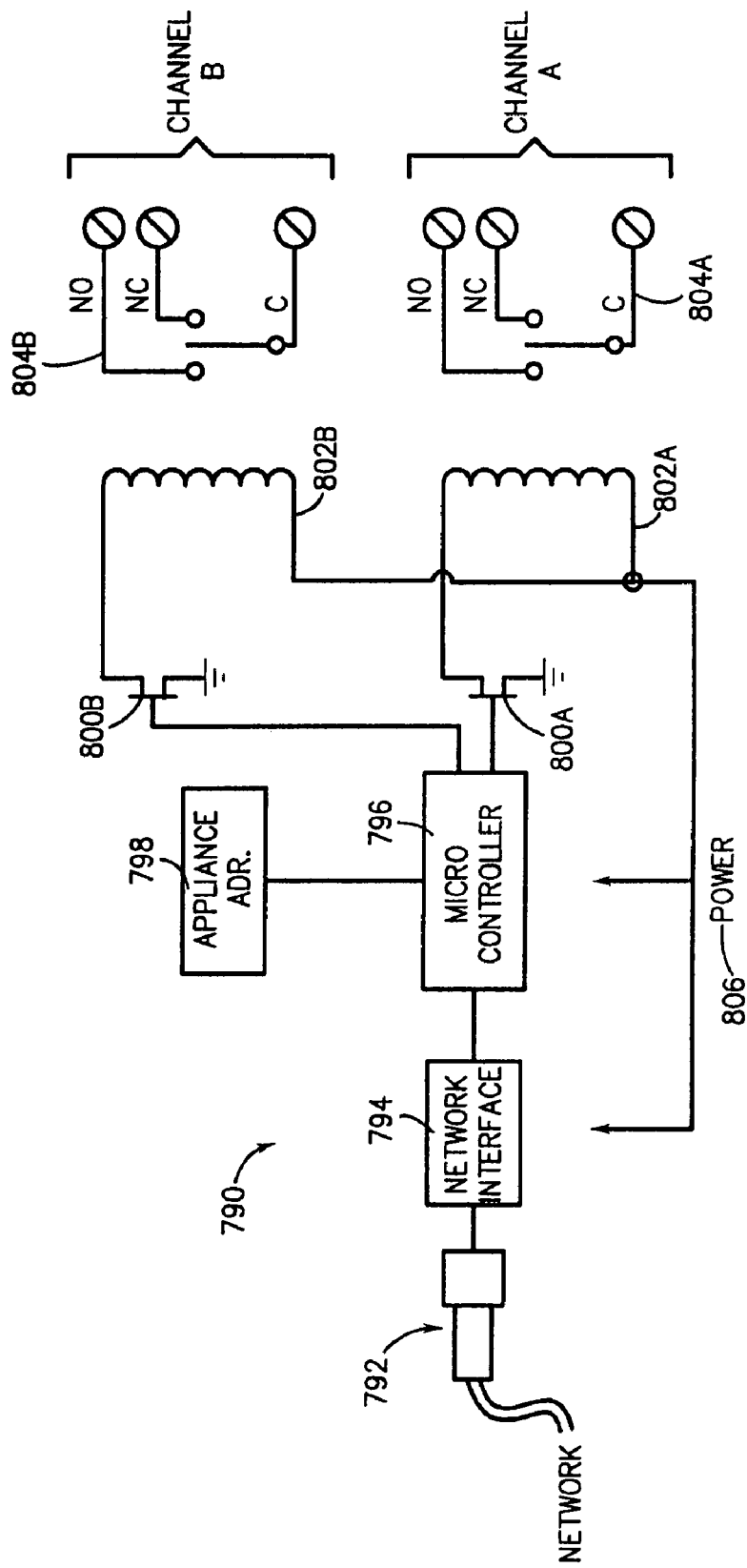
Figure 27:
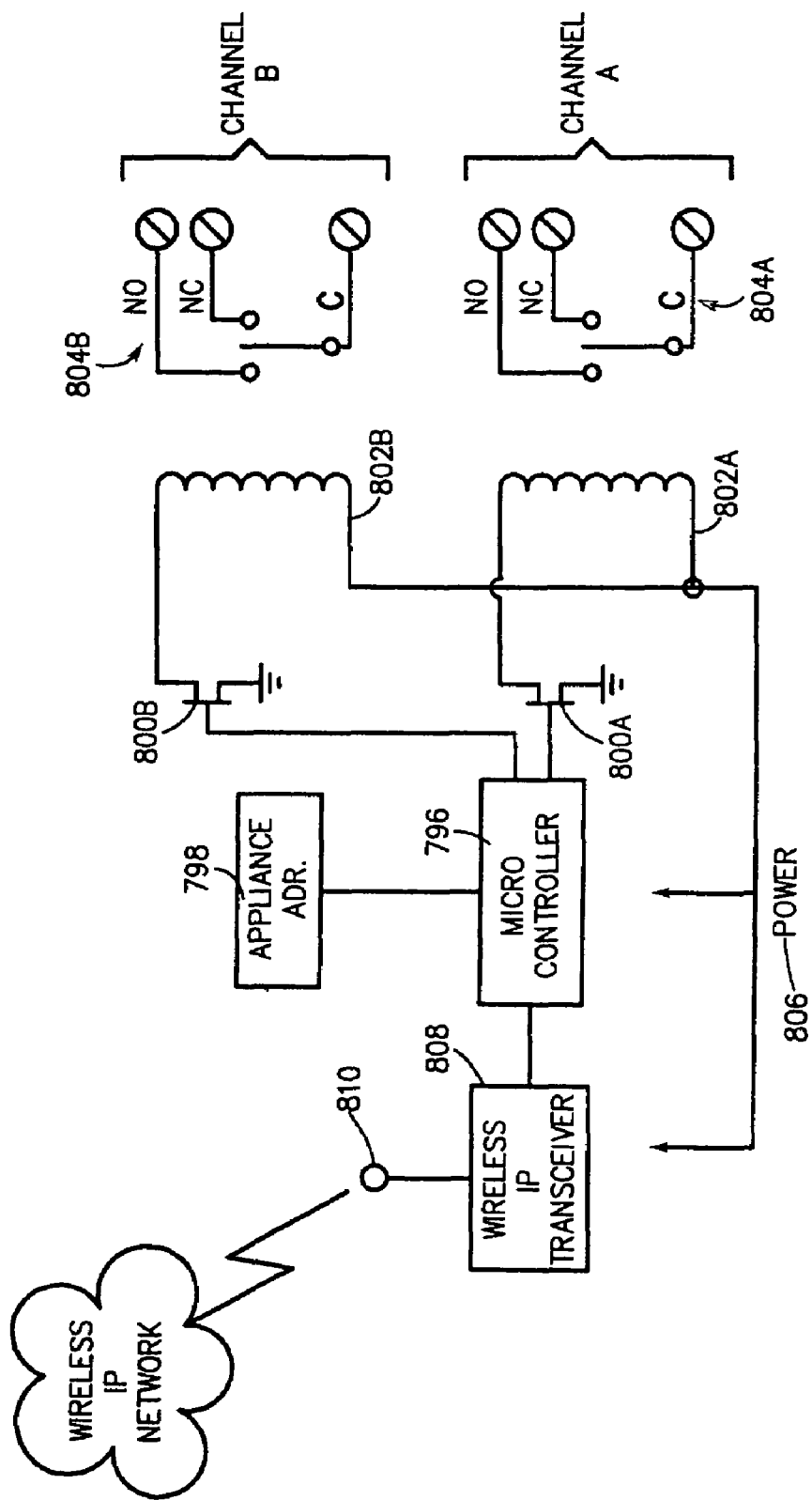

An interface network appliance is shown in FIG. 26 and may be used for such functions as providing dry contacts for controlling lights, sirens, motors, door strikes and the like. In the hardwired version as shown, the interface 790 is connected to the network via the connector plug and jack set 792 through the LAN interface 794, which is in communication with the microcontroller 796. An appliance address circuit 798 is provided in communication with the network through the microcontroller 796. The number of channels controlled is a based on the application and the two-channel system shown here is for purposes of discussion only. The micro controller controls the contact circuits for channels A and B in the well-known manner using a transistor switch 800A, 800B respectively, associated with each channel for driving a related coil 802A, 802B for controlling the contact sets 804A and 804B, respectively. Power may be hardwired through the network or independently, as indicated at 806. The same interface reconfigured for a wireless network or other wireless carrier is shown in FIG. 27. Like components are similarly numbered, with the wired interface and plug/jack set being replaced by a wireless transceiver 808 and antenna 810.

Figure 28:
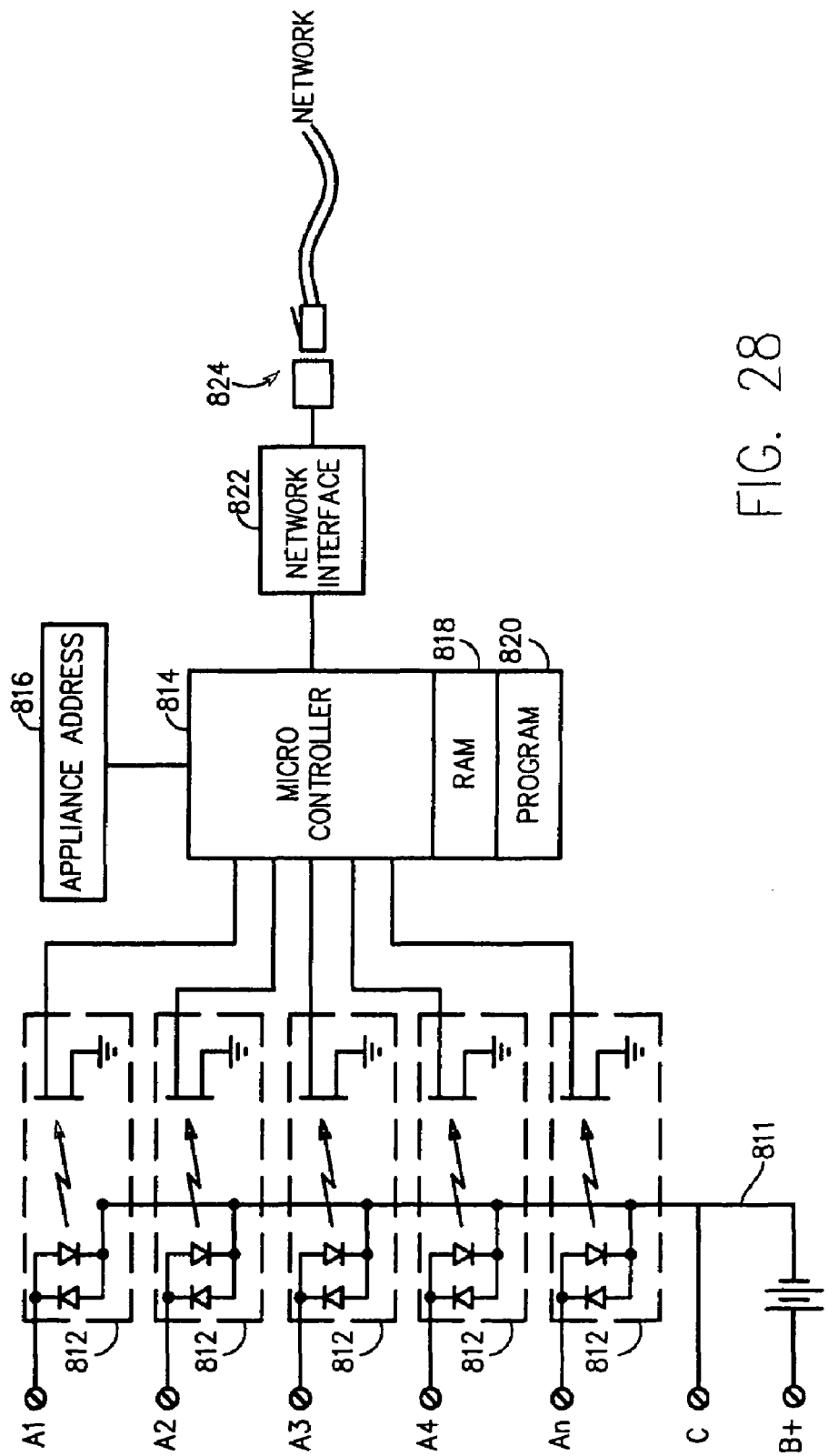
Figure 29:
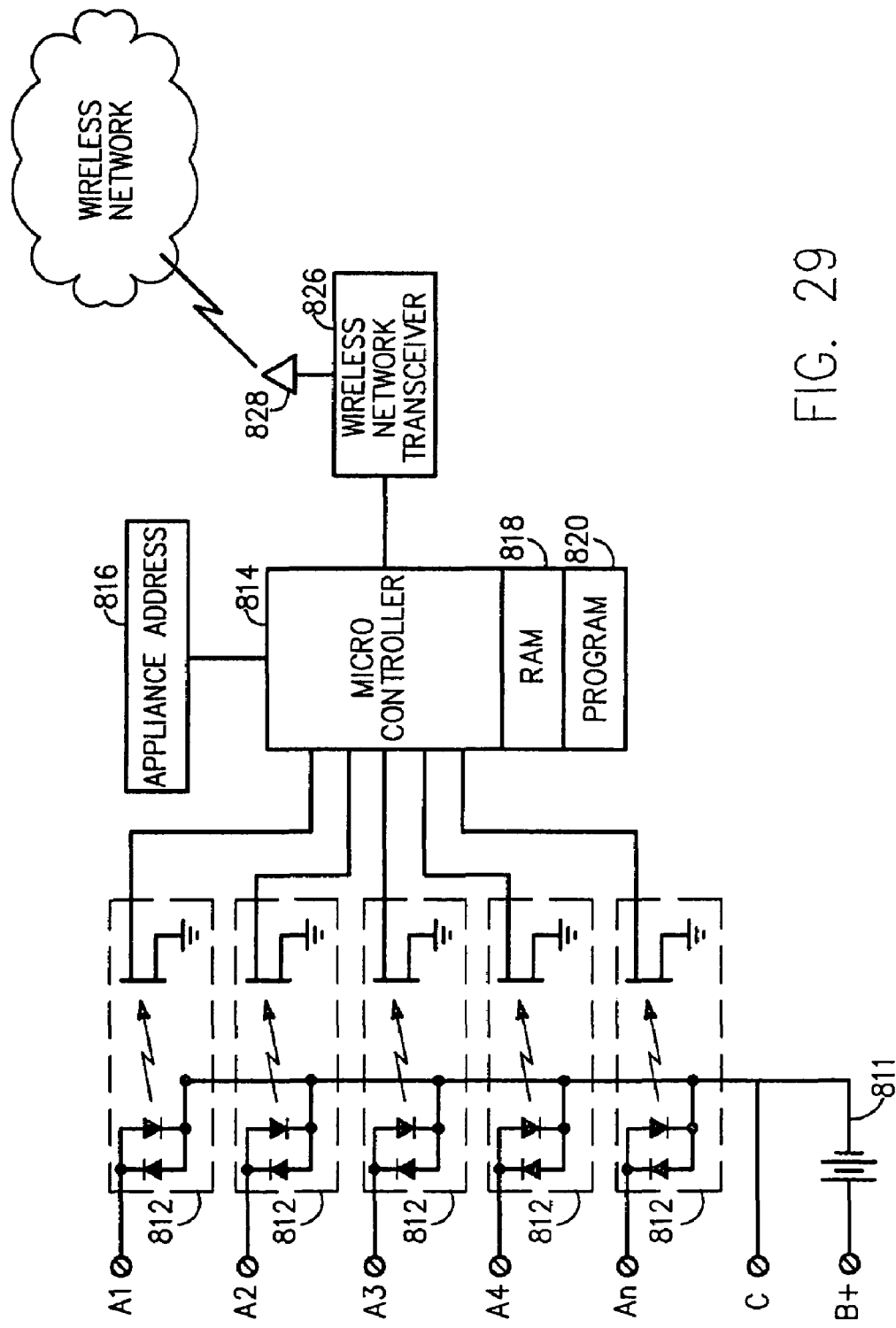

An optoisolated sensor interface network appliance is shown in FIG. 28 and provides an isolated contact interface. This sensor readily permits sensor control and monitoring of various external device functions. For example, door contacts, motion sensors, switch contacts, alarm contacts, environmental sensors or any device that would create an "event" or to log or to initiate a responsive action may be controlled using the Optoisolated sensor appliance in lieu of more common hardwired devices. As shown, the number of channels A1–An is a factor of the particular application. The interface can either receive voltage levels on A1–An with return terminal C, or can sense circuit closures using internal power source from terminal B. An opto/isolator 812 is provided for each channel and is sensed by the microcontroller 814. An appliance address circuit 816 is provided as well as on board RAM 818 and program module 820. The system communicates with the network through the interface 822 and the connector plug and jack set 824. A wireless version for use in connection with a wireless network is shown in FIG. 29. Like numbered components have the same function. The interface and connector plug and jack set are replaced by the wireless network transceiver 826 and antenna 828.

Figure 30:
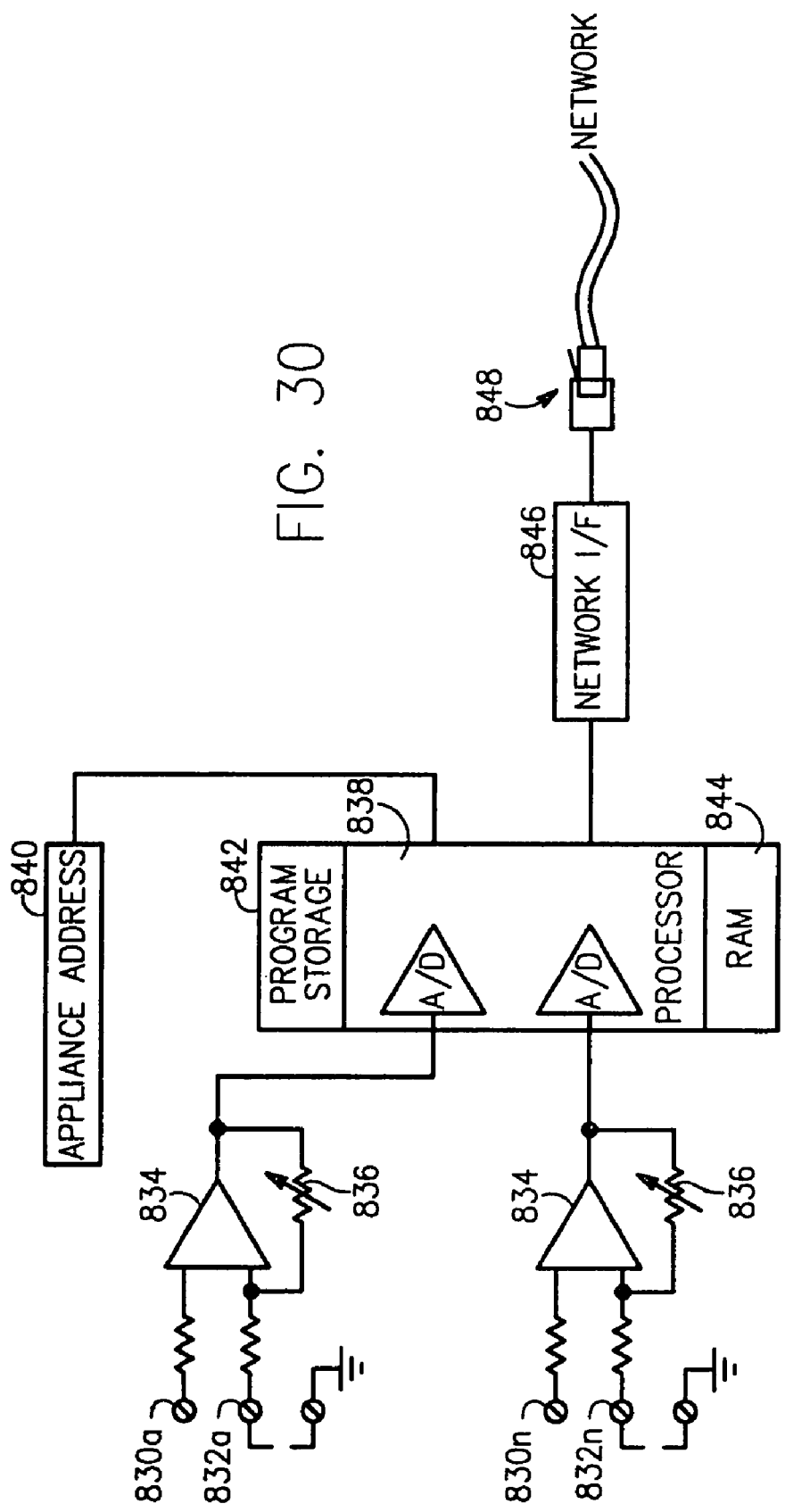
Figure 31:
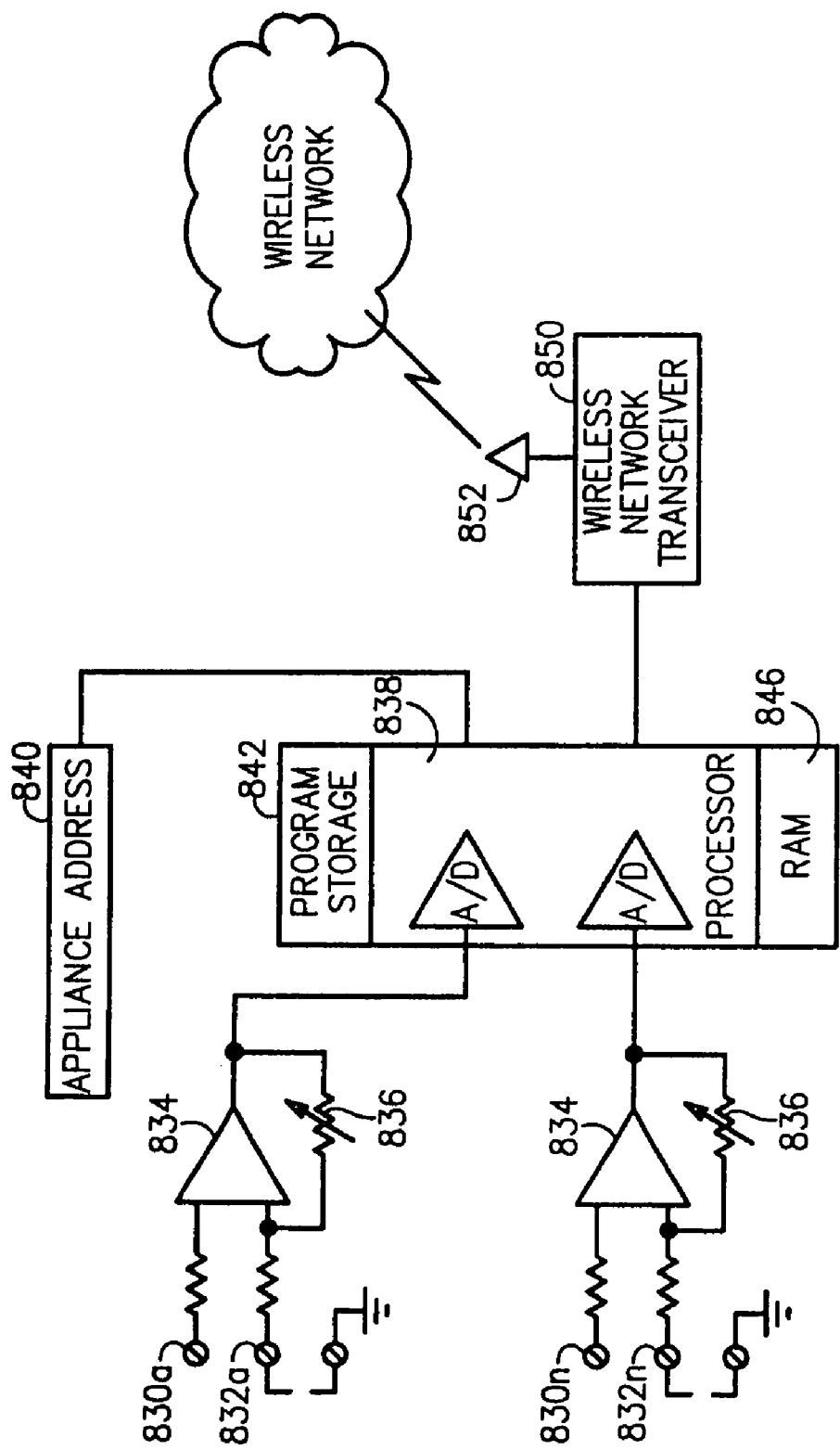

An analog sensor/interface is shown in FIG. 30 and includes any number of channels for collecting raw analog data as indicated at contacts 830*a*, 832*a* through 830*n*, 832*n*. Each channel has an associated amplifier 834 and gain control 836. A processor chip 838 provides both the analog-to-digital conversion and the control functions. An appliance address circuit 840, program store 842 and RAM 844 are provided, as previously described. The system communicates with the network through the interface 846 and the connector plug and jack set 848. A wireless version of this interface is shown in FIG. 31. Like numbered components have the same function. The interface and connector plug and jack set are replaced by the wireless transceiver 850 and the antenna 852. The preferred protocol for the network appliance is IP, or TCP-IP.

Figure 32:
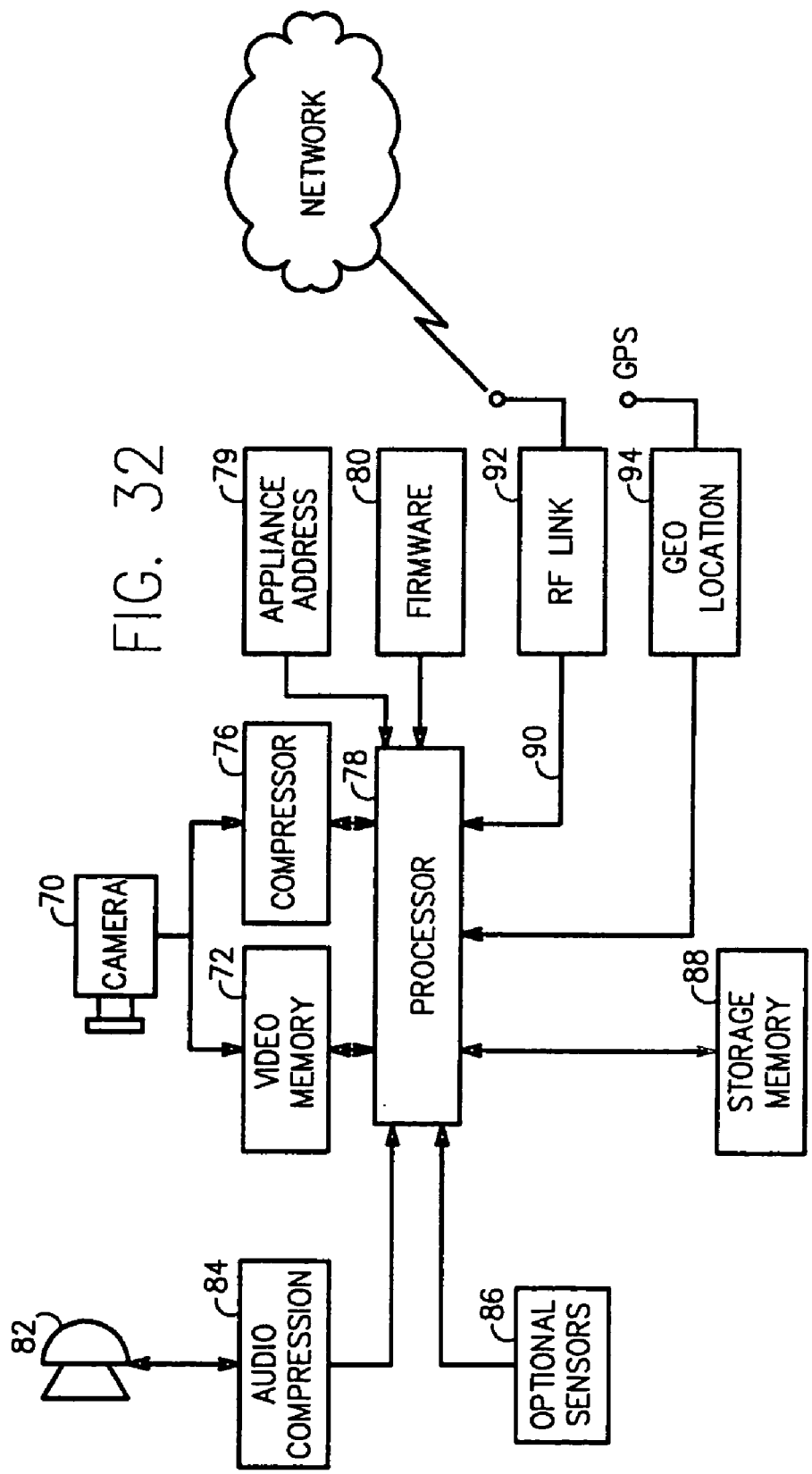

FIGS. 32–36 illustrate various camera/sensor configurations and applications. The circuitry for a basic camera/audio unit is shown in FIG. 32. This embodiment supports compressed full motion video, step video, still frame imagery, compressed audio, geolocation, RF link, and optional sensor component input. The processor 78 of the camera is programmed to operate in the manner described to support the functions of the multimedia surveillance system of the present invention. The camera 70 collects data for storage in the temporary video memory 72. The data may stored in its raw form or may compressed as JPEG, motion JPEG, MPEG, wavelet, and the like, as indicated at the video compressor 76. The compression and storage functions are controlled by the processor 78 as programmed and controlled by the firmware 80. The appliance address is stored at store 79. An audio sensor such as microphone 82 is also provided, and the raw audio signal is compressed at audio compressor 84. Various additional sensors 86 may be included as desired for each particular application such as a motion sensor, door contact, smoke detector, temperature detector or the like. A storage memory 88 is provided for recalling appliance and sensor data, as previously described. Where desired, the system can also be programmed to record continuously to look at all data before and/or after an event has occurred. The storage memory can record still or full motion video and be downloaded at a later time over the network. The storage memory can be a Flash RAM, hard drive or other memory or combinations of different memories. The output data is transmitted via an output line 90 and may be hard wired, or may be wireless and connected via an RF link 92 as indicated. Mobile cameras may include a geolocation system 94, as previously described.

Figure 33:
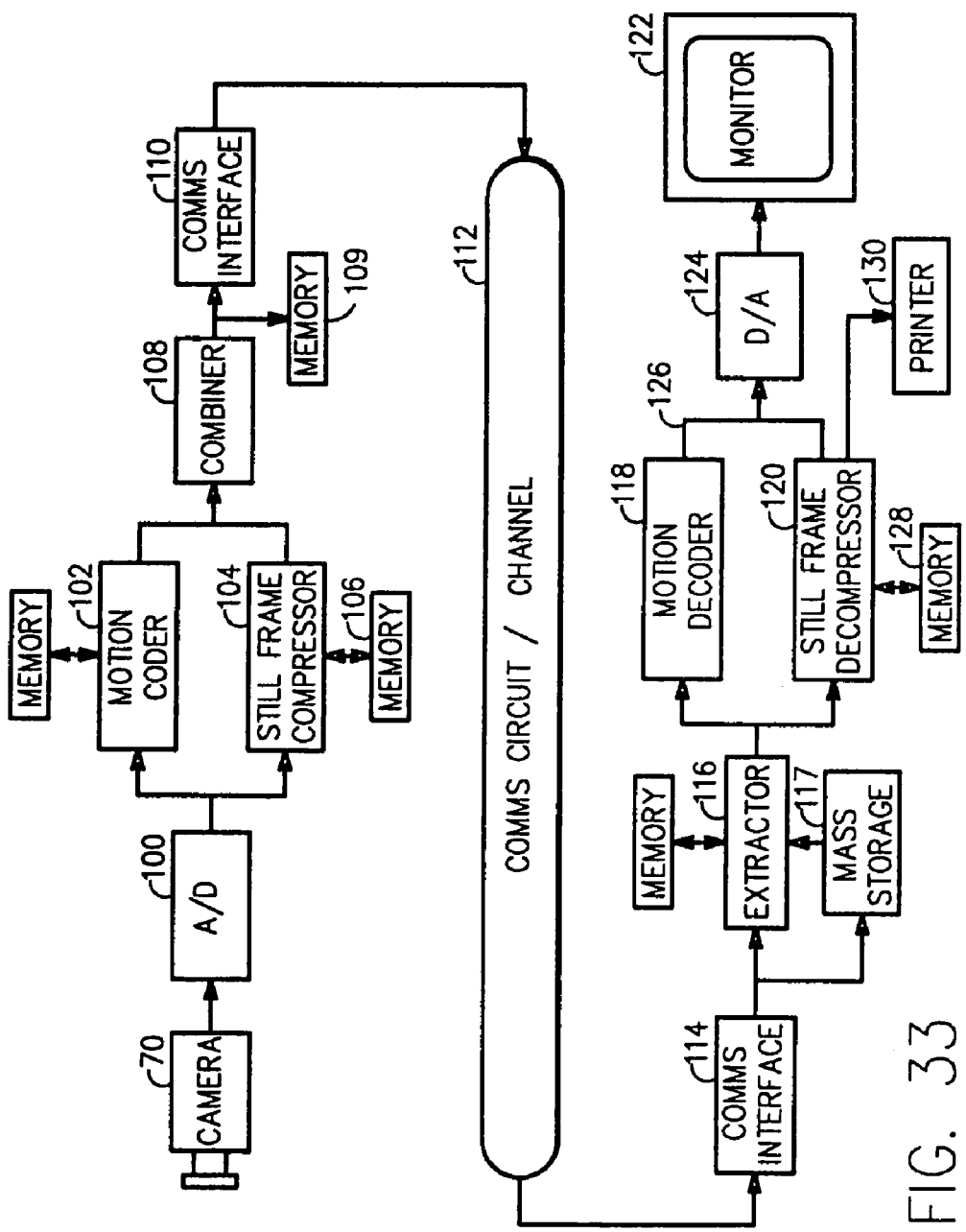
Figure 34:
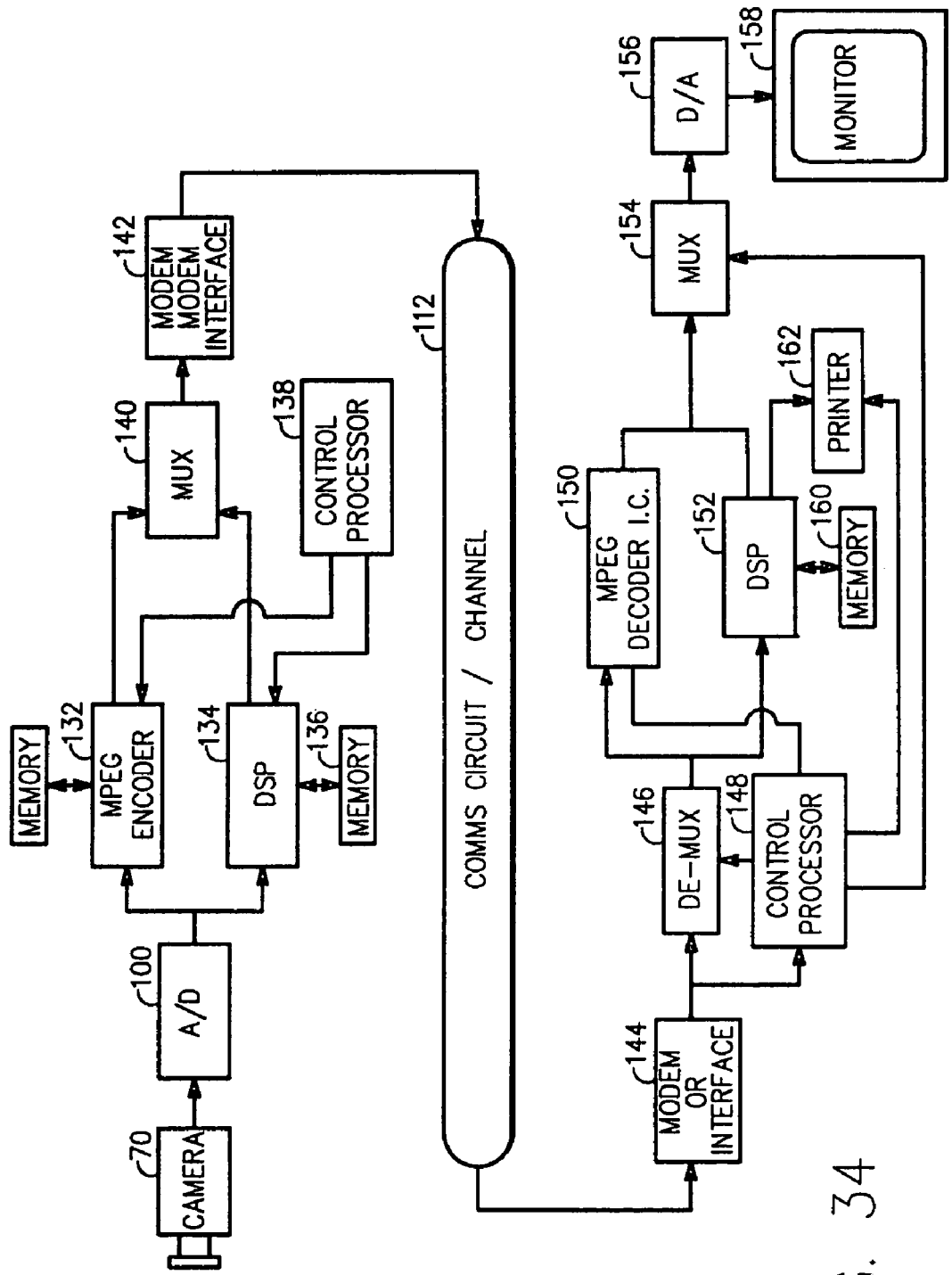

FIG. 33 is a flow chart of the information processed by the camera electronics and shows the camera 70 as an analog capture device communicating with an analog to digital (A/D) converter 100 for generating a digitized signal to sent to the motion coder 102 and the still frame compressor 104. As previously stated, the images are stored in the memory 109 for later recall and reconstruction of events. The data is combined at combiner 108 and transmitted via communications interface 110 the communications channel or circuit 112 such as, by way of example, cellular, RF, land line telephone, LAN, Ethernet, Internet and the like. The signal is then received at the communications interface 114 at a remote location and stored for archiving purposes at mass storage unit 117. The data is extracted at 116 and introduced into a motion decoder 118 and still frame decompressor 120. The output is then produced on the monitor 122 through the D/A converter 124. The switch 126 is used to select either motion video via motion decoder 118 or still frame images via the still frame decompressor 120. The still frames are stored in memory 128 and may be hard copy printed at printer 130. A block diagram of the camera circuit is shown in FIG. 34. In this embodiment, the digitized signal from the A/D converter 100 is introduced into the MPEG encoder 132 for motion video processing and the DSP 134, for still image processing such as motion detection and optional step video/motion processing, which includes a memory 136 for holding images. A control processor 138 controls the encoding and compression processes. The signals are then combined at a multiplexer 140 and introduced into a modem or interface 142 for delivery to the communications channels 112. The remote modem or interface 144 receives the transmitted signal and introduces it into a demultiplexer 146 from which it is separated for the MPEG decoder 150 and the DSP 152, which are controlled by the control processor 148. A still frame memory 160 is included. The signal is the again multiplexed for display at 154 and converted to an analog signal at D/A converter 156 for display at monitor 158. The still images or selected video frames and data may be hard copy printed at printer 162.

Figure 35:
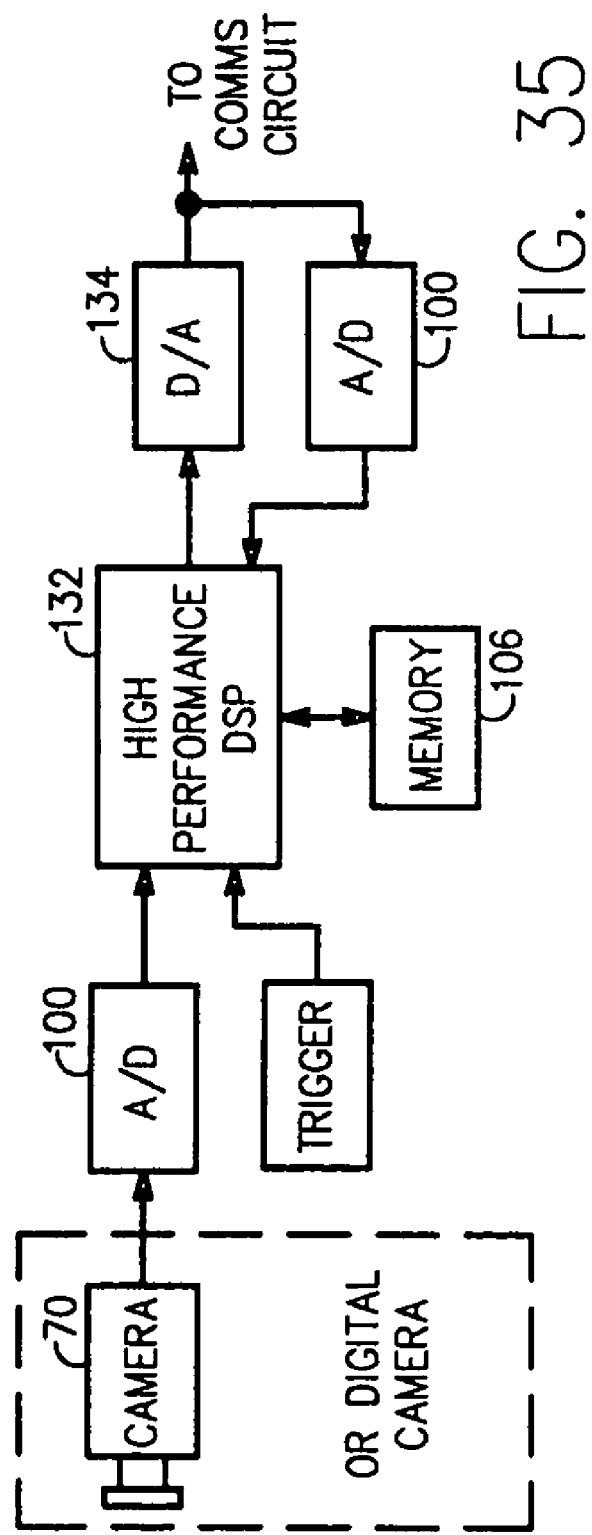

As shown in FIG. 35, all of the functions of the camera system can be performed using the high performance DSP 132 in combination with the camera 70 and the A/D converter 100 on the input side and a memory 106. The output of the DSP is converted to an analog signal at D/A and A/D converter 134. The D/A, A/D can provide a modulated waveform for injection into a wired network, or synthesize a wireless waveform for transmission. A digital camera may be substituted for the analog camera described, eliminating the need for the A/D converter 100.

Figure 36:
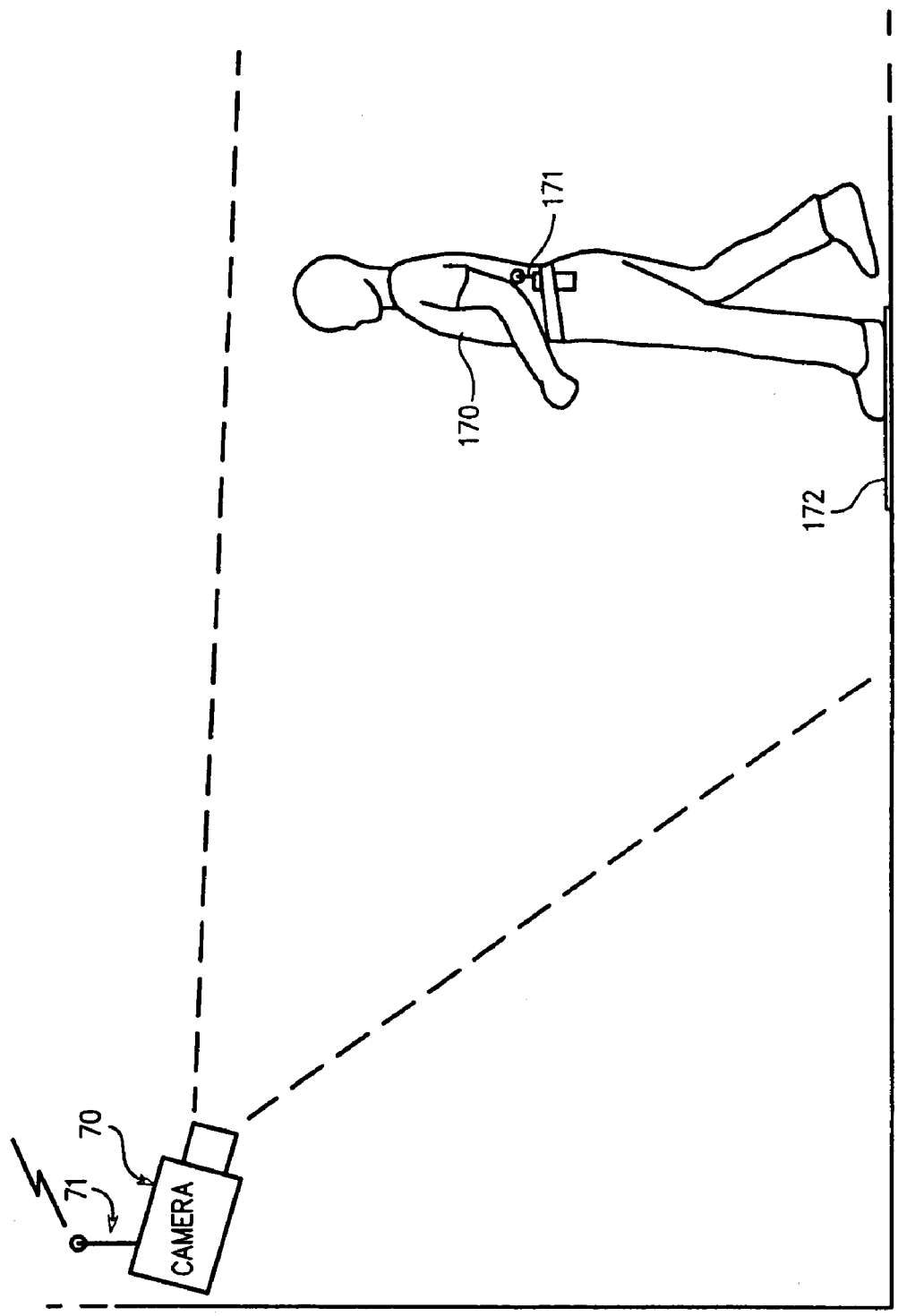

An auxiliary triggering configuration is shown in FIG. 36. For example, a moving unit such as a roving personnel, a vehicle or other device 170 may be outfitted with a geolocation system as indicated by the sensor 171. For example, roving personnel may be outfitted with a PDA unit. When detected by the geographic locator to be in the field of view of the camera 70, the server will send a signal to the camera/sensor 70 via antenna 71 to activate the camera/sensor and collect data for transmission to the system. Other activation sensors can be used as well. For example, the proximity sensor 172 may activate the camera/sensor 70 whenever anything is within the range of the proximity sensor. The proximity sensor signal can directly trigger the camera or can be sent back to the server for management in accordance with programmed techniques. This will permit specific data collection of images and videos in the selected area and can provide a permanent archival record of any objects that may have been in the vicinity of the camera during the time the camera is activated.

Figure 37:
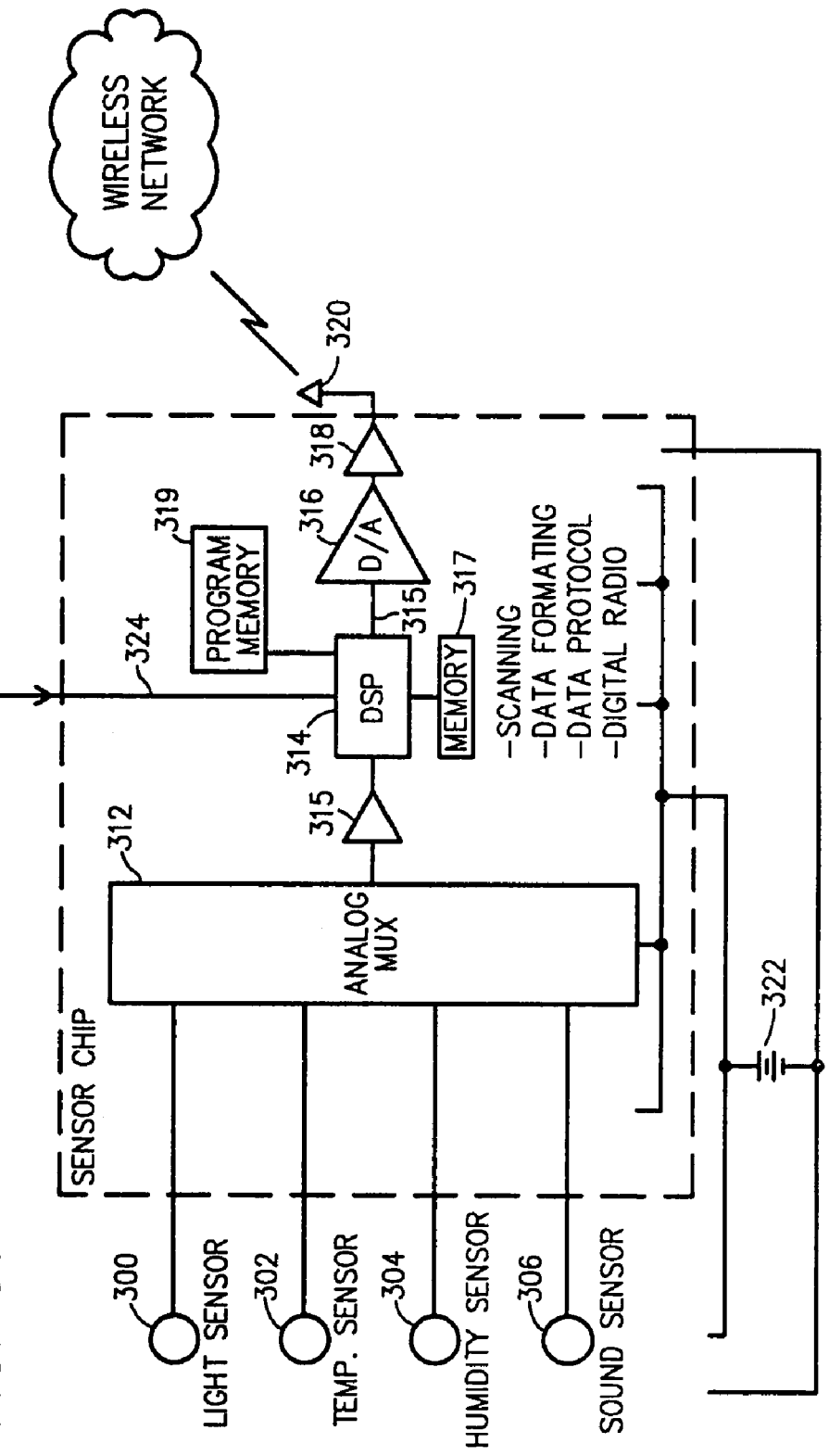

FIG. 37 is a diagrammatic illustration of an integrated appliance/sensor/wireless network subsystem using DSP technology. As there shown, the various analog sensors such the light sensor 300, the temperature sensor 302, the humidity sensor 304, and the sound or audio sensor 306 (as well as other sensors as previously described herein and as desired for application) produce analog signals then introduced into an analog multiplexer 312. The multiplexer 312 produces a selected analog output signal which is introduced into the analog to digital (A/D) converter 315 and the DSP processor 314 from which it is RF modulated at converter 316, amplified at amplifier 318 and transmitted via antenna 320. A program memory 319 and an on board RAM memory 317 are provided. In the preferred embodiment, an integral power supply 322 is provided. The appliance address is on line 324. This system provides a highly integrated sensor/processor/transceiver and can be housed on a single chip using available configuration technology.

Figure 38:
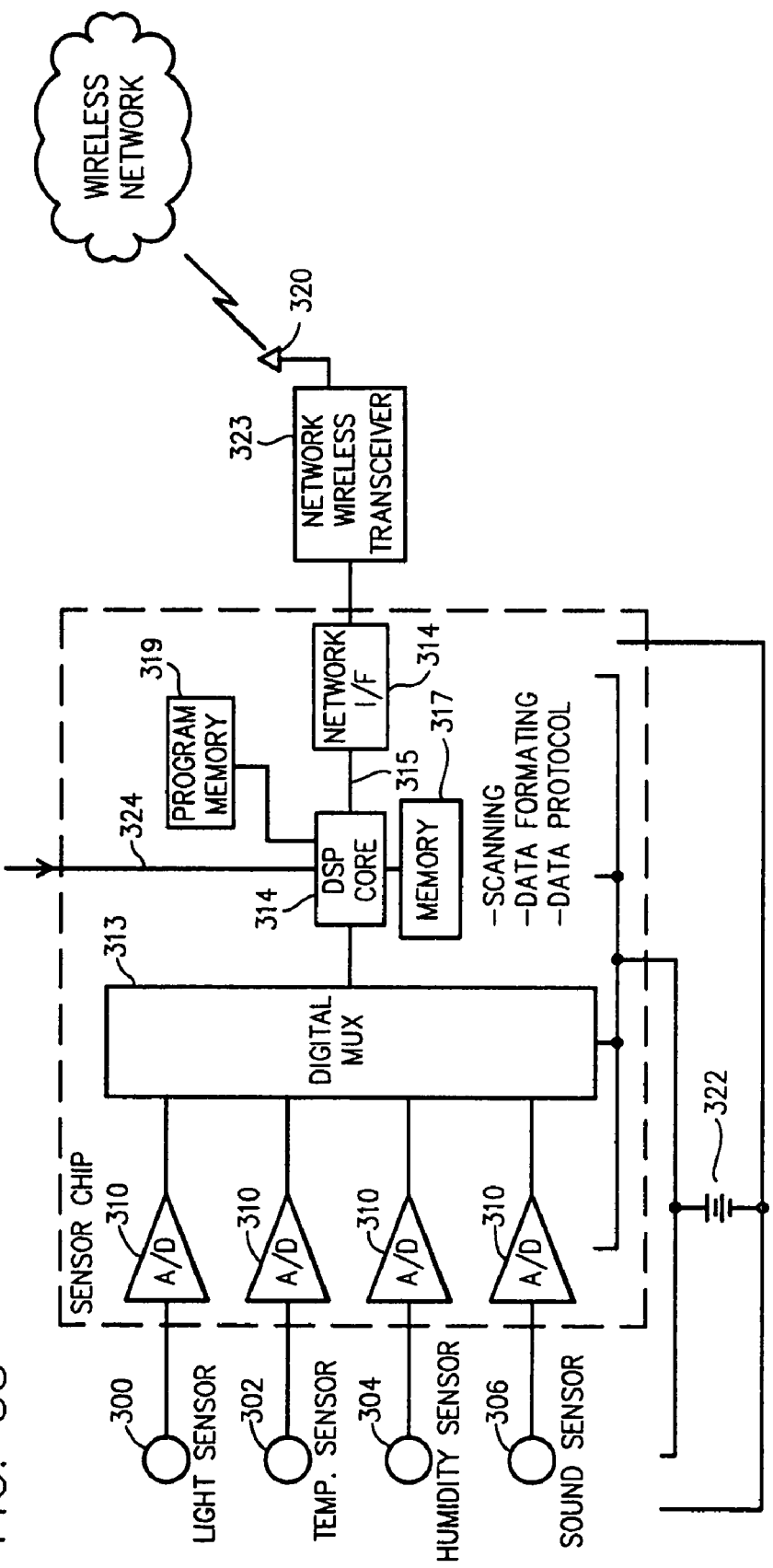
Figure 39:
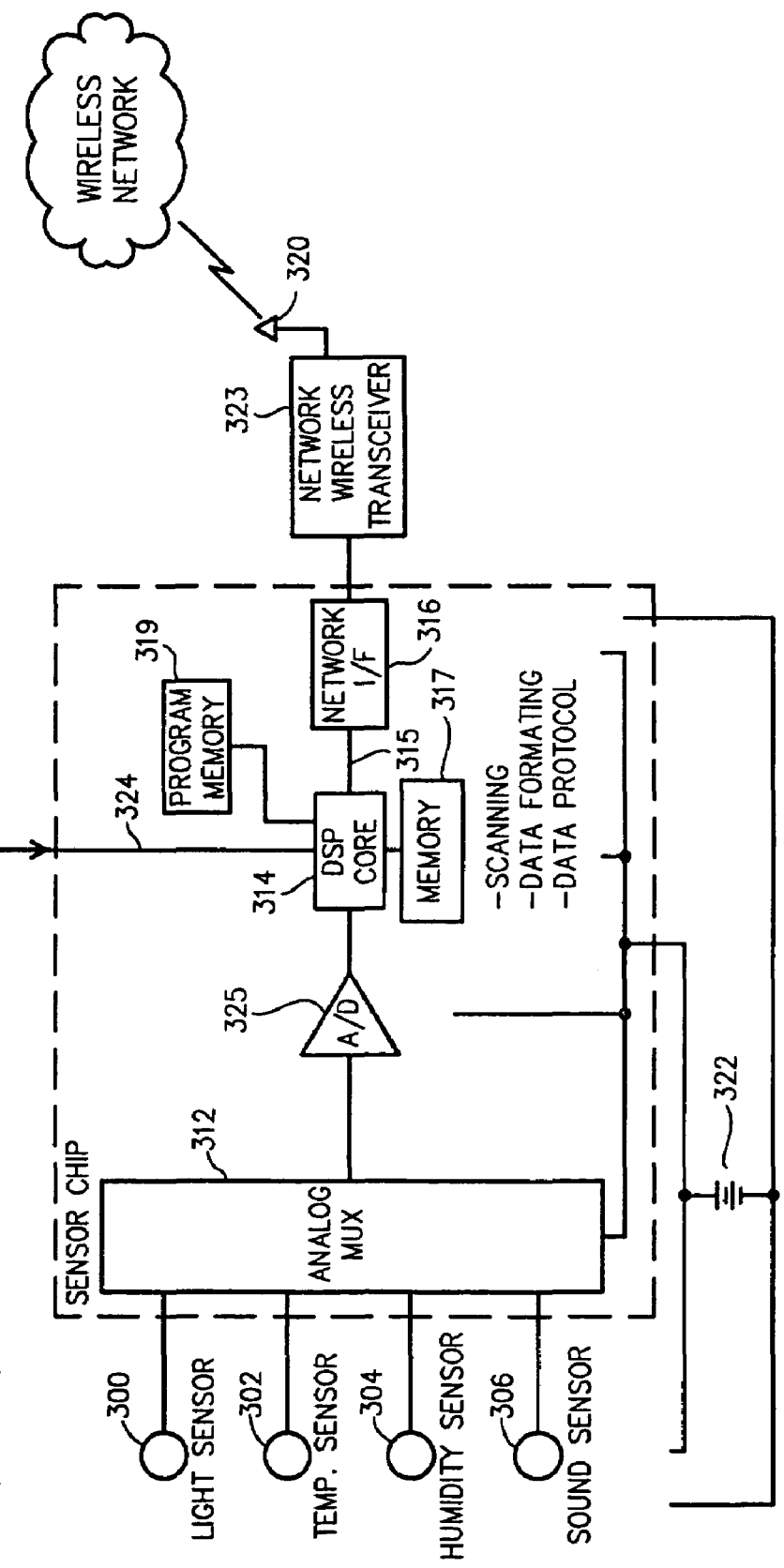

FIG. 38 is similar to FIG. 37, but includes a digital multiplexer 313 in place of the analog multiplexer 312. The D/A converter circuit 316, 318 is no longer necessary and has been replaced by the interface 314 to communicate to a wired network or to a wireless network such as a WLAN radio 323. FIG. 39 is similar to FIG. 38, but includes an analog multiplexer 312 coupled to an A/D converter 325.

Figure 40:
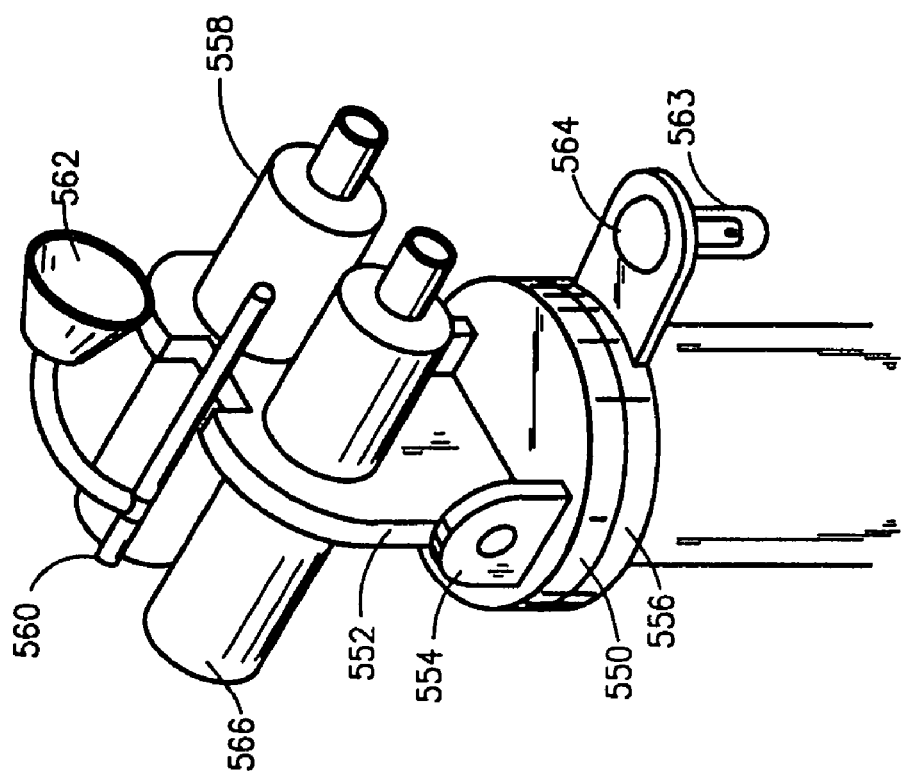

FIG. 40 is a perspective view of a preferred embodiment of a tracking camera network appliance 510. In the preferred embodiment, the camera is adapted to respond to several different types of control signals, including but not limited to:

- X-axis position control as indicated by X-axis servomotor 550;
- Y-axis position control as indicated by Y-axis servomotor 554;
- Lens zoom control as indicated by motorized zoom lens 558; and
- Iris control as indicated by iris controller 557.

As shown in FIG. 40, the camera system includes a base or mounting bracket 556 for mounting the system at location. The system body 552 is mounted on a tilt mount 554 (y-axis) and pan mount 550 (x-axis), permitting panning (x direction) and tilting (y direction) of the camera for scanning a wide area. A motorized zoom lens 558 is provided (z direction). The preferred embodiment of the system also includes an audio sensor such as directional microphone 560. The audio sensor may be an acoustic transducer, such as a microphone, that collects audio information from the surrounding area. The collected audio can be processed to detect potential emergency conditions such as a gunshot or an explosion, or can be routed directly back to the monitoring station.

With specific reference to FIG. 40, the video camera may be monochrome and/or color and may have an image intensifier for operation in dark environments, and may include infrared night illumination capability 562. The lens may be a zoom lens or an auto iris. The video may be processed in three distinct manners: (1) full motion stream—compressed to be delivered over the communications medium and typically the lowest resolution due to the volume of data required; (2) step video—higher resolution can be collected at a specified interval for better identification of certain features or components in the range of the camera; (3) still frame images—higher resolution and faster than full motion or step video. These three types of data may be delivered in combination or may be any one selected type. For example, a low-resolution continuous stream of highly compressed full motion data may be sent from the camera/sensor to a monitor station to drive a screen. This will provide a typical "closed circuit" monitor of the scene at the camera/sensor. Authorized personnel may then command the sensor to capture and send a high-resolution still image to the monitor station if something appears to require additional scrutiny. If a sensor has been armed for event detection and activation, the sensor may be activated to capture and send the event signal to the screen, or periodic high-resolution images may be captured and inserted. Various ranges of uses of this capability are within the intended scope of the application. The camera/sensor also includes adequate communications protocol to support the transmission. For example, Internet transmissions require TCP/IP or PPP protocols. Selected camera/sensors may be mobile and it may be desirable to determine their location in the system. Any number of techniques may be employed, for example, infrared beacon location systems, RF triangulation systems or GPS and the like. The camera/sensor may be equipped with external sensor input or a dry contact input to trigger the sensor to capture data and generate an event. While the camera/sensor is typically equipped to accept external power such a low voltage DC, a backup internal power supply is desired. The wireless camera/sensor units include an RF subsystem, either external or internal, to communicate with the servers and monitors of the system.

In many cases the comprehensive camera/sensor will also include other devices such as an audio subsystem for collection of audio data, motion sensors, heat sensors, smoke and vapor detectors, and/or the like. Typically, the camera sensor will include a temporary memory store. This way, if signal transmission occurs upon the detection of the event, the camera/sensor can send data relating to the time just prior to the event, limited only by the on board memory capacity.

Using the network appliances and sensors of the subject invention, locational origin of an event can be triangulated from multiple sensors and the positional origin can be calculated and displayed on maps as an overlay for assisting in pursuit of a perpetrator. The calculated origin can also be correlated by computer to the nearest appropriate emergency assets, base upon their known positions, and those assets may be automatically dispatched. The audio analog/digital converter adapts the acoustic signal representing the audio environment into a digital data stream. The digitizer runs at real-time rates for real-time audio monitoring. The audio signal processor/compressor has two functions. It is programmed to perform detection in a number of different manners. For example, the processor algorithms can be adjusted to detect impulse noises such as gunshot or a small explosion. Detection of such an event would trigger a specified unique "alarm" for that condition to be transmitted back to other elements of the system. Other types of detection are also possible. By using frequency analysis transforms and signature profiles, noises from engines, door openings or other distinctive noises could be detected when warranted by the situation or condition. For audio surveillance applications, the compressor can also be used to provide bandwidth reduction for audio transmission. In this application, the amount of data representing a real-time audio stream would be reduced by using audio compression techniques such as LPC-10, or other well-known or proprietary algorithms. This allows better bandwidth utilization of the wireless and wired communications channels used by the system. Illumination means such as the infrared illuminator 562 permits surveillance during low light or no light conditions, without detection by unauthorized personnel. A visual light/strobe light 563 can be turned on by locally detected events, by remote control signal, or by other system elements such as detection by a companion sensor unit signaling over the network. This light can illuminate an area of concern, attract attention of security personnel as a signal, or scare away unauthorized personnel or intruders.

An integrated GPS receiver 564 is provided for generating location information. This is particularly useful for "drop-and-place" appliances and sensors as opposed to permanent appliances and sensors. Other features such as a laser range finder 566 that can measure distance to objects/personnel may be incorporated to further expand and enhance the capability of the appliance and/or sensor component. The camera system shown has full 360 degree field of view capability which may be controlled manually by remote control signals, and may be programmed to pan the area on a time sequence, may track a moving object by sensing its presence, or manually. The object may be automatically followed utilizing the control features of the camera as described above. The camera may also be manually controlled to follow the action from a remote station. For example, the zoom feature may be used to take a close up of the subject. A wide angle or the tilt feature may be used to view the environment to determine surrounding activity such as the presence of a second person in the room. The range finder 566 permits the tracking system to locate objects in a precise manner and then provide control signals to permit accurate surveillance and monitoring of same, such as zooming the camera or positioning of other sensor elements. Each appliance and/or sensor and/or camera may incorporate a motion sensor and/or an audio sensor activation device so that the system may be activated when a sound or a motion occurs within the sensor range. The motion detector may comprise any transducer unit that can detect the presence of an intruder and can be a device such as an infrared motion detector, a thermal sensor, an ultrasonic detector, a microwave detector, or any hybrid of two or more of these detectors "fused" together to gain better sensitivity and/or improved detection accuracy. A motion detector converter may be incorporated to convert the signal from either a single motion detector sensor or a battery of sensors to digital form for processing and/or transmission to other system elements. Multiple elements may be contained within a single sensor system package, or may be fused for multiple sensors in geographically distributed elements with data to be fused being transmitted over the Network. The motion detector signal processor is adapted for analyzing the sensor data streams from one or more sensors to provide for better sensitivity or improved detection accuracy. Well-known techniques may be implemented to process the transducer data and detect surges over the set thresholds that represent detection. The processor/compressor can also be configured to accept input from multiple sensors and process the inputs in a "fused" manner. For example, signals form an infrared detector and ultrasonic detector may be "added" together, then threshold detection performed. This ensures that both an optical and an acoustic return are detected before an alarm condition is broadcast. These and other more sophisticated well known techniques can be used together to gain better sensitivity and/or improved detection accuracy. Detection of such an even would trigger a specified, unique alarm condition to be transmitted back to the other elements of the system.

Typically, the sensors will "sense" the presence of unauthorized activity and activate recording from the various audio and/or video equipment and will activate alarms. This will initiate the generation of a signal at each of the activated units. The generated signals will then be transmitted to the monitoring and recording equipment, as described, to permit both real-time surveillance and recordation of activity at the site. Motion detection may also be determined using video time/change techniques in the well-known manner.

Figure 41:
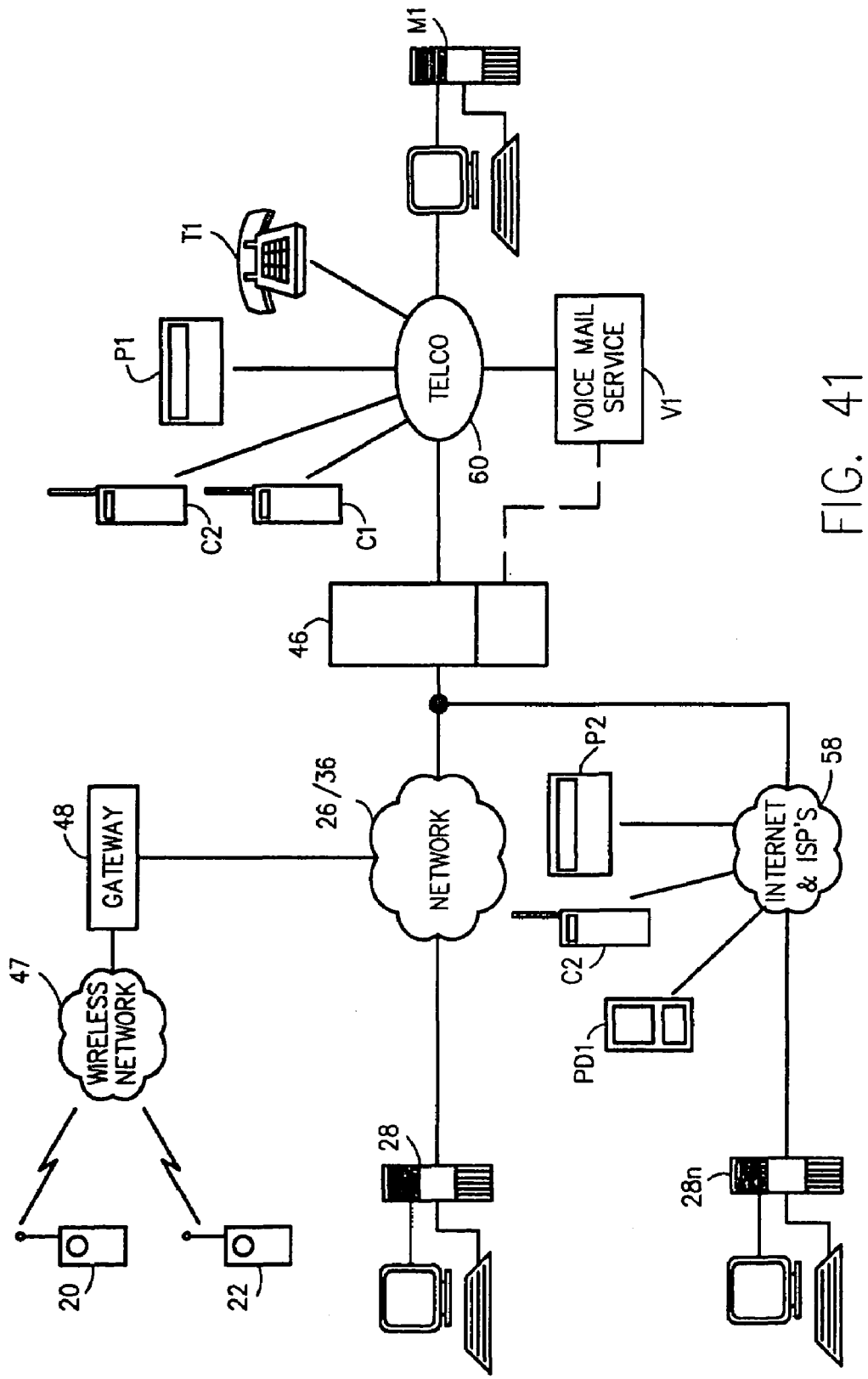

FIG. 41 illustrates examples of the server dispatching techniques that may be employed by the server supported multimedia surveillance system of the subject invention. It is intended to illustrate examples and is not intended to be all-inclusive. As there shown, once the data is available to the server 46, it may be managed and processed in a number of different ways to maximize the use of the data for monitoring, logging, archiving and response issues. The data is typically sent to system monitors such as monitor 28 which may be on the local network or may be located remotely on a wide area network (WAN) such as the Internet. Alarm conditions, data and various control signals may also be dispatched via various communication systems such as public telephone lines 60 and Internet and ISPs as indicated at 58. System information may then be distributed via normal (non-Internet) means to pagers P1, voice cell phones C1 and/or digital wireless phones C2, to land line telephones T1, to monitors M1, to voice mail service systems V1 and to other remote monitoring stations. Control signals, response data and other data and information may be introduced into the system via the same systems.

Other means of delivery of digital data such as text, graphics, or numerical data can be implemented with WAN digital systems such as the Internet, digital pager networks, digital wireless networks and the like, all of which may inter-operate with Internet transported messages. Using this type of delivery, digital devices or appliances such as wireless PDA's PD1, digital wireless phones C2, and digital pagers P2 can be incorporated.

In a typical operation, the server can be used to process various event notifications. For example, the server can arm appliances and sensors for detection of intrusion events, audio detection, smoke or vapor detection, heat detection, and/or video detection. If an activated appliance or sensor is triggered, the server can dispatch alarm conditions in several ways, including sending:

messages to specifically assigned monitoring units;
a telephone call to designated land line numbers with an audio message describing the event;
a telephone call to a designated wireless telephone number with an audio message describing the event;
a numeric pager message with transmitted number signifying a voice mailbox message that contains a server generated audio message describing the event;
a voice pager message with audio message describing the event;
a text pager message describing the event;
a text/image/audio message to a wireless PDA;
E-mail message to a digital cellular phone;
graphic message sent to a wireless PDA device PD1, such as message showing a map, collected images and the like;
E-mail to any e-mail accessed party via fixed terminals 28n.
Direct message posting to other servers, such as by FTP.

The server can also notify multiple parties, or can notify and wait for confirmation such as pushing buttons on a phone to tone back from a telephone or a reply on a two-way wireless system or a digital phone. If the confirmation does not come back, the server can automatically go on to the next notification on the list. One suitable method for determining what stations and units to notify is a predefined notification list that maps appliances and sensors and types of events to particular parties. Primary parties and secondary or backup parties may be identified. Time frames can be assigned. For example, perhaps three individuals are "on call" during one day and the notification is assigned based upon the time of day. A second method is to interface the time accounting system to see who is "clocked in" at a particular time. That individual would automatically be the priority contact during the period of time he is clocked in. GPS tracking of personnel can also be used to notify the closest personnel, the closest monitor and to track and route the event and the event response. For example, personnel can be directed to the event using GPS signal monitoring and management to identify both the precise location of the event and the closest response personnel.

The server is the heart of the system and not only controls dispatch and distribution of collected surveillance data but also controls the function of the various system components. The server is utilized to monitor camera status, and monitor station status. It also monitors the system for alarm signals and responds with appropriate dispatch of response triggering information. The server is programmed to log and archive information for later recall and is adapted to effect the function of a "cross point switch" between units and monitors. The server is programmed to define zones and to activate and deactivate zones and provide access authorization to a zone or to a monitor station. The status of all wired and wireless appliances and sensors is monitored and a malfunction or failure to respond is logged with proper response triggering information (such as "ALARM" condition, for example) dispatched to the appropriate monitoring stations and units. Alarm conditions may have associated types and priorities, for example, a temperature alarm. Event detection such as sensor triggering or motion sensing is likewise monitored, logged and reacted to. The multimedia appliance and sensor data, such as audio, video, step video and individual images are sent to the server by the camera/sensor unit by the available communications circuit and archived for future use. The data is "stamped" with additional information such as time of collection, appliance and sensor identification, trigger condition if applicable, and other significant data, for example environmental data such as temperature, humidity, light, smoke, vapor and gas levels and the like.

In effecting a "cross point switching" of the data, the system collects input from a multitude of appliances and/or sensors and can distribute event detection, alarm conditions and/or sensor data to a multitude of monitor stations. The server can perform as an N-by-N switch, mapping any combination of data from any camera/sensor unit to any one or more one or more monitor station(s) and/or other receiver units. Periodic images may be sent to a localized monitoring station. Motion detection from an armed sensor may facilitate sending text alarm conditions to a roving guard (such as can be done using an alpha-numeric pager, for example), maps, GPS direction and location, still frame and image display, as well as sending critical data and response information, and/or full alarm data to the localized monitoring station near the sensor and to a centralized company wide monitoring station for high level supervision. Other workstations in close proximity to the triggered sensor can be notified on the Network. Any matrix of mapping of the sensors, routing conditions and designated receiving monitor stations can be orchestrated by the server.

The server 46 can define zones for the appliances and sensors and monitor stations and manage and control by zone. Appliance/sensor unit and monitor station firmware and software may be maintained at the server allowing for system wide maintenance and upgrade at a central location.

The server can provide an appliance and sensor map and event map based on location of appliances and sensors and monitoring of events. Where moving appliances and sensors are included in the system, the server will keep track of the appliance and/or sensor either by tracking the location of the mobile component through periodic polling, periodic sensor transmissions or GPS. Typically, the mobile component will be tracked on the map.

The server will also provide other typical function such as area or zone monitoring to track personnel in the zone, controlling access authorization and controlling and monitoring logging and call back requests. The system can also generate an alarm if personnel and/or equipment enters an unauthorized area as monitored by the server and various devices.

Figure 42:
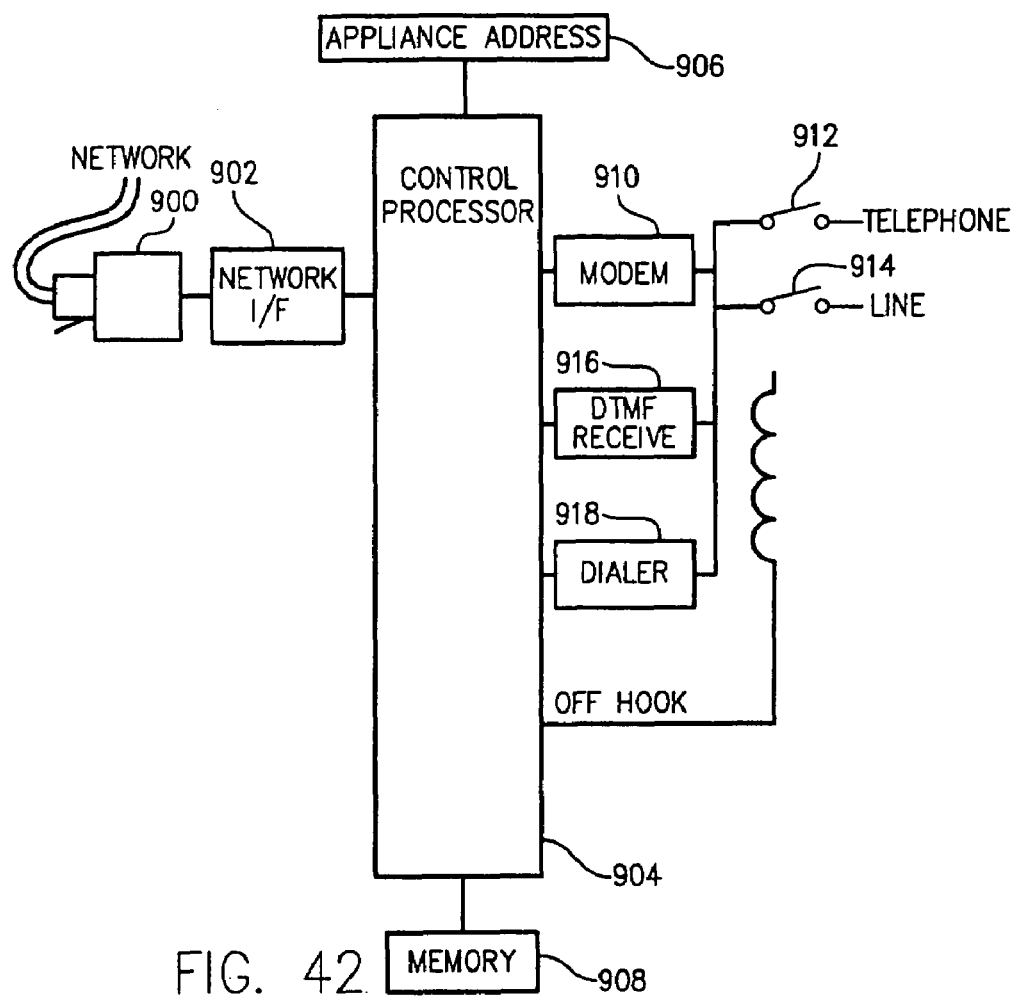

FIG. 42 illustrates a telephone line gateway appliance to the Network, and as with the previous modules described herein, is connected to the Network via an RJ-45 plug and jack set 900 and a Network interface 902 in communication with a control processor 904 equipped with an appliance address module 906 and a memory module 908. The control processor drives a modem 910 associated with the telephone line through contact, 914 in the well-known manner. Required circuits such as ring detectors, off-hook detector, and ring generator have been omitted from the drawing since such circuits are well-know in the art and are merely a matter of choice. An automatic dialer module 918 and DTMF receiver module 916 are also provided. The DTMF receiver module is used to receive alarm confirmation information dialed by personnel, or to navigate the audio menus of the server system. The telephone gateway system permits the sending and receiving of audio and data messages via a standard telephone line for functions such as, by way of example, contacting an alarm monitoring company; alerting appropriate personnel; contacting police, fire and/or other emergency personnel; dialing pagers and cell telephones and the like. Either pre-formatted data messages can be delivered by the modem, to another system or synthesized or pre-recorded voice messages may be used to inform the user. This permits automatic and programmed dispatch of critical information as soon as it is detected on the Network supported system. Of course, as has been shown elsewhere herein, a wireless system can also be supported by replacing the RJ-45 plug and jack set and the LAN interface with a WLAN or wireless radio and antenna.

Figure 43:
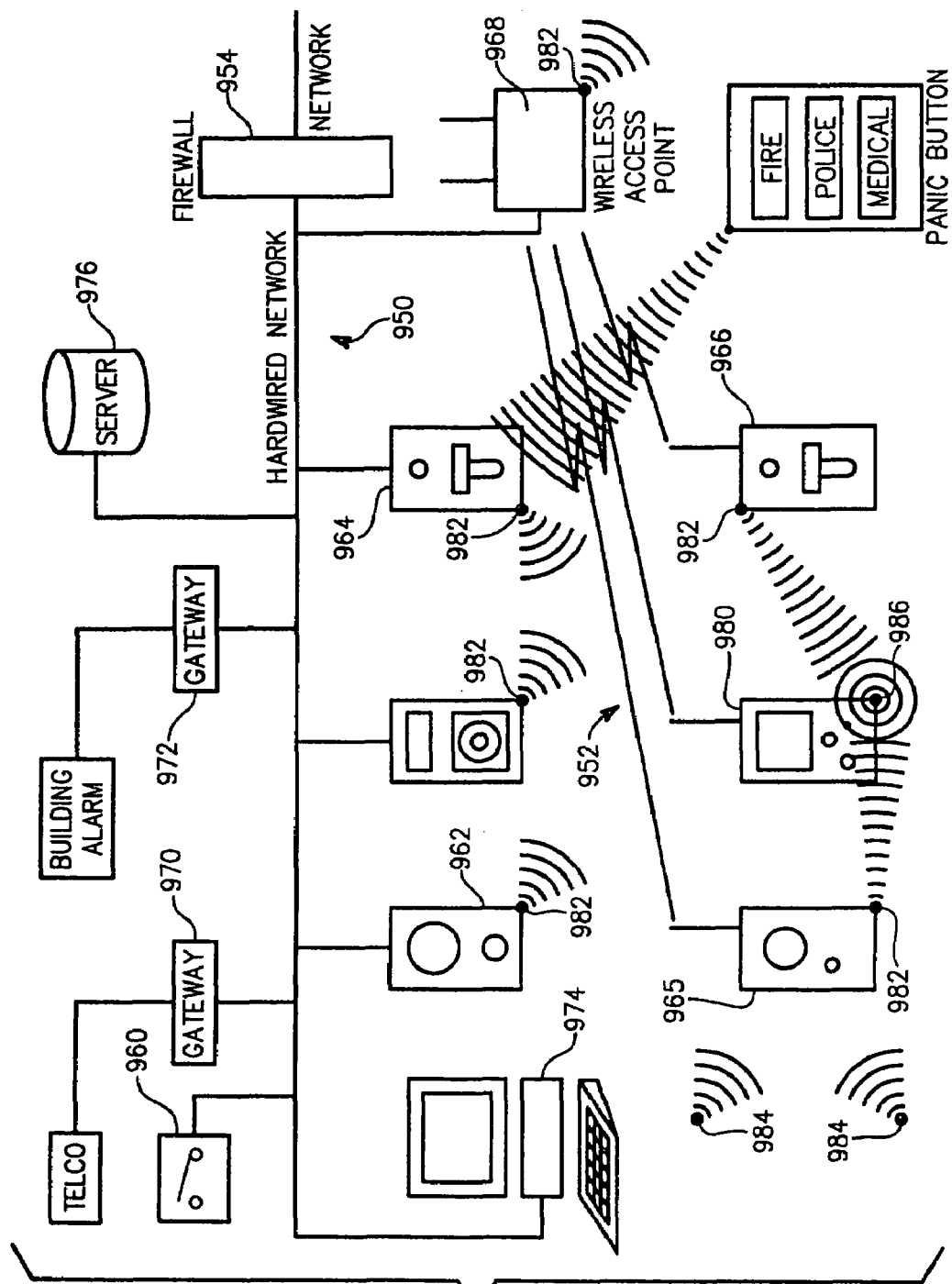

FIG. 43 is an illustration of a system including an infrared geolocation capability, and is typical of an overall system concept incorporating any combination of the appliances shown and described herein (particularly as shown in FIGS. 10–42). All of the various sensor modules or appliances as well as all of the communication and control gateways are connected to a hardwired network 950, a wireless LAN or other wireless communications components 952, or through a suitable firewall 954 to a WAN such as the Internet. In the illustrated embodiment the system incorporates contact sensor appliances 960, a video/camera/audio appliance 962, a "Pull" station appliance with an integral camera 964, and various wireless sensor appliances such as the wireless camera 965 and the wireless "Pull" station appliances 966, which communicate via the wireless communication link 968 to the network. A wired telephone gateway is provided at 970 and a hardwired building alarm gateway is provided at 972. A hardwired monitor station is connected to the network at 974. A local (on the local network) server is provided at 976. The system also includes a mobile monitor station or PDA 980 communicating through the wireless port 968. In this embodiment, strategically placed sensors are equipped with infrared, acoustic or RF communications devices 982, each with a precise location and address code. In addition, independent infrared, acoustic or RF communicators 984 may be strategically located throughout the system and may be either stand alone beacons, or may be hardwired or wirelessly connected to the server. The system could be configured such the building location codes are transmitted from communicators 984 and received by the mobile units to be located such as PDA 980, or codes identifying the mobile unit can be transmitted by the mobile unit such as PDA 980 and received by communicators 984. It is preferred to transmit from the communicator 984 and receive at the mobile unit 980 because the stand alone location communicators 984 then can be beacons and do not need to have data communications with the server. The PDA 980 includes an infrared, acoustic, or RF communicator 986 which sends or receives an identifying signal or from the various strategically located communicator units for monitoring and identifying the location of the PDA and associated personnel at all times.

Figure 44:
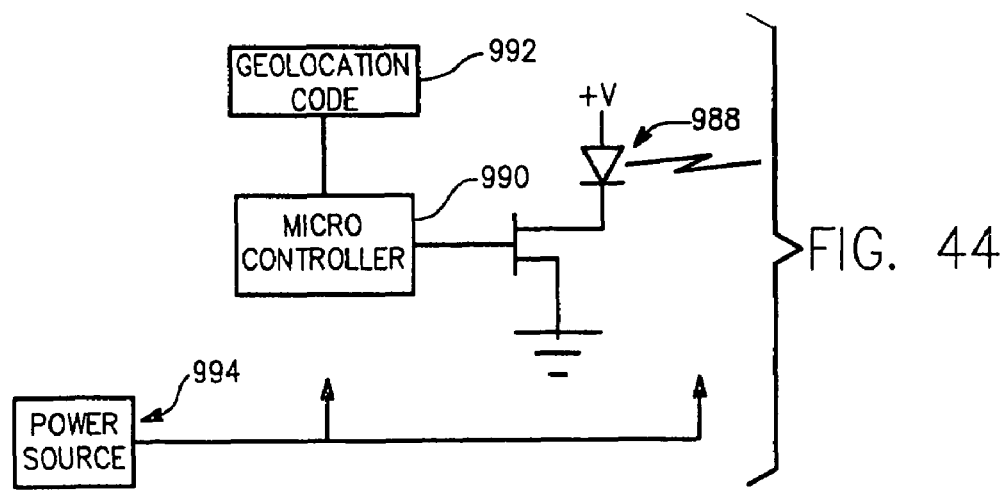

The basic circuitry for a stand-alone location code beacon generator is shown in FIG. 44. An infrared beacon is shown and includes an infrared LED 988 coupled to an integral microcontroller 990 with an identification code module 992. An independent power supply 994 such as wall plug power and/or a battery circuit is also included. The LED may be replaced with an acoustic transducer or an RF transmitter.

Figure 45:
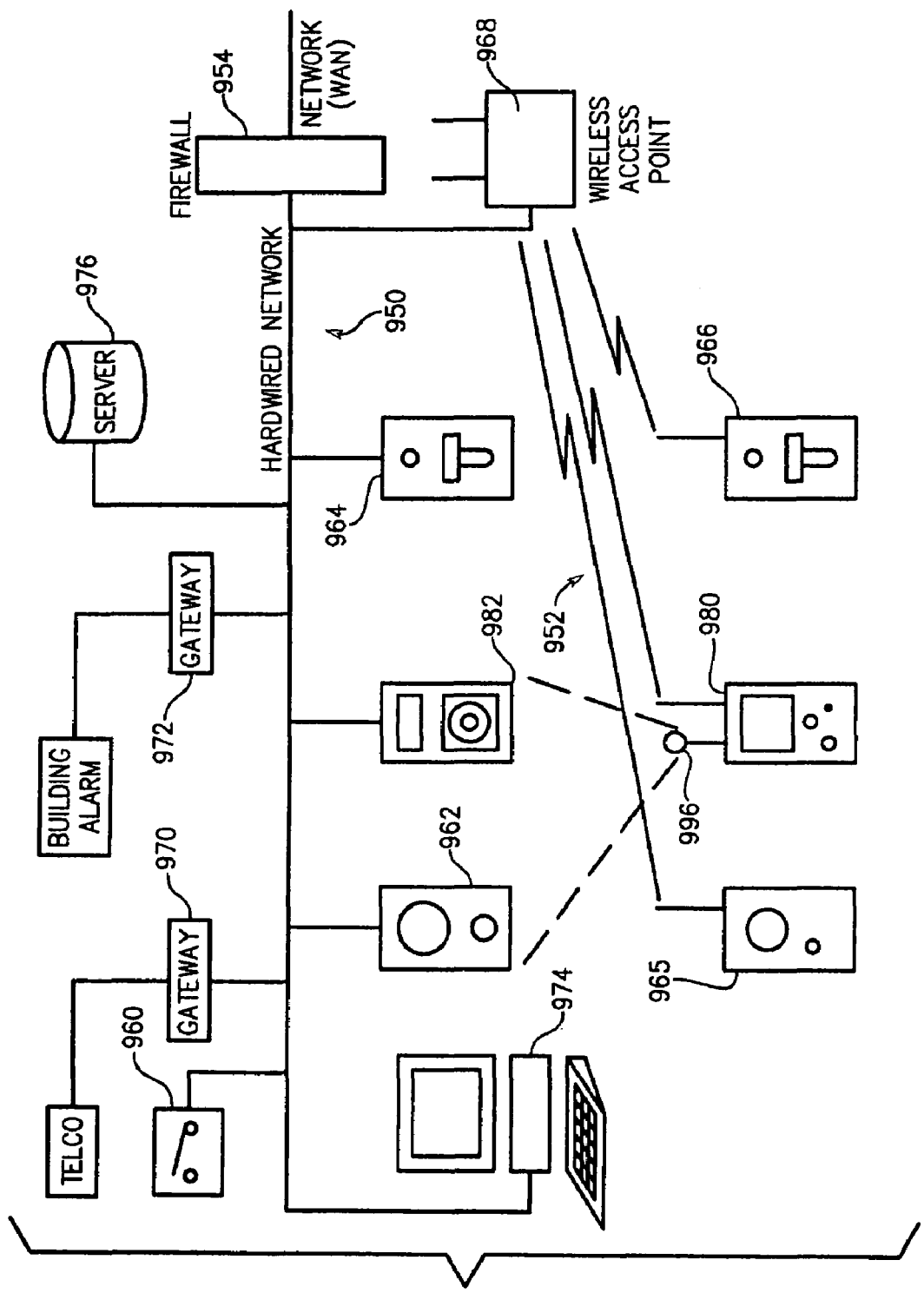

A system similar to that shown in FIG. 43 is shown in FIG. 45, incorporating global positioning system (GPS) technology for generating a location signal from an integral GPS receiver 996 located directly on the PDA 980. Like numbered components in FIG. 45 correspond to the same components in FIG. 43. In the most comprehensive systems, infrared location and GPS location systems are used in combination, particularly since GPS is non-functional and/or unreliable inside certain types of structures.

The system is responsive to any programmed event such as the obvious intrusion of a sensor zone as well as other more subtle instances. For example, the system can continuously evaluate scenes by looking at objects that are traditionally at any given location and detecting a change, such as from the scene shown in FIG. 46*a* to the scene shown in FIG. 46*b*. Basically, the system learns that an object belongs or does not belong at a specific location. Any subsequent change creates and event activating the system. FIGS. 46*c*–46*h* illustrate a sequence wherein an unauthorized object appears. FIGS. 47*c*–47*l* illustrate a sequence wherein an authorized object is removed.

Figure 46A:
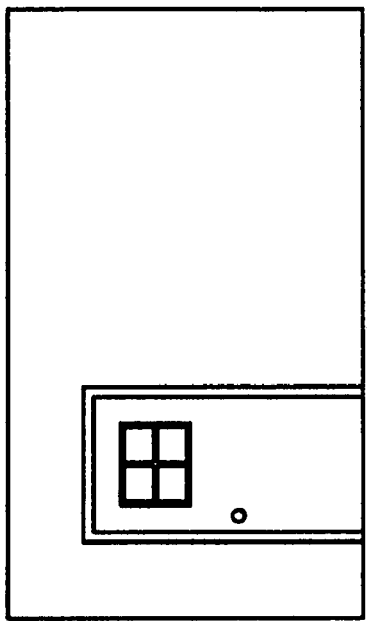
FIGS. 46a–46h illustrate data mining examples and related imaging processing wherein an additive event occurs.
Figure 46C:
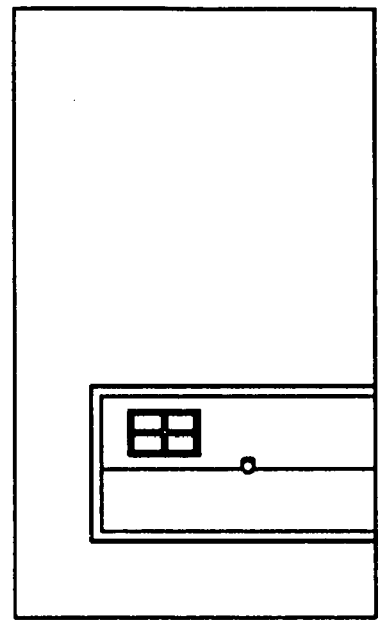
Figure 46B:
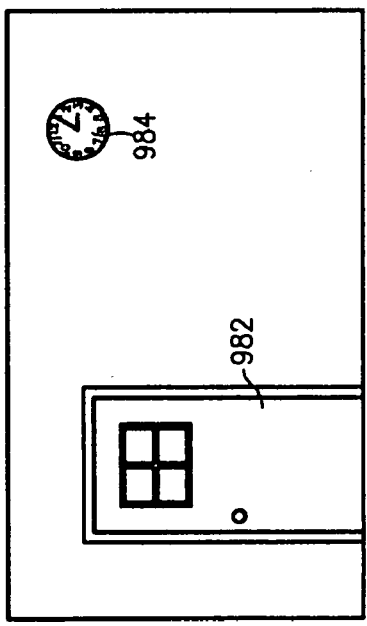
Figure 46D:
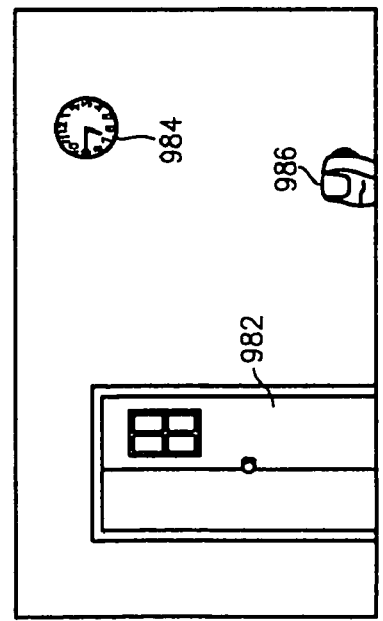
Figure 46E:
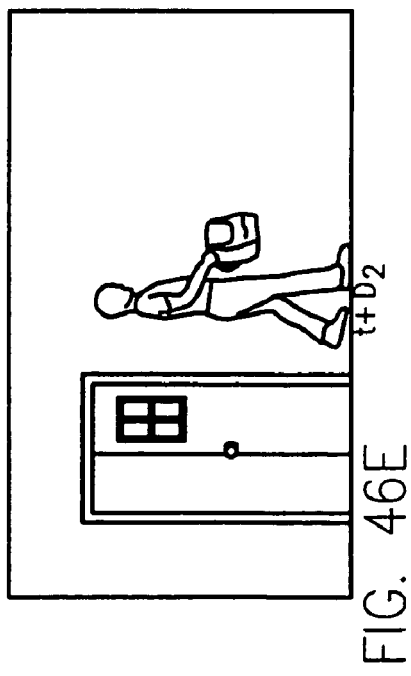
Figure 46F:
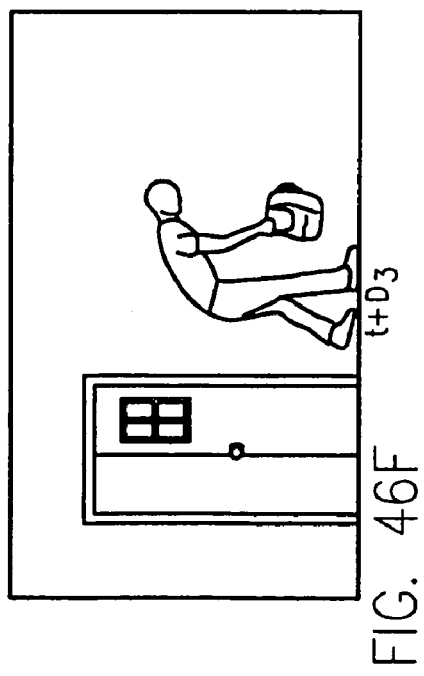
Figure 46G:
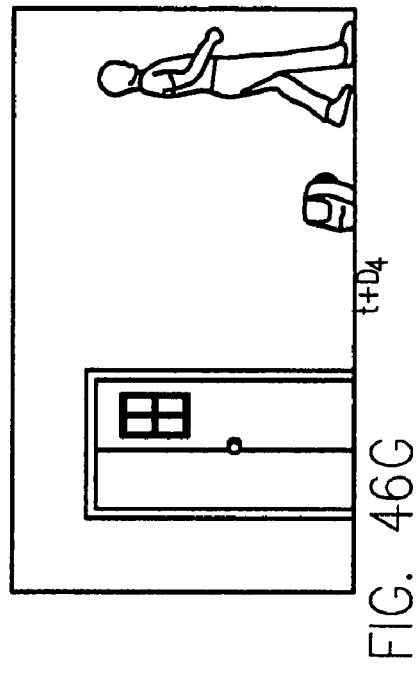
Figure 46H:
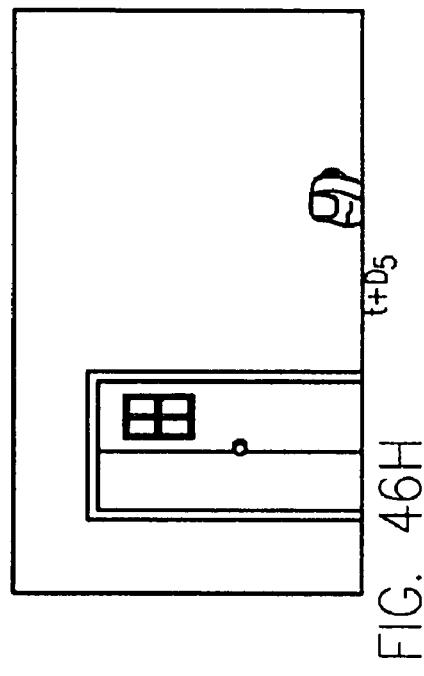

Referring to FIGS. 46*a*–46*h*, if a monitored zone was in the condition of FIG. 46*a*, with the door 982 closed, the system could analyze the image of the door and generate an event if it detected the door to open, or if it were left open longer than a predetermined time, e.g., FIG. 46*d*. If the system were programmed to indicate that the area should not show any activity until, say 7:30 a.m. the next morning, there would not be any requirement generate an alarm in any data as long as everything stayed dormant. Object detection can also be accomplished using the system as here shown. In the event something changes as indicated in FIG. 46*b*, such as the detection of the door 982 opening or the sudden appearance of an unidentified object such as the parcel 986 during the time (6:45 a.m.) when the area is to be dormant, the system would record the change and immediately start transmitting an alarm condition and image data to the server, also sending a predetermined amount of pre-event data in order to reconstruct the events leading up to the detection of the abnormality. This is shown in FIGS. 46*c*–46*h*, wherein a search of the logged or archived data can be undertaken to find the precise time "t" where the door was last undisturbed and then in predetermined intervals or deltas thereafter, the entire event can be recreated, as indicated by the following sequential illustrations 46*c*–46*h*. All of these images are captured and stored, either at the local sensor or camera, or as sent to the server. Once an event is detected, the server will be capable of playing back the data preceding the event, the event and following the event, greatly aiding in reconstruction of the sequence of actions leading up to, during and following a detected condition.

As shown in FIGS. 47*a* and 47*b*, the same technology is useful for recreating the removal or theft of artifacts or merchandise. In this instance the system is triggered or activated upon the detection of removal of an object from an image. This would be particularly useful in monitoring retail establishments for shoplifters. As shown FIGS. 47*c*–47*i* if monitored activity indicated the presence of an article in at time equals "t" and the disappearance of the article when time equals "t+Δ3", see FIG. 47*b*, the data can be logged for both pre-event and post-event data as indicated in FIGS. 47*c*–47*i*, to reconstruct the event. As shown in FIGS. 47*j*–47*l*, using the original condition data shown in FIG. 47*j* and pointing and clicking on the item which is removed, the server will search the data base to determine the precise time (FIG. 47*l*) when the item first is missing in the data base. This greatly enhances searching capability.

Other detection devices for activating the system may also be utilized, such as an acoustic sensor or other sensor which, when activated by an event, would notify the server to take a responsive action, such as to begin recording, to turn on local lighting, to send an alarm or a response signal generator or the like. As described here, the pre-event, event and post-event data would then be tagged, for replay and reconstruction.

The comprehensive capability of the system permits manual research of collected data, automated analysis capability, as well as the mining of data to determine patterns and effectiveness of the system. As an example of search capability, assume it is desirable to find the data relating to a specific camera in a school cafeteria zone on a specific date and at a specific campus. The archived information can be searched by date, location and time to find this information. Also it may desirable to locate and retrace the route of certain personnel on that same date. The geolocator system provides this capability. It would also be possible to look at the data relating to pre-event, event and post-event monitoring of an activity, say, for example, a fire alarm.

One important aspect of the invention is the data-logging feature. In the data logging application, all cameras (and/or other sensors) are periodically recorded with a time and location stamp for appropriate logging of the data to support later searches of the vast amounts of data collected and stored. As an example, one hundred cameras capture a 64 K Byte Wavelet compressed image, at a rate of one image every 5 seconds. This amounts to 1200 images per minute, or 41 terabytes per year. The use of motion detection or pre-programmed activation scheduling can greatly reduce the amount of data needed to be stored. For example, if a camera does not see any motion in the field of view, it is not necessary to store frame after frame of the same image. Storage should only occur upon detection of motion. Thus, the same 100 cameras, each triggered by motion detection 10 times per day, record only 24 G Bytes in a year. That represents a saving in database resources by a factor of 2000.

Access to the database must be controlled in a manner making the data useful. The search engine for mining the data can search by location, room, person, time and by sensor type or any combination of the above. As an example, it may be required to find "camera AND cafeteria AND Nov. 16, 1999 AND Hobby Middle School", or "Guard Smith AND Nov. 16, 1999 AND Hobby Middle School". The first search would provide all data generated by the cafeteria camera on the given date. The second search would provide all image data from each of the one hundred cameras when Guard Smith was in the zone of each of said cameras on the same date. The same search method can be used for other sensors and appliance data, as well. Standard browsers such as Netscape or Internet Explorer can be used to access these search engines.

Data mining provides ample historical analysis capability to assure that the system is operating in an optimum manner. Historical data may be analyzed to look for patterns of activity. Real time data may be analyzed to monitor specific events. Automatic alerts or alarms can be used to notify of discrepancies, even in an automatic mining mode. For example, if historical data indicated a certain pattern of behavior, any change in that behavior could be automatically determined and an alert could be generated.

One of the important features of the invention, particularly when used in conjunction with wire appliance and sensor modules which are quite portable, is the ability to assess the effectiveness of the system and move appliances and/or sensors to new or "hot" locations based on experience. That is, the system is very dynamic and system components and appliances can be moved or added and the configuration database edited as needs change or as reassessment indicates that better placement is possible.

Figure 48:
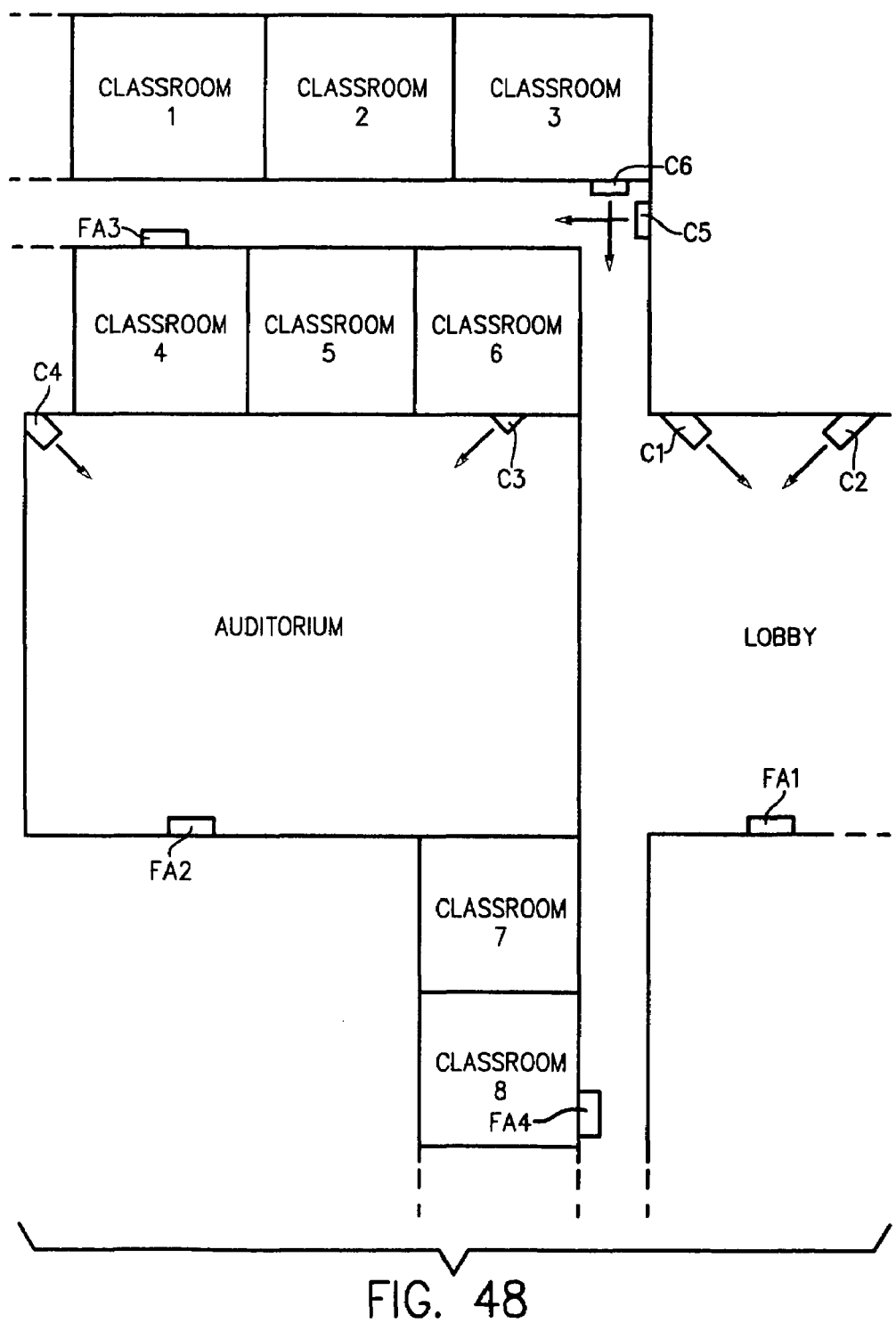

The address code is associated with and can be used to identify the location of the device. Thus whenever a device is activated, its location is known. This permits mapping of monitored activities. In addition, where infrared communicators or GPS receivers are utilized, the precise location of any device sending and receiving such signals is known. An example of the mapping function is demonstrated in FIG. 48. As there shown a portion of a school building layout is shown with various appliances and/or sensors such as fire alarm pull stations FA1–FA4, cameras C1–C6 are strategically placed throughout the area. Note that there is redundancy provided such that each zone is covered by more than one appliance and/or sensor. Thus if a sensor is disabled (placing gum over a camera lens in fire alarm pull station appliance FA3, for example) another sensor (in this case camera C5) will capture who perpetrated the event. The event of putting gum on the lens is automatically detected, for example, when the video suddenly goes blank. Turning lights off will not cause this when an internal infrared illumination source is used.

The detection of video squelching will cause the pull station appliance to generate an alarm, which is sent to the server for processing, and dispatch. Other detection devices for activating the system may also be utilized, such as an acoustic sensor or other sensor which, when activated by an event, would notify the server to take a responsive action, such as to begin recording, to turn on local lighting, to send an alarm or a response signal generator or the like. As described here, the pre-event, event and post-event data would then be tagged, for replay and reconstruction.

If an event occurs, a map showing both the location of the incident and the shortest path to it can be created using the location of the sensors. The map may be displayed to responsible or responding personnel, such as on the roving monitor. In addition, if a progressive event is occurring, such as fire, the progress and path can be mapped using the location and sequencing of the various appliances and sensors. This mapping information can be distributed throughout the entire system for assisting response teams in locating and isolating events. Point and click technology can be used to activate various appliances and sensors monitoring any point on the mapped area to provide full motion video feeds or analyze historical data for the corresponding sensor.

Another important feature is the capability of providing remote diagnosis of the system. Each appliance and sensor may be activated for testing on either a programmed or manually triggered basis from a monitoring station. Sample data may be retrieved from the on board memories even if it is not activated for transmission. Environmental data may be collected such as ambient background noise, temperature, changes in images and the like. The system can be reconfigured from a remote location eliminating the need to physically attend to each appliance and/or sensor to either re-aim it or re-program it.

Figure 49:
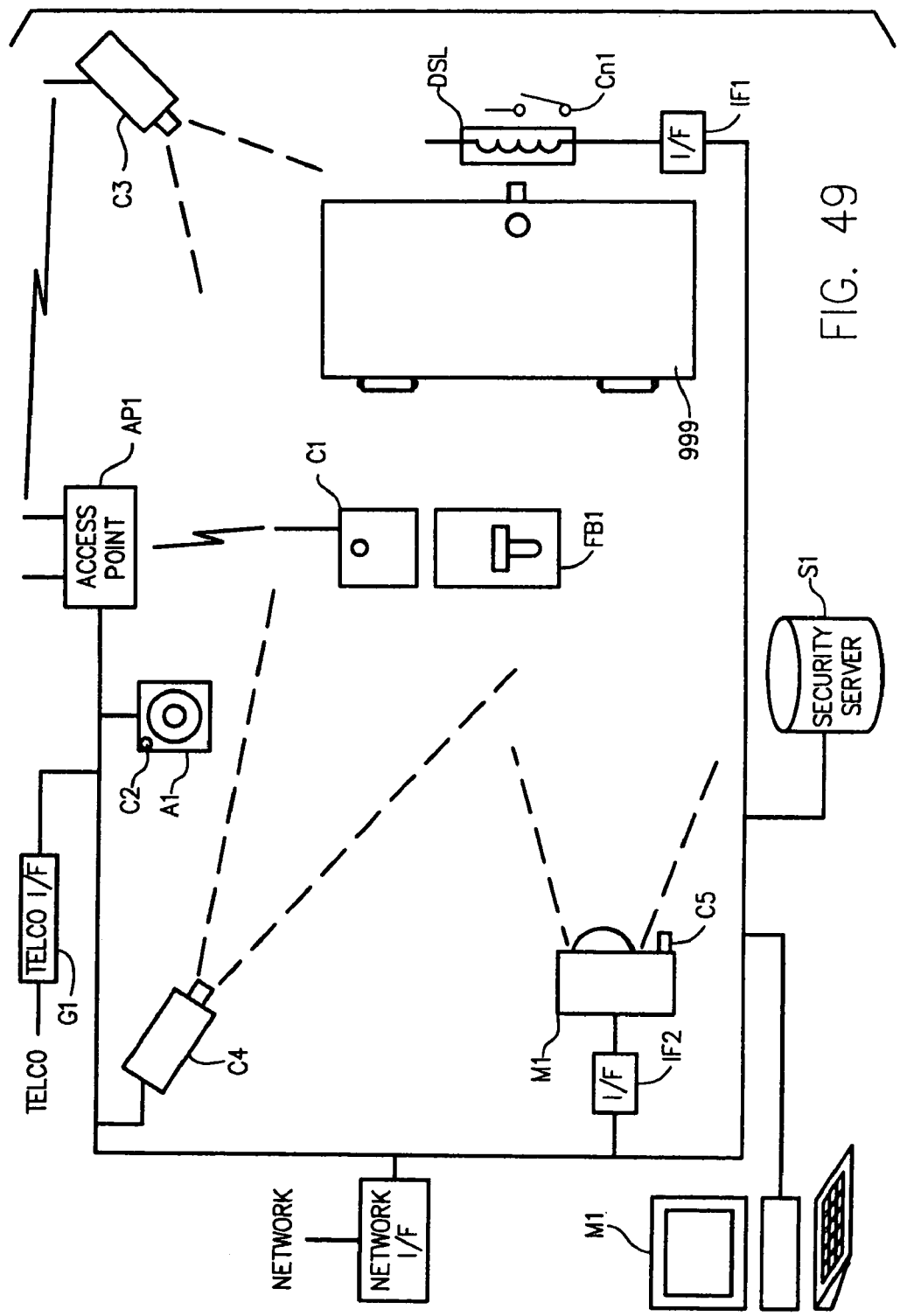

As described in connection with the mapping function, in the most comprehensive systems the network appliances and sensors and alarms will operate in clusters with overlapping zones to provide redundancy. An example of a clustered alarm workgroup is shown in FIG. 49. As there shown, camera appliance C1 is located in fire alarm pull station FB1. Camera appliance C2 is located in the siren alarm A1. Camera appliances C3 and C4 are at opposite corners of the monitored zone. An addition camera appliance C5 is located in the motion detector module M1. Contact switch appliances CN1 are located at the door strike DSL of entry door 999. A wireless access point AP1 is positioned to pick up the signal from the wireless camera C1 and the fire alarm appliance FB1 and wireless camera appliance C3. All of the other components are connected directly to a hardwired network that includes a monitor station M1, a local security server S1, camera appliance C4, and a telephone gateway G1. The appropriate interfaces are provided in the various modules or a discrete component such as interface appliance IF1 associated with the contact sensor CN1 and/or interface appliance IF2 associated with the motion detector M1. It will be noted that every area of the zone is monitored by a plurality of appliances and sensors, providing redundancy throughout the system. For example, camera appliance C4 and motion detector appliance M1 are monitoring the door 999 in addition to the contact sensor appliances CN1. Camera appliances C3 and C4 and the motion detector appliance M1, as well as camera appliance C1 are monitoring the location around the fire alarm appliance FB1. This redundancy provides accurate tracking even if one or more sensors are disabled. In addition, by incorporating a combination of wired and wireless appliances, the system will continue to operate even if a portion of the hardwired network is interrupted.

The building control system interface, such as the X-10 system described, is very useful when attached to the server. Any building controls sent, such as lights on/off, temperature adjustments, etc. can be logged on the server. Building controls can be correlated with sensors, such as cameras with lights, temperature adjustments with temperature sensors, and discrepancies can produce alarms. Also, events can cause the server to operate building appliances, such as lights as was previously described. Tables of associated sensors may be built associating multiple sensors with a zone. Multiple zones can use any combination of sensors, and any one sensor may be assigned to one or more zones. Data collection will usually be demanded of all sensors in any triggered zone.

Figure 50:
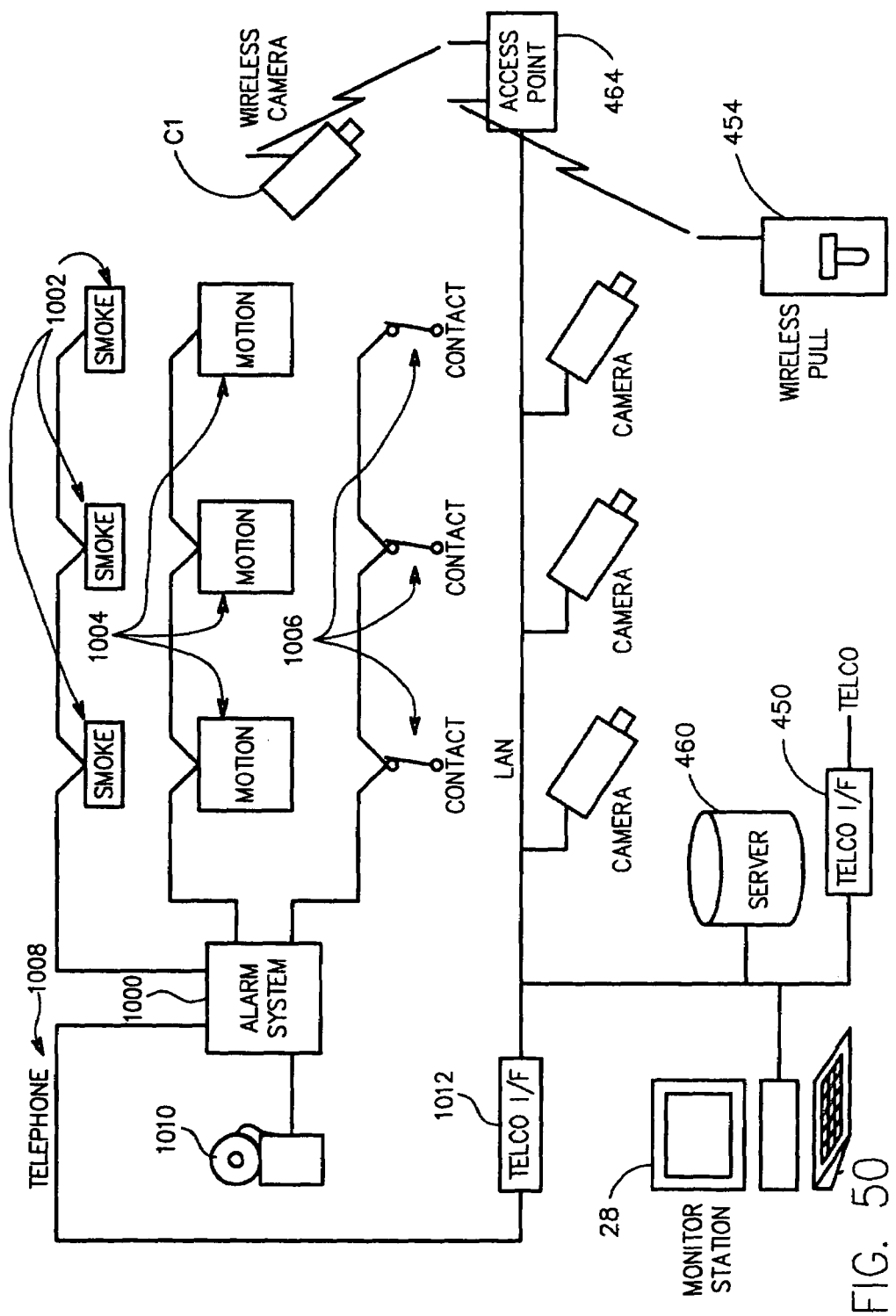

FIG. 50 is a hybrid conventional alarm system used in combination with the networked system of the subject invention. The rest of the system will then operate as described herein in conjunction with the conventional alarm system. The conventional system comprises detectors 1002, 1004, and 1006, a controller 1000, alarm bell 1010, and a telephone interface 1012 connected by telephone wire 1008. This conventional system will detect events in its normal fashion and generate a signal in the well-known manner. However, when incorporated into the system of the subject invention, the signal will additionally be transmitted to the multimedia server 28. The server will process associations and activate image, video, and other sensors based on this. In addition, the server based system can manage and archive the information generated by the conventional alarm system in the same manner as it monitors and manages information from its dedicated sensors and appliances, with full dispatch, logging, archiving and mining capability. Time integrity with the conventional alarm system events will be preserved in the logging function of the server and those events can be precisely correlated with networked sensor data.

Figure 51:
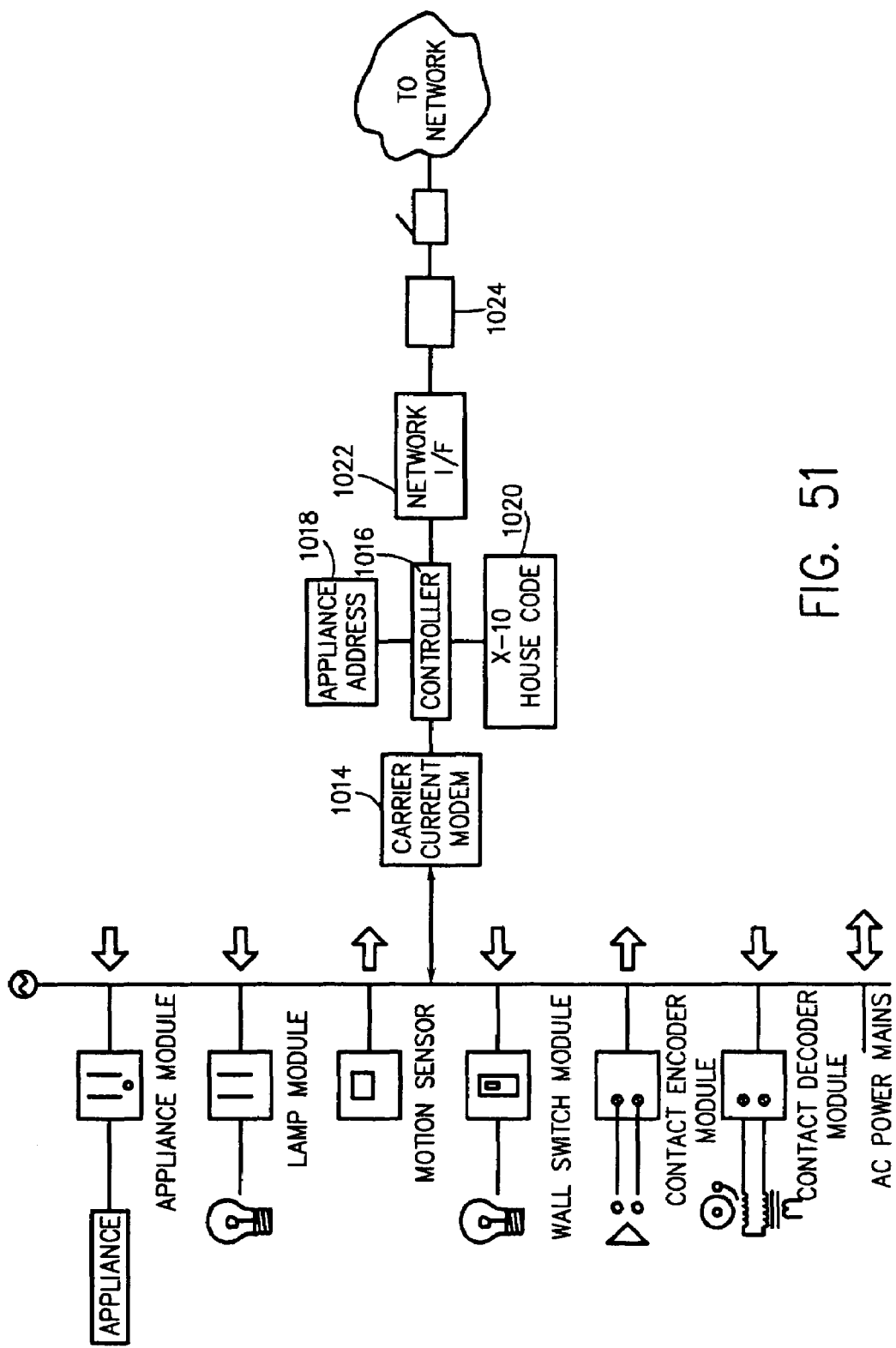
Figure 52:
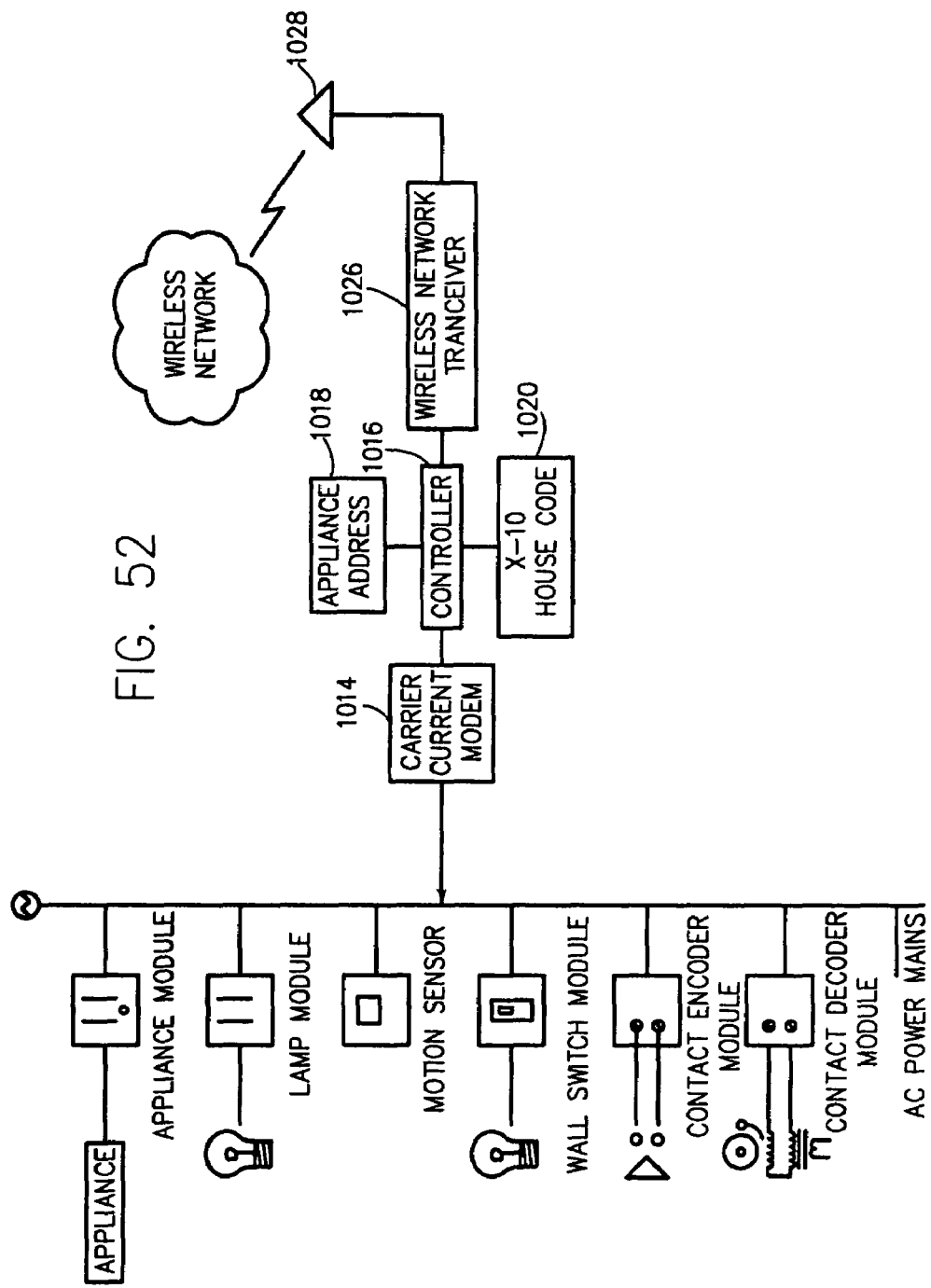

A network-to-building control system configuration is shown in FIG. 51 wherein the data transmitted to and from the various appliance modules is carried to the modem 1014 via the AC power wiring in the facility, and introduced into a controller 1016. The system utilizes an AC powerline carrier system such as the X-10 system, and in this case uses X-10 house codes set at switches 1020 by the controller and other X-10 module codes. The controller has an appliance address module 1018. The data to/from the controller 1016 is introduced via a gateway into or from a Network interface 1022 and is distributed over the Network via a RJ-45 plug and jack set 1024. A wireless version of the system is shown in FIG. 52. Like reference numerals indicate identical components. The LAN interface and RJ-45 plug and jack set are replaced by a WLAN or wireless transceiver 1026 and antenna 1028.

Figure 53:
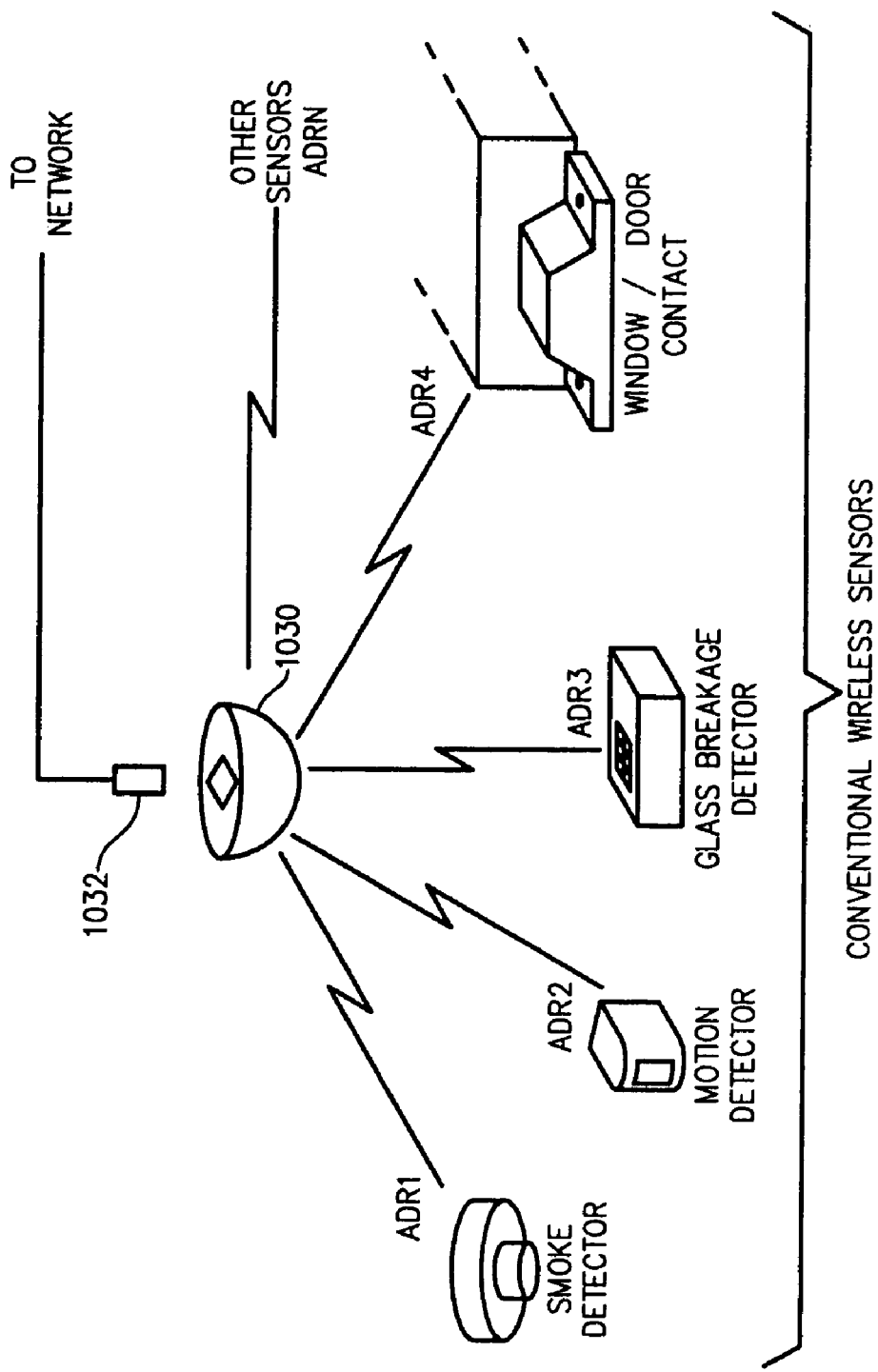

A conventional wireless alarm to network relay system is shown in FIG. 53. The various conventional wireless alarm system appliances ADR1–ADRn transmit their signals to a wireless gateway transceiver 1030 which is connected to the network via the connector plug and jack set 1032. Examples of conventional wireless alarm devices are the Rollins (now Ameritech Security link) devices such as window contacts, motion detectors, wireless smoke detectors, and the like. The transceiver 1030 interacts with the network using familiar TCP/IP protocols. As a result, the various status or alarm information received or generated by the transceiver is readily available over the network to one or more monitoring stations. Furthermore, the transceiver's behavior may thus be programmed by an authorized station over the network. For example, the motion detector may be ignored during periods when the building is in use, or the smoke detector may be cleared to prevent disruption.

Figure 54:
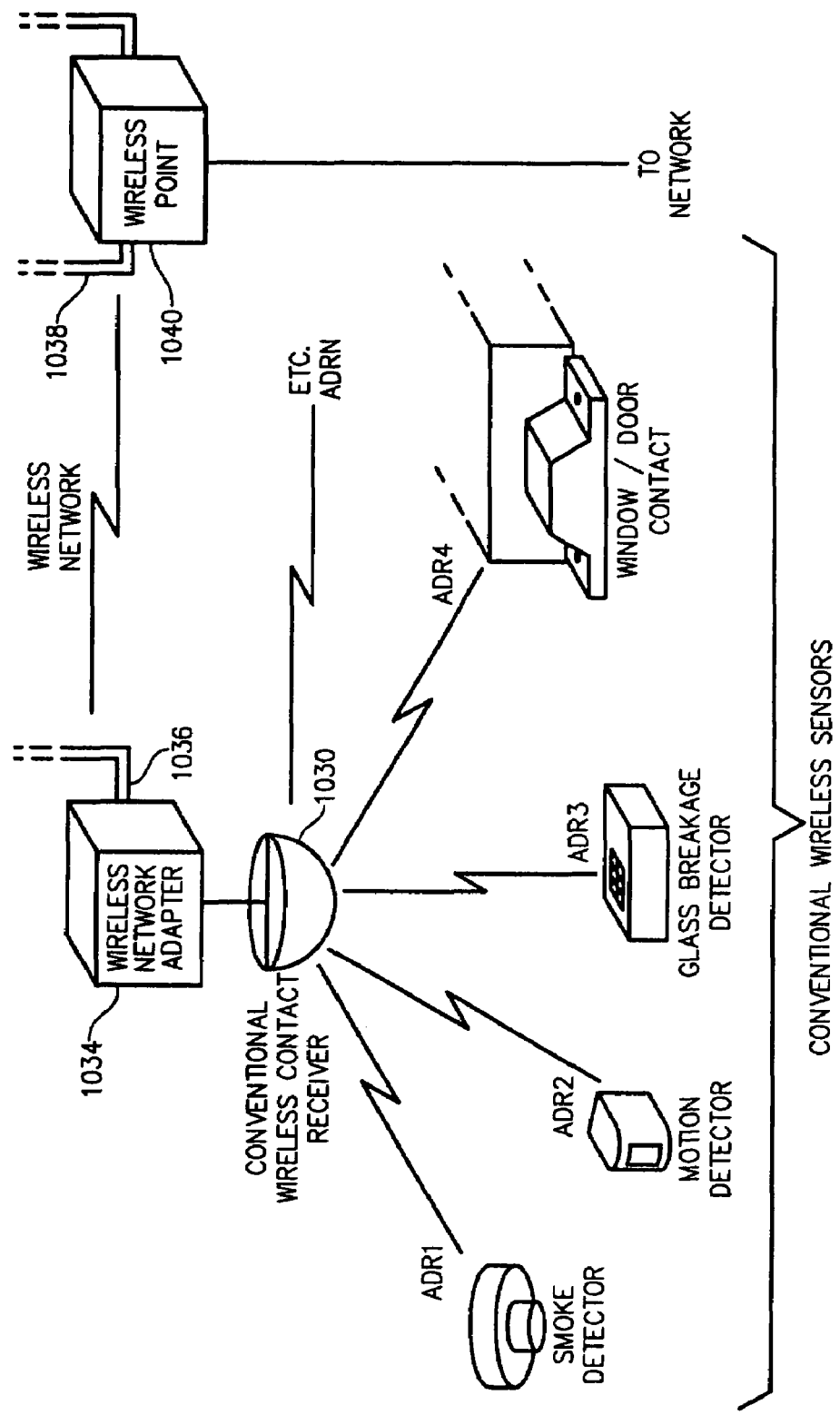

An alternative implementation to FIG. 53 is depicted in FIG. 54, wherein the wireless alarm receiver 1030 is connected to a wireless LAN. The conventional wireless contact receiver 1030 receives the standard signals from the wireless alarm devices in the conventional manner. The information received is relayed to the wireless network adapter 1034 and antenna 1036 where it is relayed over a wireless LAN or wireless carrier to antenna 1038 and as wireless point 1040 and introduced to the network. This allows conventional wireless alarm sensors to be incorporated into a larger wireless infrastructure of the multimedia security system of the subject invention.

Figure 55:
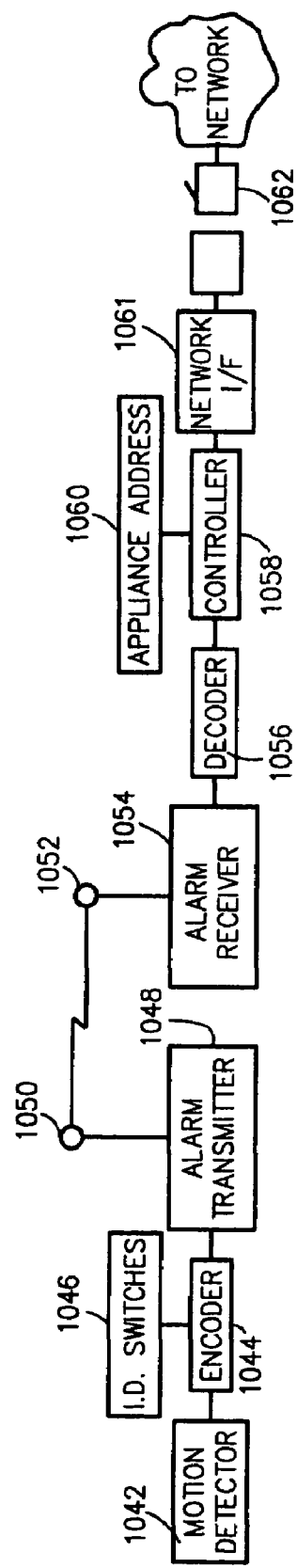
Figure 56:
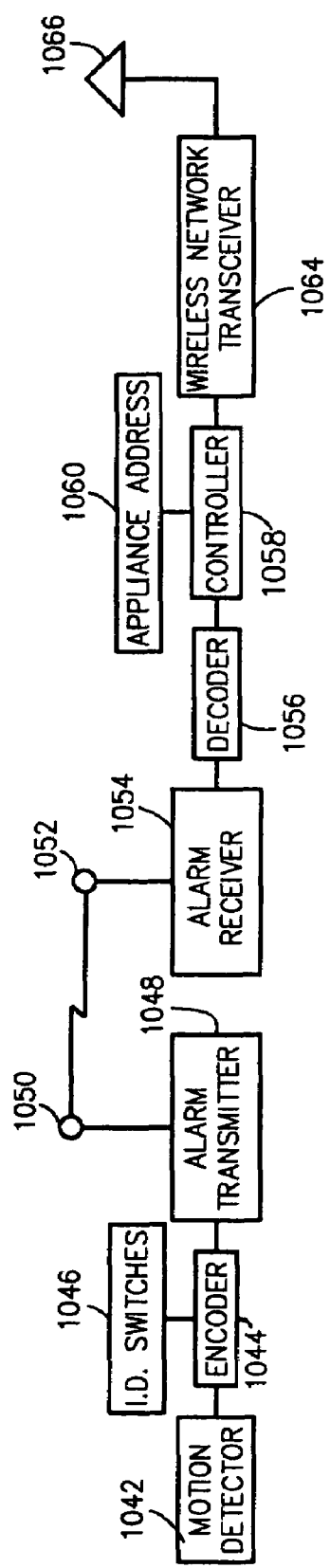

The configuration for connecting a conventional wireless alarm system to the network system of the subject invention is shown in FIG. 55. A wireless motion detector module comprising a motion detector 1042, an encoder 1044 and identification switches 1046 is connected to a wireless alarm transmitter 1048 and associated antenna 1050 for transmitting the conventional alarm signal via S1A–S1Z protocol or the equivalent. The signal is transmitted to an alarm receiver 1054 via the associated antenna 1052, where the signal is decoded at decoder 1056 and introduced into a system compatible controller 1058 with appliance address circuits 1060. The output signal is introduced to the network via the interface 1061 and a connector plug and jack set 1062. A wireless version is shown in FIG. 56 and includes a wireless transceiver 1064 and antenna 1066 instead of the interface and the connector plug and jack set. This may support wireless LAN or wireless carrier operation.

Video and Imaging Functions

FIGS. 57, 58 and 59 illustrate various application layering schemes for transmission of images and video data over networks. Specifically, FIG. 57 is directed to inserting for still video; FIG. 58 is directed to streaming full motion video; and FIG. 59 is directed to a combination of still and streaming full motion video. With specific reference to FIG. 57, the example assumes a five-second cycle time per still image. The first data sequence identifies the camera. The second sequence identifies the time and date, followed the still image at that point, followed by a gap or other data, after which the cycle repeats with a new real-time image. As shown in FIG. 58, real-time streaming video utilizes the NTSC frame equivalent of $\frac{1}{30}$ second (note that MPEG data does not necessarily correlate to field/frame conventions).

As shown in FIG. 59, the real-time streaming video can be combined with the still image layering scheme with the gap after the still image filed with streaming video data, and where desired, other data. Also, the server can sense or control the lighting to correlate sensor blackouts with lighting control. Alarm conditions would not be generated if they were verified to correlate to appropriate lighting changes. The sensor, however, can also be used to verify lighting conditions. If lights were turned off when they were supposed to be on, or on when they are supposed to be off, alarm conditions can be generated.

Configurations Incorporating Telephone Technology

Figure 60:
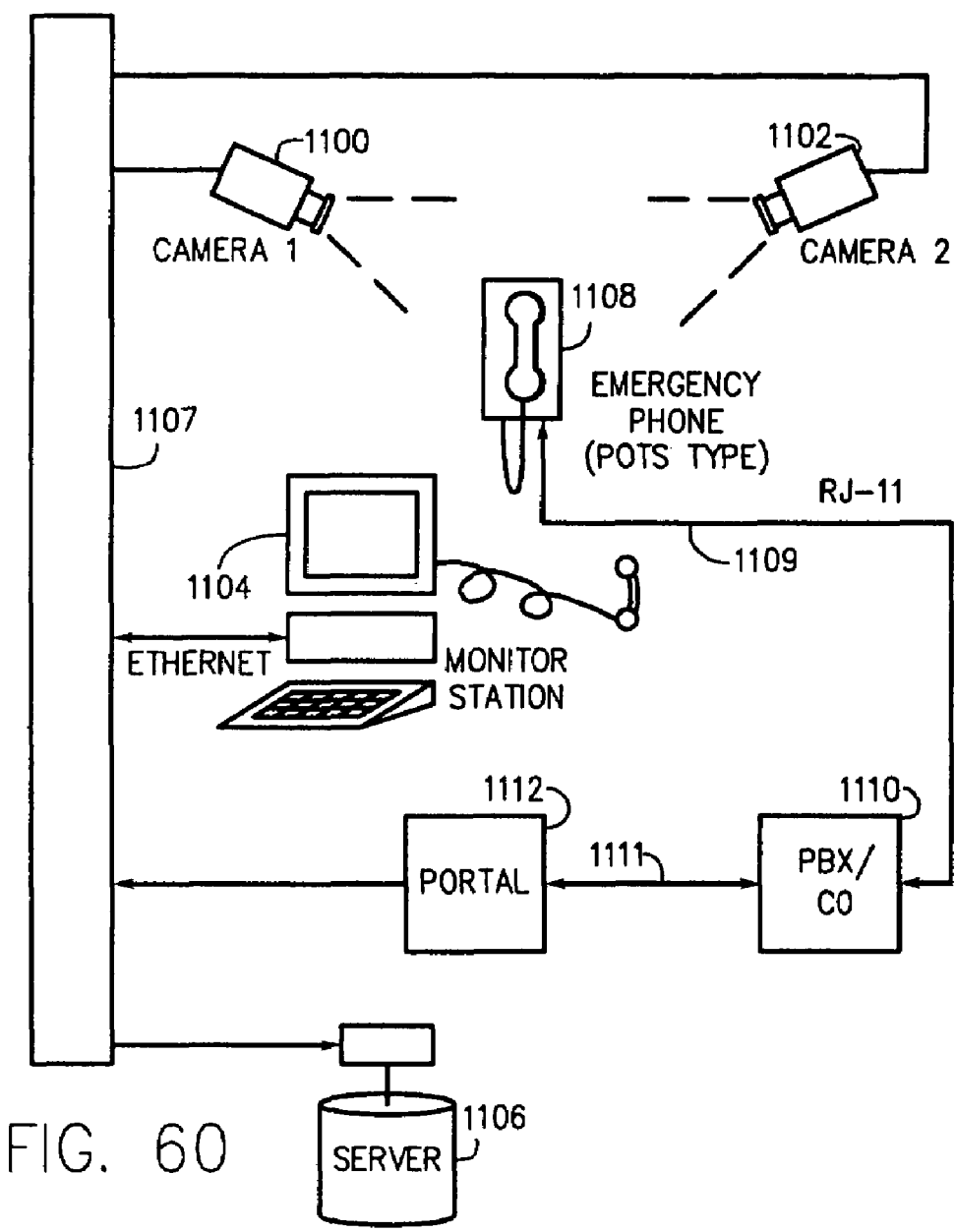
FIGS. 60–66 are illustration of system configurations utilizing various telephone appliances as part of the overall system of the subject invention.

FIG. 60 illustrates an integration of the invention with a local facility PBX. As there shown, cameras 1100, 1102, monitor 1104 and server 1106 are connected in the previously described network configuration as indicated at 1107. A POTS emergency telephone appliance such as a public pay telephone is shown at 1108 connected via an RJ-11 connection 1109 to a standard PBX or central office switch 1110. The PBX switch 1110 is hardwired via the connection 1111 to a PBX network portal 1112, providing connection to the system network. This permits standard telephones, perhaps already on a security system such as, for example, elevator emergency telephones, to be connected and integrated into the security system of the subject invention using a standard PBX switching configuration. The emergency call is registered through the PBX, such as using "Caller ID" techniques, in the well developed manner, along with following voice messages passed via the network to the server. The server can then match the associated ID in a look up table to determine the exact location of the incoming emergency call and dispatch the appropriate response as described herein. The server will also record and log the data, as well as identify and match appropriate camera images from cameras 1100 and 1102. The server can also pass on the recorded audio or can stream "real-time" to monitor stations on the network, or dialed monitor stations or voice devices.

Figure 61:
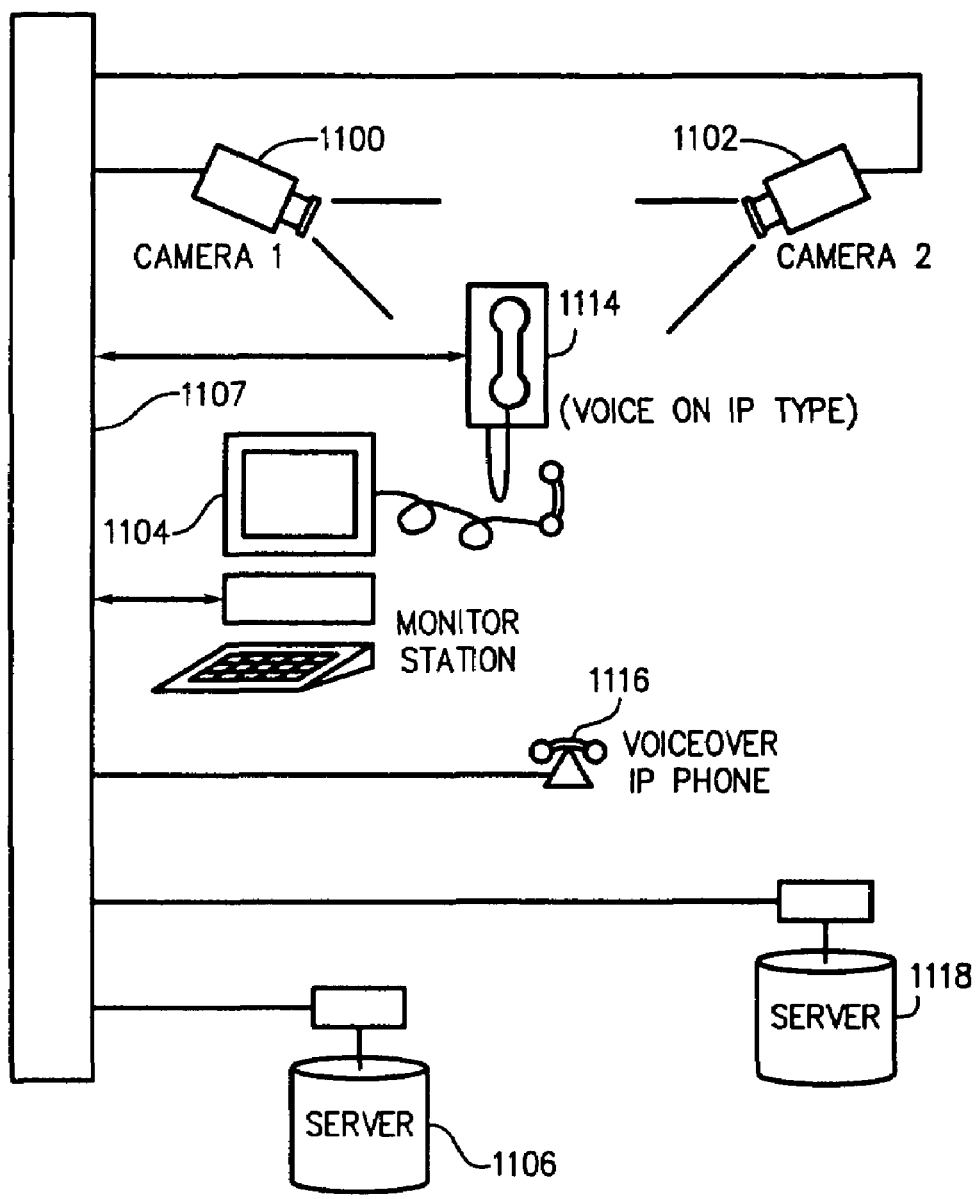

FIG. 61 depicts an all-digital approach. It is similar to FIG. 60, but includes a voice over IP type emergency telephone 1114 such as a pay or public access telephone and a second voice over IP telephone 1116. A voice server 1118 is also provided, with all components being connected in a network configuration as indicated at 1107. The voice server may be combined as and be included as an integral feature of the security server 1106. In this configuration a LAN, WAN, network and server configuration provides the telephone switching and identification functions. The operational aspects of the system are as described in connection with the POTS system of FIG. 60.

Figure 62:
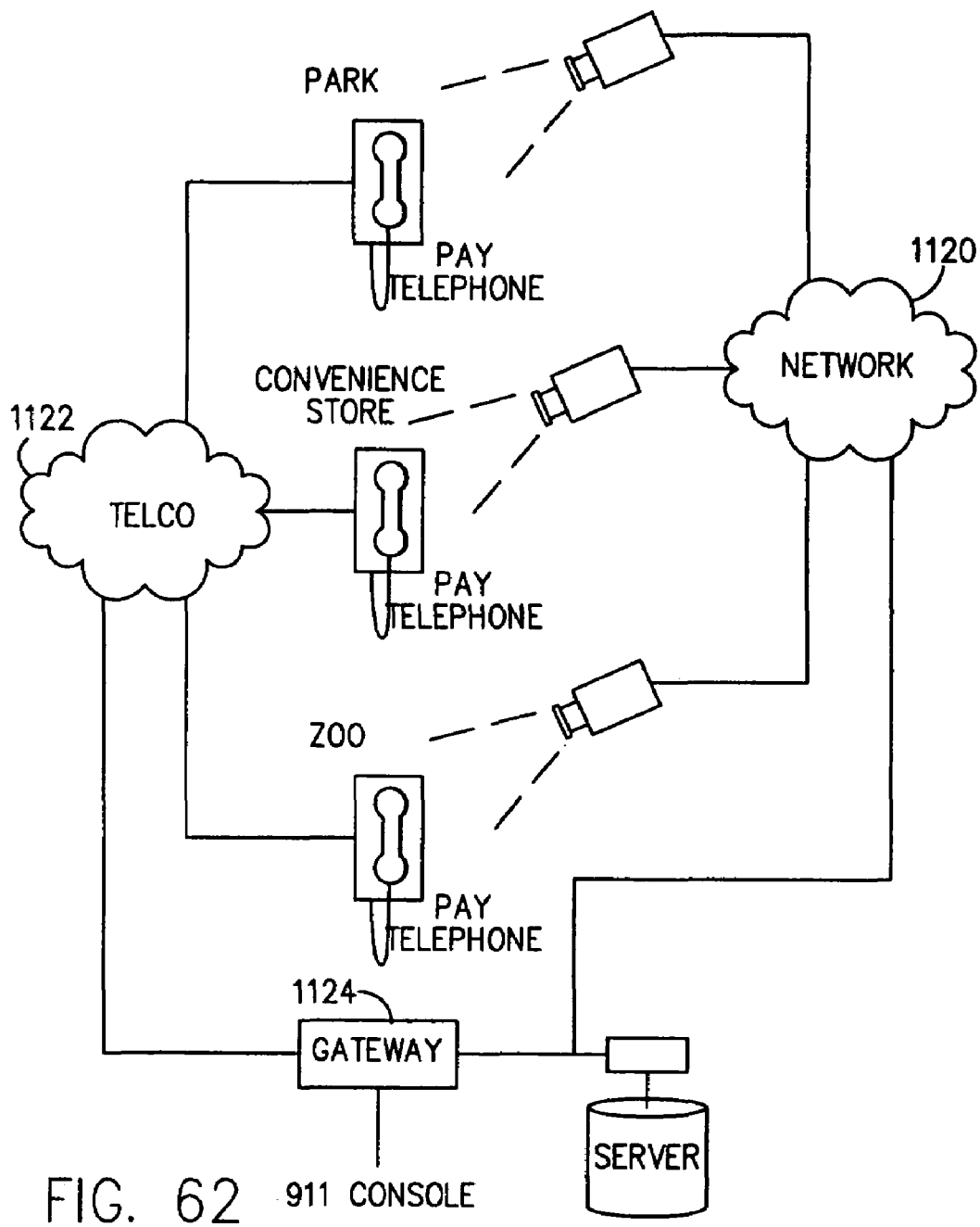
Figure 63:
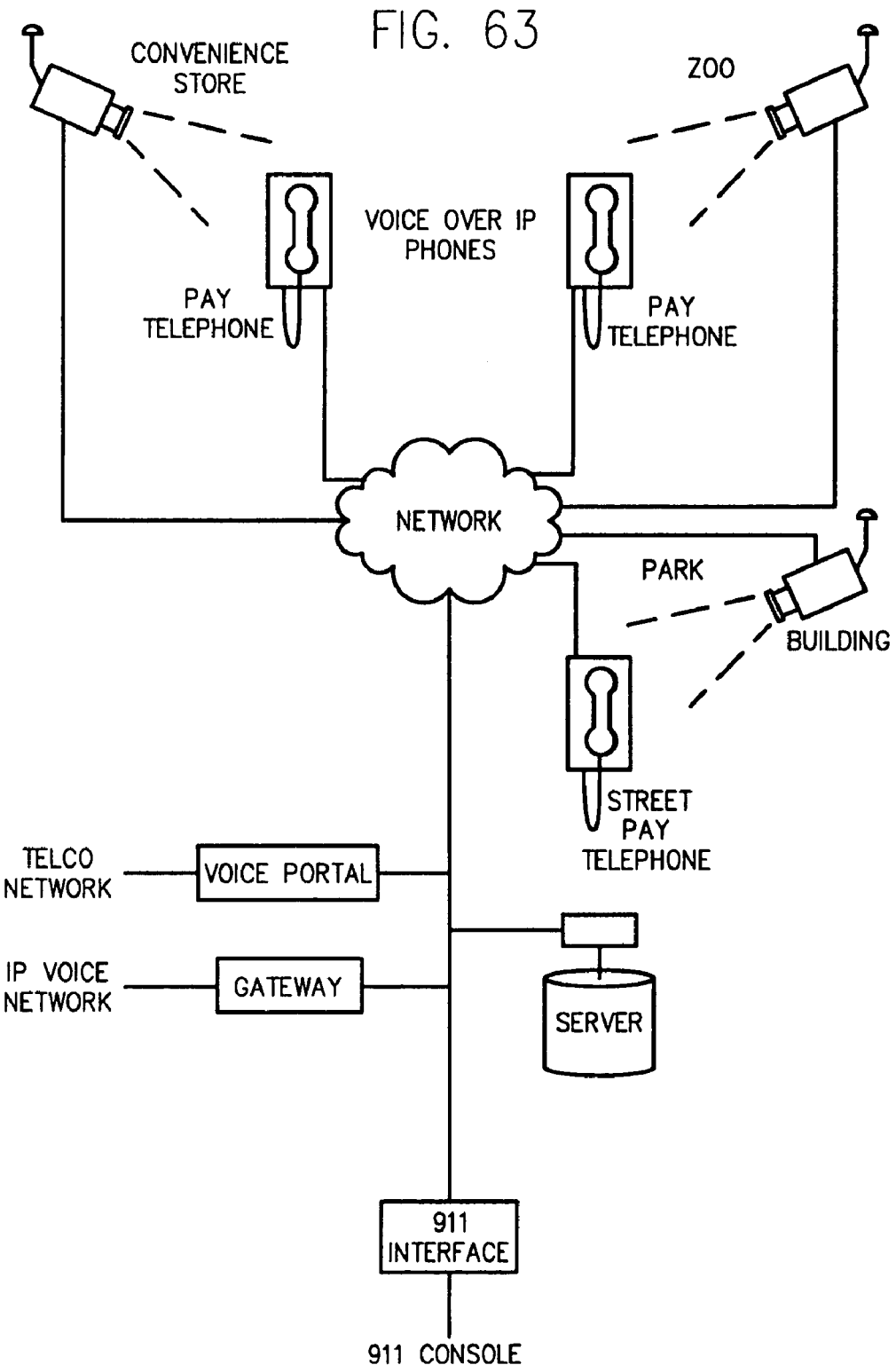
Figure 64:
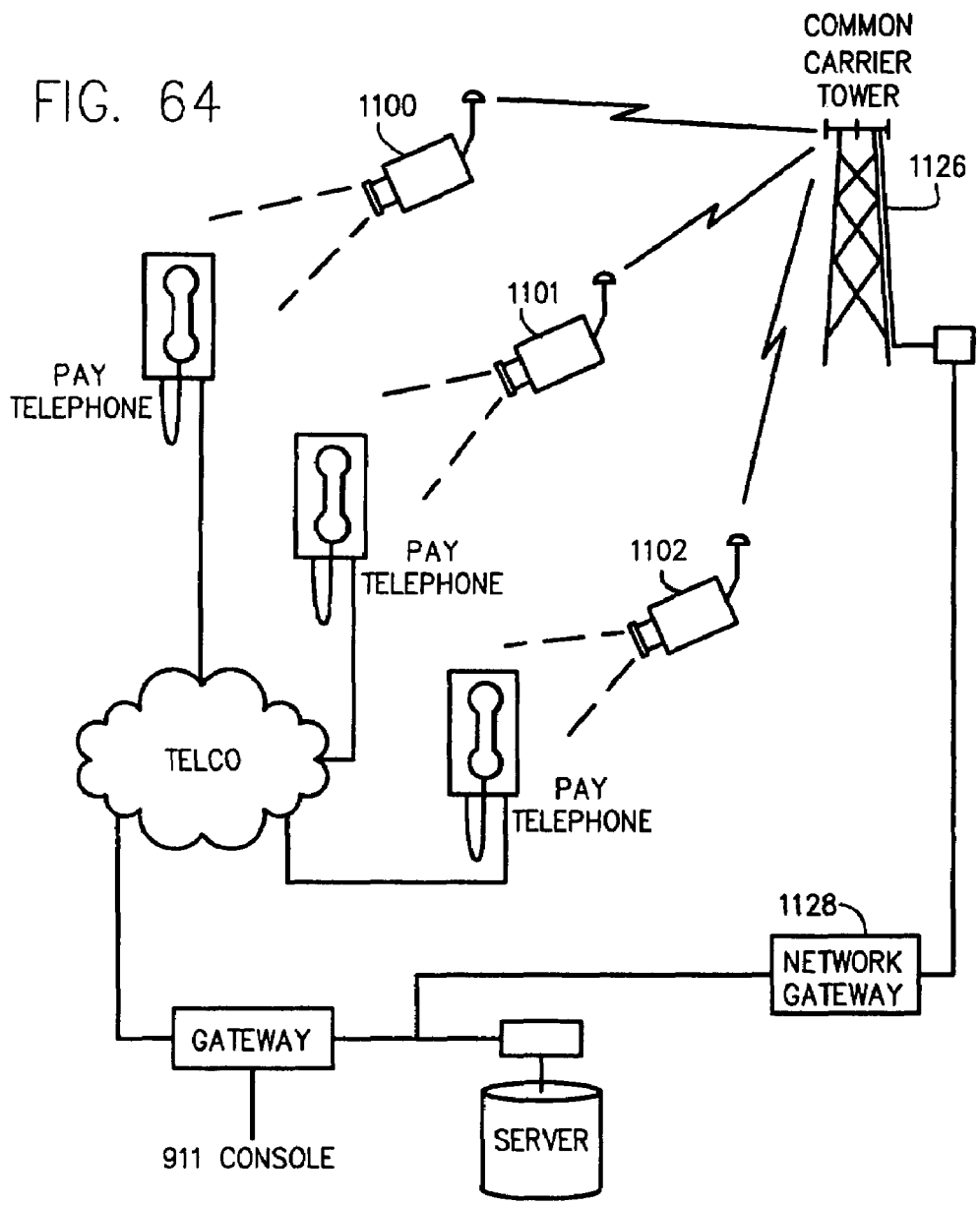

As shown in FIG. 62, this same principle can be applied in a wide area system using conventional voice telephony and WAN video. This configuration uses a WAN such as the Internet 1120, the public telephone company, indicated at 1122 and where desired, a "911" gateway console 1124 which operates in the well-known manner. This technique is utilized to provide wide area coverage using the public telephone network in combination with a WAN such as the Internet. All "normal" telephone calls may suppress video collection and surveillance. A "911" call will trigger collection, surveillance and the various monitoring, logging and dispatching functions of the system. As shown in FIG. 61, IP telephones may be used in the wide area service configuration of FIG. 62 as well. It will be understood that IP and POTS telephone appliances can also be used in combination. A system utilizing wireless appliances and a wireless communications system such as CDPD or CDMA is shown in FIG. 64. In this system the cameras 1100, 1101, and 1102 transmit to a tower 1126 which is connected to a network gateway 1128. This configuration offers low costs to retrofit existing locations to video surveillance, since there is no associated cost of cabling.

Figure 65:
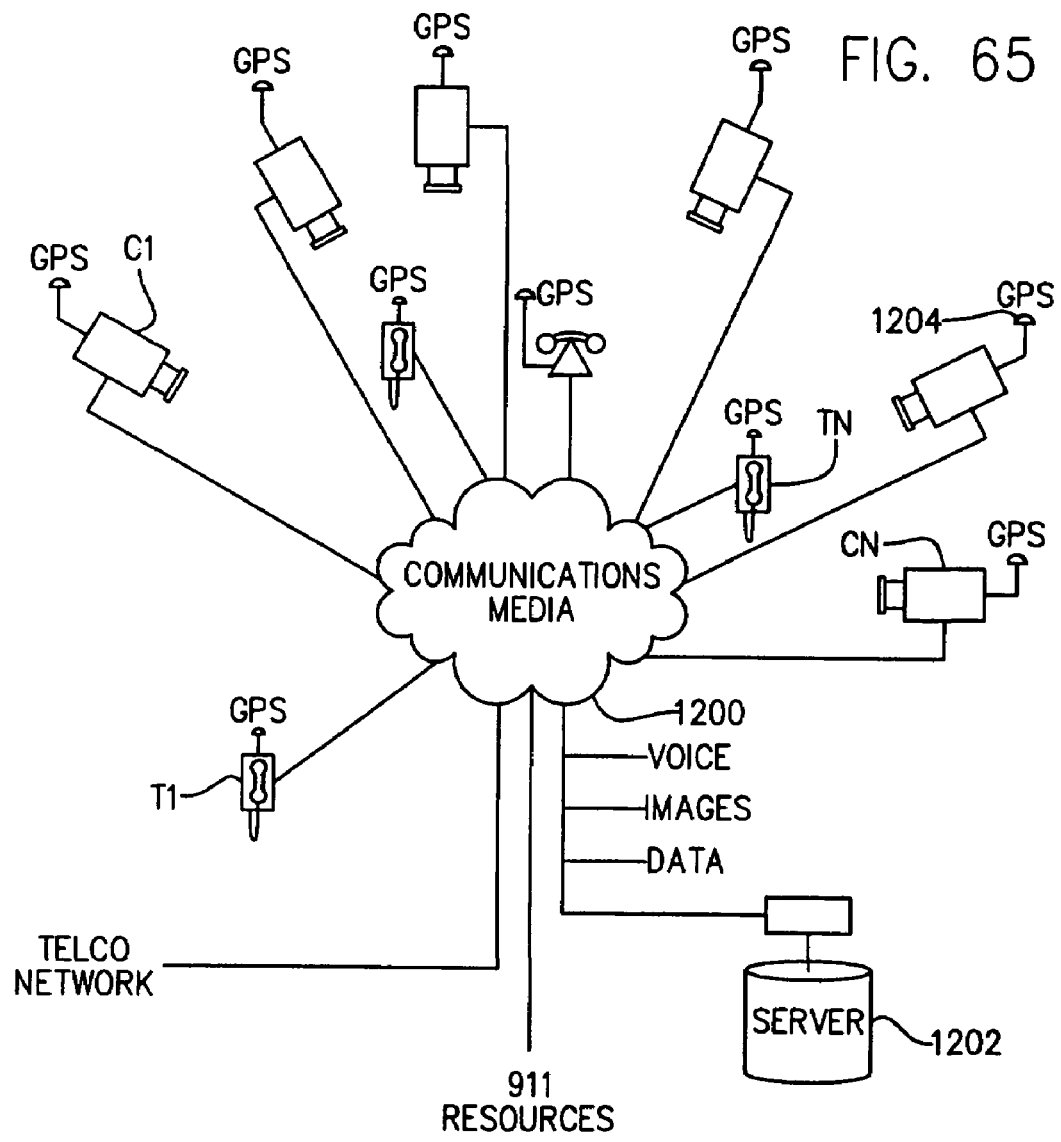

FIG. 65 is an illustration of a GPS telephone and camera association configuration utilizing a communications media network 1200 for connecting a plurality of cameras C-1 through C-n and a plurality of telephones T-1 through T-n to "911" resources, the public or other telephone network and a system server 1202 Each appliance includes and integral GPS receiver 1204. Both wired and wireless appliances may be incorporated in the system, all with integrated GPS receivers. The network server "learns" the location of the resources and automatically builds association tables. Cameras can be activated based on their proximity to emergency call automatically, as described above, or can be activated by other criteria as disclosed elsewhere herein. This technique and configuration also permits use of an existing appliance, such as a pay telephone, to be supported by installing a GPS equipped camera in a zone including the pay telephone. If a call is placed from the pay telephone, the camera and its GPS signal are logged on the system, also giving the location of the pay telephone. A fully automated GPS system may also be used with non-GPS devices if tables of locations of those devices are built and integrated into the database.

Figure 66:
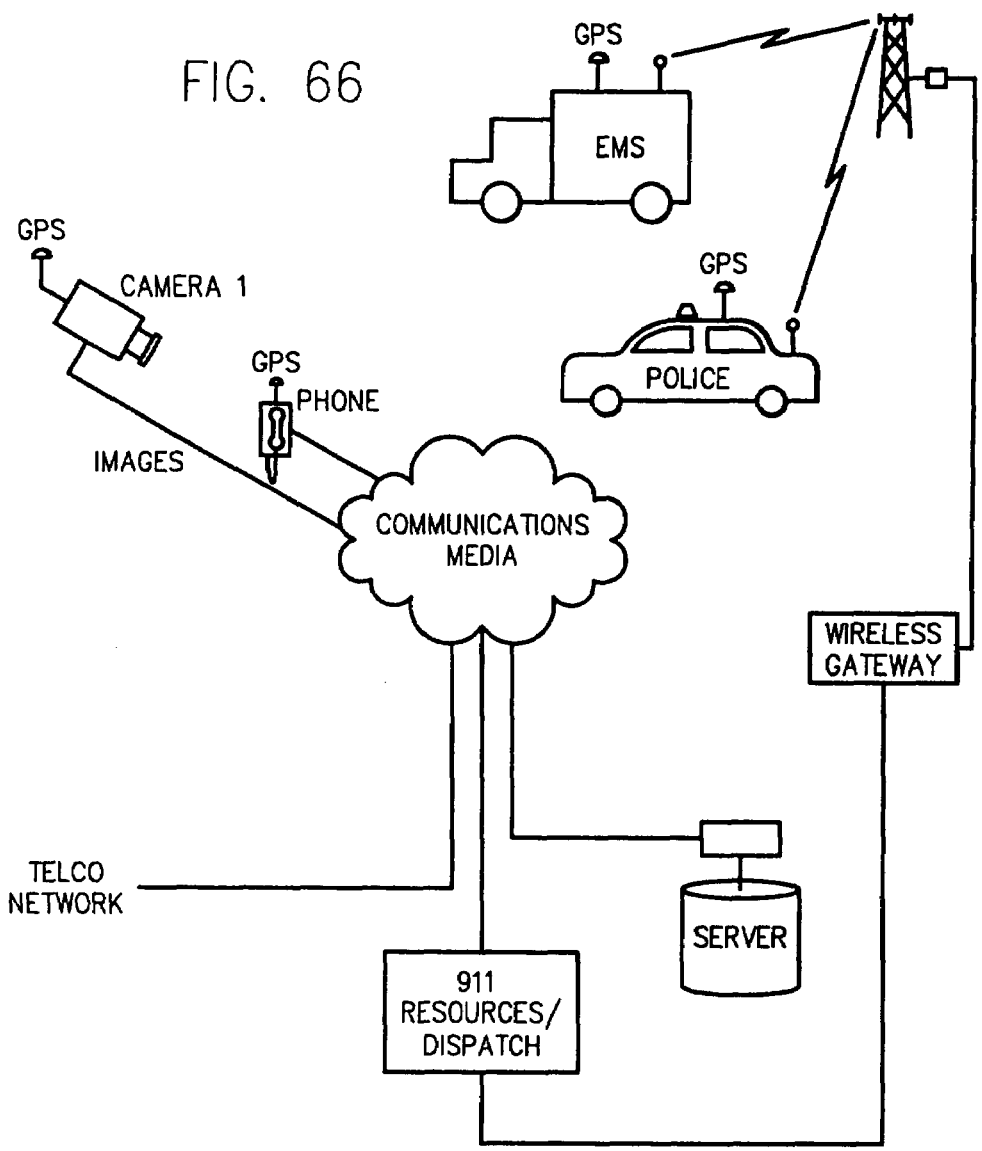

FIG. 66 is an illustration of how the communications media network such as that shown if FIG. 65 can be utilized to dispatch emergency response resources directly to the location of the emergency call or emergency event, using the dispatch feature of the invention in combination with GPS signal monitoring and management of emergency response resources such as the police and EMS vehicles shown in the drawing. The server can track the location of all response vehicles utilizing the GPS signals, isolate the distance between the incident and the response vehicles and dispatch the closest vehicle. The resources are automatically dispatched according to location of the vehicle relative to the event. The image from the proximity camera can be transmitted directly to the appropriate vehicle via the network communications system. All mobile devices that can be precisely geo-located, such as cellular telephones with GPS, and any other mobile appliance or resource, can be viewed with the closest camera. For example, a "911" call from a hand carried cellular telephone with GPS would permit the system to locate and activate the nearest camera to immediately provide image data at the location of the call. Other fixed telephones and cameras for which the location is known and is entered into the location database can also participate. Caller ID address information can also be used to calculate the location relative to responding vehicles and provide appropriate dispatch of same.

Access Control Feature

An important aspect of the invention is the flexibility of the design to incorporate a variety of appliances in a combination format to provide a comprehensive, multimedia security and surveillance that may be installed in new or existing structures with a minimum of disruption or reconstruction. An example of the versatility and benefit of this design capability is shown if FIGS. 67–72, wherein it is illustrated how well-known access control type appliances may be incorporated in the system with minimum installation complications.

Schools, banks, government buildings, and the like have a need to control access to specific areas to specific personnel, log the access of controlled areas by personnel, to know the location of individuals, and verify identity of individuals. The network appliances of the subject invention may be used to meet these functions as well, and in combination with the server capability provides a comprehensive access control system. For example, the security system fixed monitors, and roving monitors can be used to verify personnel identity:

Equipped with keyboard-name, ID number, biographic information, employment status, photo.

Equipped with card reader, such as mag card, bar code or proximity: Card in, name, ID number, biographic information, employment status, and photo.

Equipped with fingerprint reader can verify ID by fingerprint in: name, ID number, biographic information, employment status, photo.

Equipped with voice print recorder: can verify voice print.

Equipped with fingerprint readers: can verify ID by fingerprint in, name, ID number, biographic information, employment status, photo.

The server accomplishes the verification process. Computationally intensive pattern matching functions, such as fingerprint or voiceprint, can be accomplished locally within the appliance, or remotely by the server by passing the data to the server.

Figure 67:
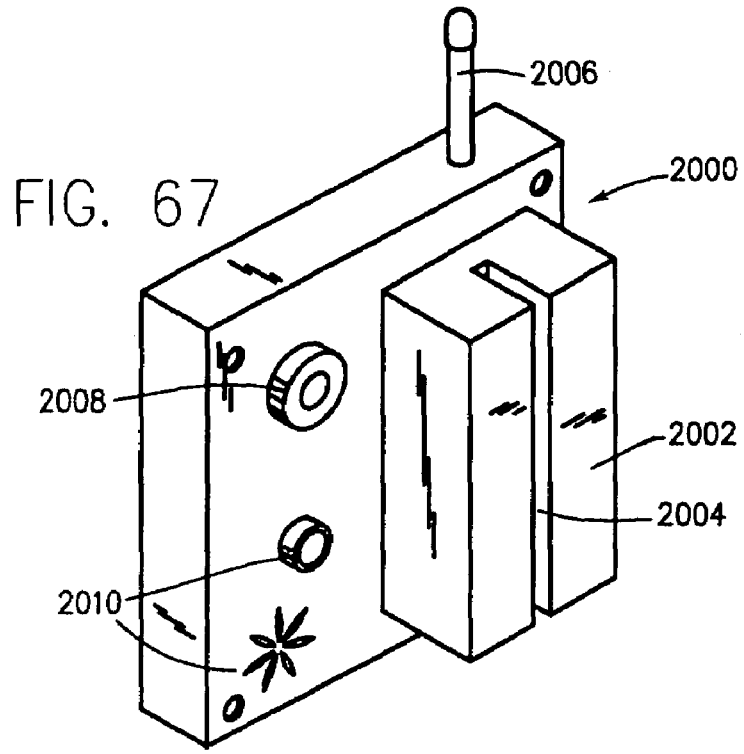
FIGS. 67–72 illustrate an alternative embodiment incorporating access or entry control appliances in the systems of the subject invention.

As specifically shown in FIG. 67, as with any typical access control device, the device 2000 of the subject invention includes a card reader 2002. As illustrated, the card reader includes a slot reader 2004 for receiving and reading the magnetic strip on a typical credit card type identification badge. It will be understood, of course that other readers, such as chip readers and the like, can also be used. The device 2000 is includes a wireless transceiver, as previously explained, for transmitting and receiving data via the antenna 2006. This permits the access control appliance 2000 to be installed anywhere in a system without requiring hard wiring to the base control unit. Of course, as previously described, the access control appliance can be hardwired where desired. In the embodiment of FIG. 67, the device includes an integral camera 2008 for permitting visual identification. A speaker/microphone system 2010 is also included in order to permit verbal communications. Typically, an integral microprocessor (not shown) will be included in the device to manage the data collection and transfer in the manner described with other appliances described herein. The access control appliance permits access control using the system wired or wireless local networks, eliminating the need for a complete, independent circuit for access control. While a card reader is shown, it should be understood that other entry appliances such as a biometric sensor or a keypad entry system could be utilized. As with the other appliances shown and described herein, utilizing the access control device with the subject invention permits the incorporation of imagery, step video, full motion video and audio capabilities. Where desired, the access control appliance can include other sensors and monitors as well, such as, by way of example, motion sensors and temperature and humidity sensors, thereby providing a comprehensive monitoring device and capability wherever an access control device is installed.

Figure 68:
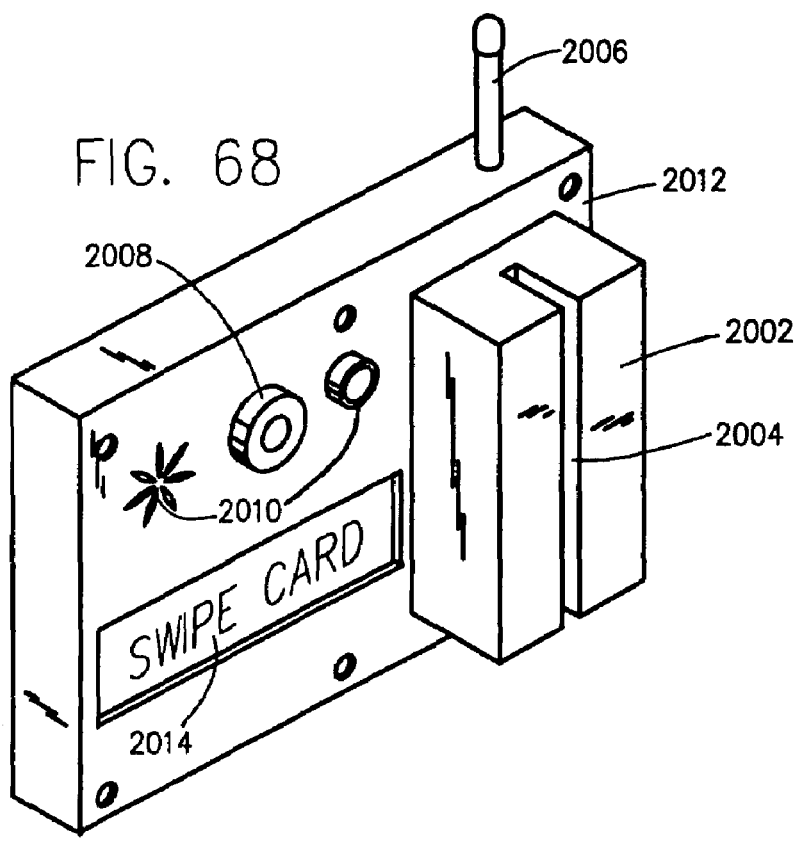

An enhanced access control device 2012 is shown in FIG. 68. This device includes all of the features of the device shown in FIG. 67 and, in addition, an audio video display 2014 for providing instructions and information to personnel utilizing the device. For example, the display 2014 may read, in sequence: "SWIPE CARD"; "ACCESSING"; "CARD READ"; "ENTER". The display may be LCD, LED, vacuum fluorescent, or the like.

Figure 69:
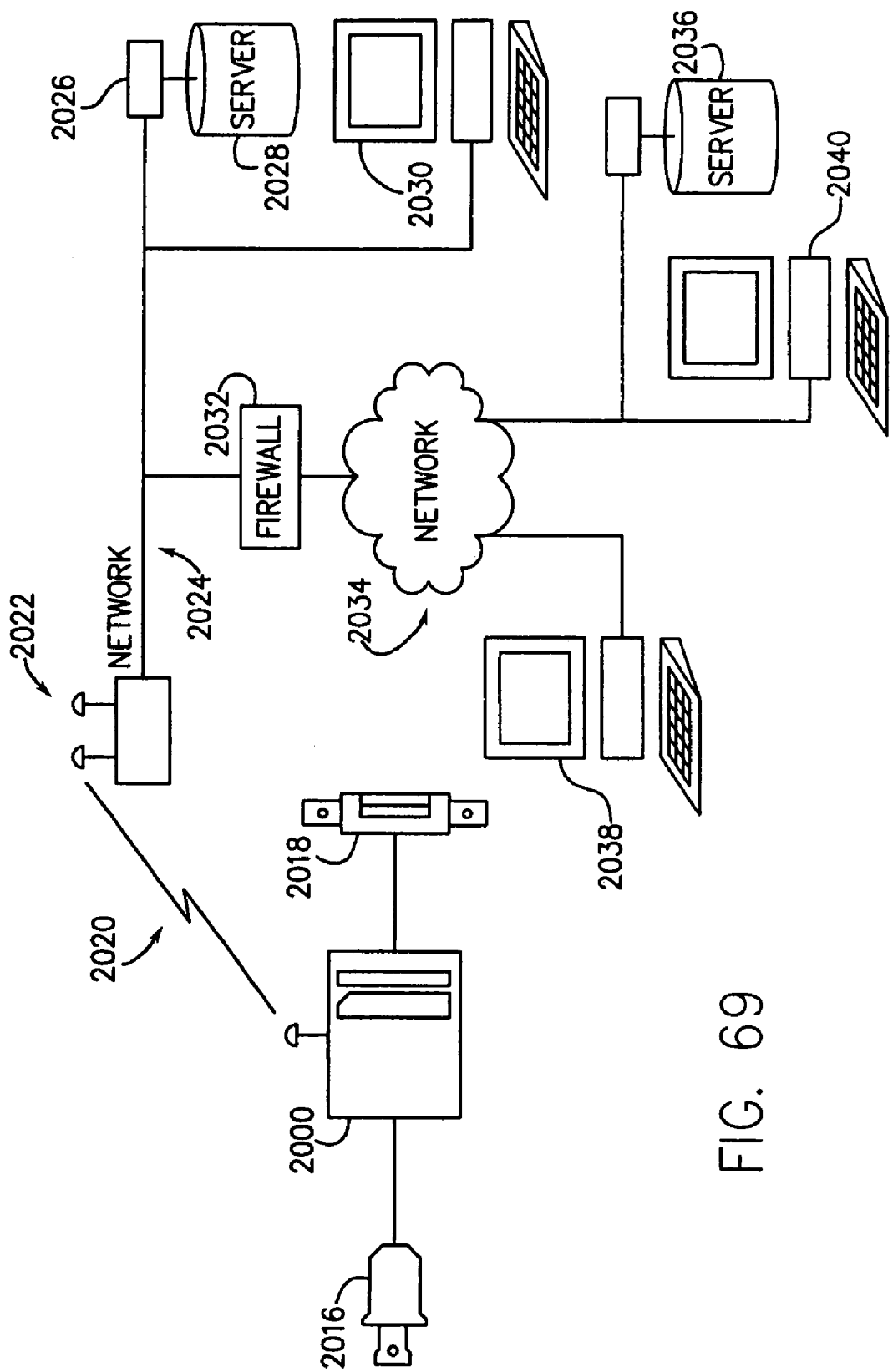

A typical circuit for incorporating an access control system is shown in FIG. 69. Each access control appliance 2000 is installed at desired location and is typically hardwired to a power supply 2016 and a controlled lock system such as the electromagnetic door strike 2018. The data is transferred to and from a local security server 2028 via the wireless system network 2020 and the gateway or access point 2022. The network can also be wired as described elsewhere herein. The local security server 2028 will typically include a processor 2026 and a monitor station 2030, operating in the manner previously described. Where desired, remote monitoring and control may also be incorporated though the firewall 2032 for connecting the system to a wide area network such as, by way of example, the Internet, for providing communication links to remote security server(s) 2036 and remote monitoring station(s) 2038 and 2040.

The access control appliance is typically a card reader appliance using ID cards. However, other ID methods can be used in conjunction with, or independently of a scannable ID card. Particularly since ID cards can be stolen, in some applications it may be useful to utilize fingerprint scanners or other positive ID devices. The access control is used to performed any one or more of the following functions:

Verify Attendance
Open Door
Unlock Database for information retrieval to display
Unlock Building Controls to make adjustments, such as:
Lock/Unlock Door
Lights On/Off, Dim
Adjust Temperature
Adjust Fan Speeds
Select Channels, such as audio/video feeds
Adjust Volume of Speakers
Lower/Raise Screens
Open/Close Blinds
Reset Alarms
Other controlled functions.

As previously described, these same functions may also be performed with a portable or roving PDA. For example, attendance could consist of passing around the PDA and all students would swipe their card.

Figure 70:
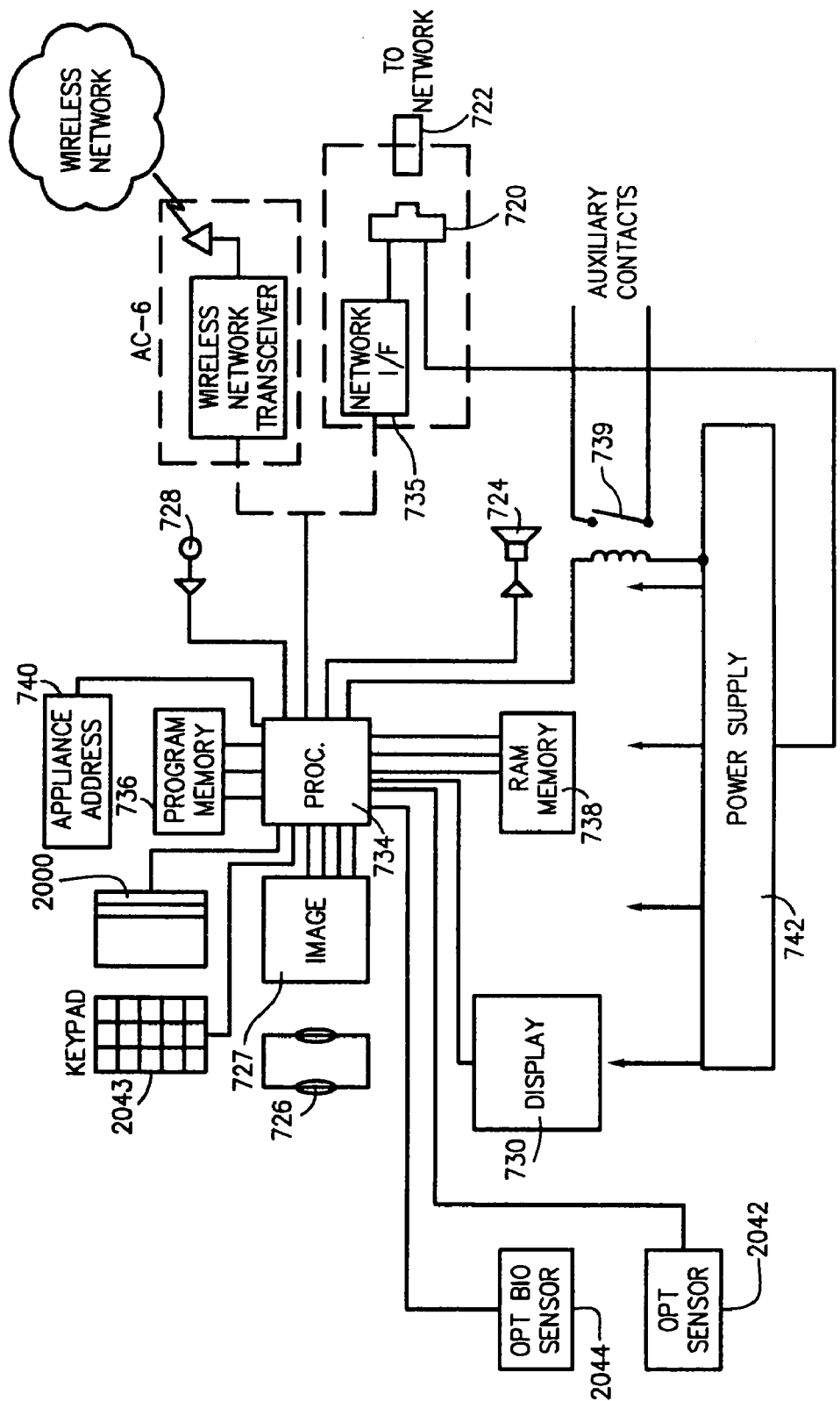

A comprehensive system diagram for the access control feature is shown in FIG. 70, which is based on the previously described circuit of FIG. 21. As with the previously described appliances, the access control appliance relies on a processor 734 which is in communication with the network interface 735 or wireless network transceiver AC-6 for controlling the unit. The power supply 742 is also connected to the network through the connector plug and jack set 720, 722. In the wireless configuration, only power is connected in this manner. The circuit is provided with an appliance address circuit 740 for identifying the unit, a program memory module 736 and an on board RAM memory component 738. As with the previously described camera units, a PC camera chip 727 is in communication with the camera lens 726 for collecting the raw video data and introducing it to the processor.

Auxiliary contacts 739 are supplied for control of external devices, such as an electric strike to unlock a door. The auxiliary contacts may then be operated in conjunction with a keypad, or the keypad and the server, or other biometric controls, thus providing access control. An image of the person attempting or completing access may be collected as described above. Other optional sensors, such as contacts or infrared, ultrasonic, or RF sensors 2042, when wired, or an external power source, and various access control devices such as the keypad 2043 and/or the biometric sensor, such as a fingerprint sensor, 2044 may be utilized with or as an alternative to the card reader 2000.

Figure 71:
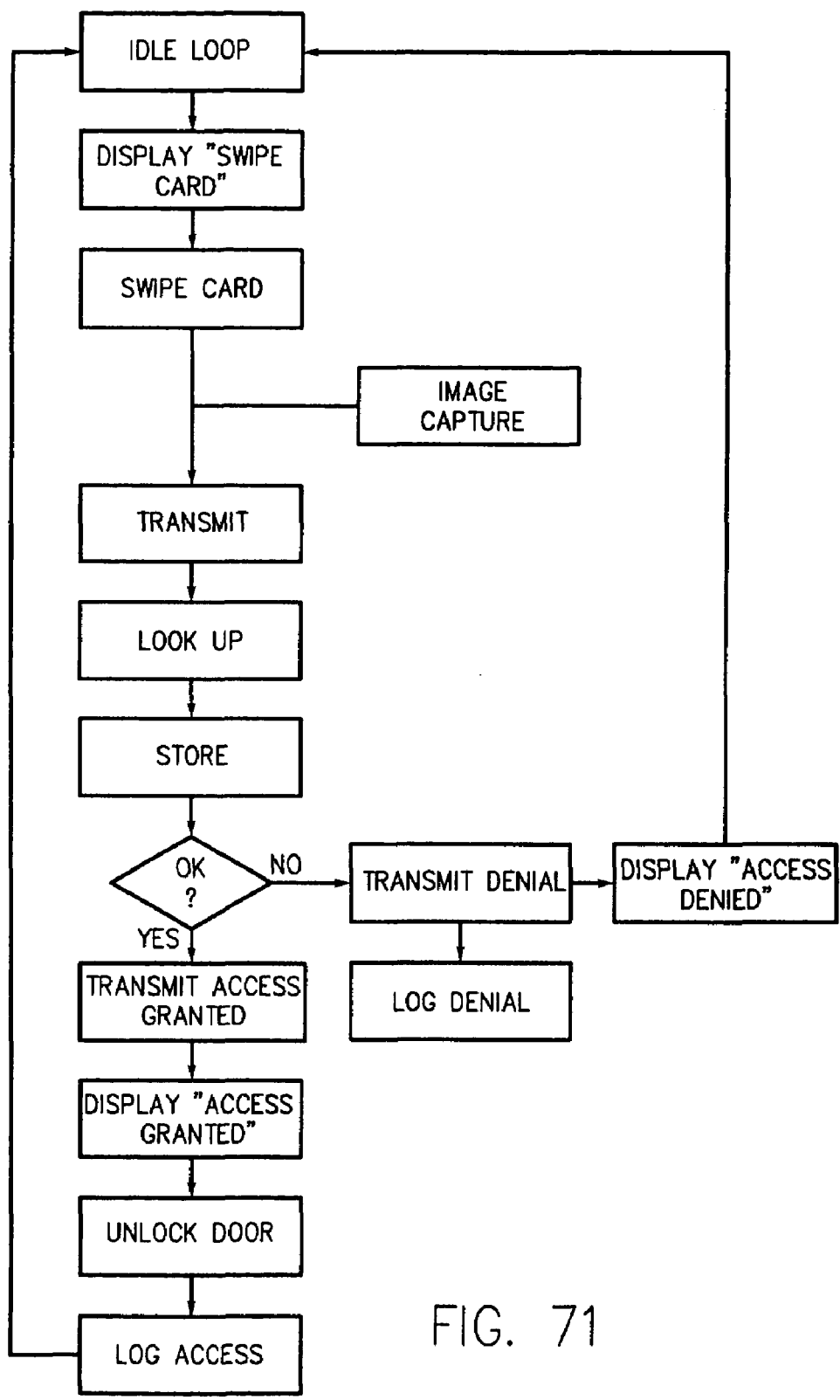

A typical decision or information flow diagram for the access control feature is shown in FIG. 71. When the access control appliance is dormant, i.e., no one is attempting access, it stands ready in an "idle loop" stand-by mode. At this point the audiovisual display will indicate "SWIPE CARD". When personnel attempts to gain entry, he will first swipe his card in the reader. The information on the card is then read and transmitted to the server. If visual identification is provided by the camera this will also be transmitted to the sever. The information is then located in the database and if authorized, an authorization signal is generated. At this time the display will read "ACCESS GRANTED" or a similar message. The door contacts will be opened for a predetermined period of time and access is permitted. The time of access, location and identity of personnel is logged on the server. If audio is included, voice instructions may also be given at any time throughout the sequence. If access is denied, a denial signal will be transmitted and the visual display will read "ACCESS DENIED". This information will also be logged, along with the attempted identity of the personnel and visual identification, if used. One advantage of the networked system of the subject invention is that it permits access to be controlled immediately by updating the server. This means the card or identification carried by the personnel does not have to be confiscated if access is suspended for any reason. Also, different hierarchies of access can be readily controlled at the server, without modification of the portable identification devices carried by the personnel.

Figure 72:
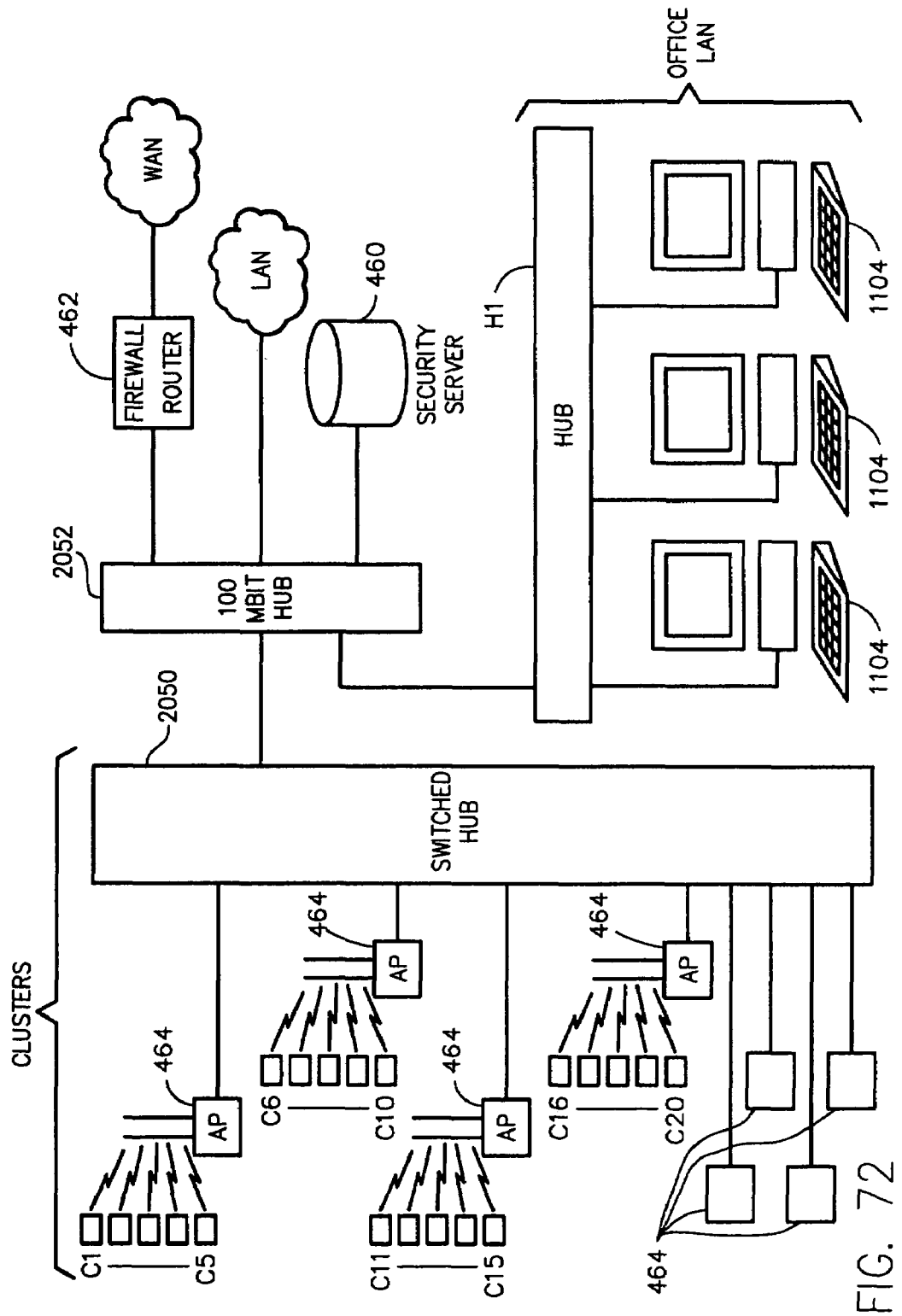

FIG. 72 shows how the system of the subject invention can be used to provide monitoring of a plurality of installations using a switching hub 2050. Each of the cluster systems include a plurality of access control points and access control appliances, each communicating with a dedicated gateway or access point in the manner shown in FIG. 69. Each of the access points 464 then communicates with the switching hub 2050, which is connected to a hub 2052. The hub 2052 distributes the access control data signal between the various appliances and the security sever and monitors on the LAN and/or to a WAN via the firewall, as previously described. Any workstation on the LAN can be used as a monitor and control center, whereby any authorized personnel can control access at his local workstation.

The individual cameras, when enabled, produce a stream of video data typically on the order of 1 to 3 M bits/sec. As a result, if several of the cameras are simultaneously enabled, the aggregate data payload on the system may exceed the capacity of a single LAN, such as the popular 10Base-T. To prevent this, the system of FIG. 72 is 'stacked' in a hierarchy of increasing bandwidth. For example, any given camera Cn routes through a wireless Access Point 464, which has capacity to support several cameras in it's domain, simultaneously enabled. The individual Access Points 464 thereupon connect to a switched hub 2050, which selectively routes data to subsequent networks. In this way, the possibility that any group of cameras might exceed the capacity of the network is effectively precluded.

Another way of maximizing the use of cameras, but controlling the amount of streaming data is to place the cameras on stand-by. Cameras that are on the network can be activated by several techniques such as: (1) a heartbeat, (2) a local, a triggering event, or (3) in case of an event from another sensor. Examples of other sensors are:

a wall Pull Handle 454.

a worn wireless "Panic" transmitter, such as on a teacher or bank personnel.

an acoustic event detector 448.

fire or smoke detector.

a remote motion detector.

remote contacts 444.

events from an associated conventional alarm system 442.

Cameras in certain areas create privacy issues. Areas such as locker rooms, dressing rooms, and classrooms may want to be strictly squelched unless an emergency event were triggered. However, a running record can be retained in the camera, but constantly overwritten. The record can be "Protected" with encryption and passwords, so it would require special access to get to the data. For example, an MPEG-2 data stream can be continuously written in an "endless loop" fashion on a hard drive. The record can be recorded past a triggering event, then stopped. If, for illustration, a hard drive capable of recording 120 minutes IP motion video is used, the drive can continue to record video for 60 minutes after a triggering event then stop. After an event, either the drive can be physically removed and read, such as under a court order, or read over the network with proper passwords.

Adaptation of Analog CCTV Cameras to the System of the Subject Invention

Figure 73:
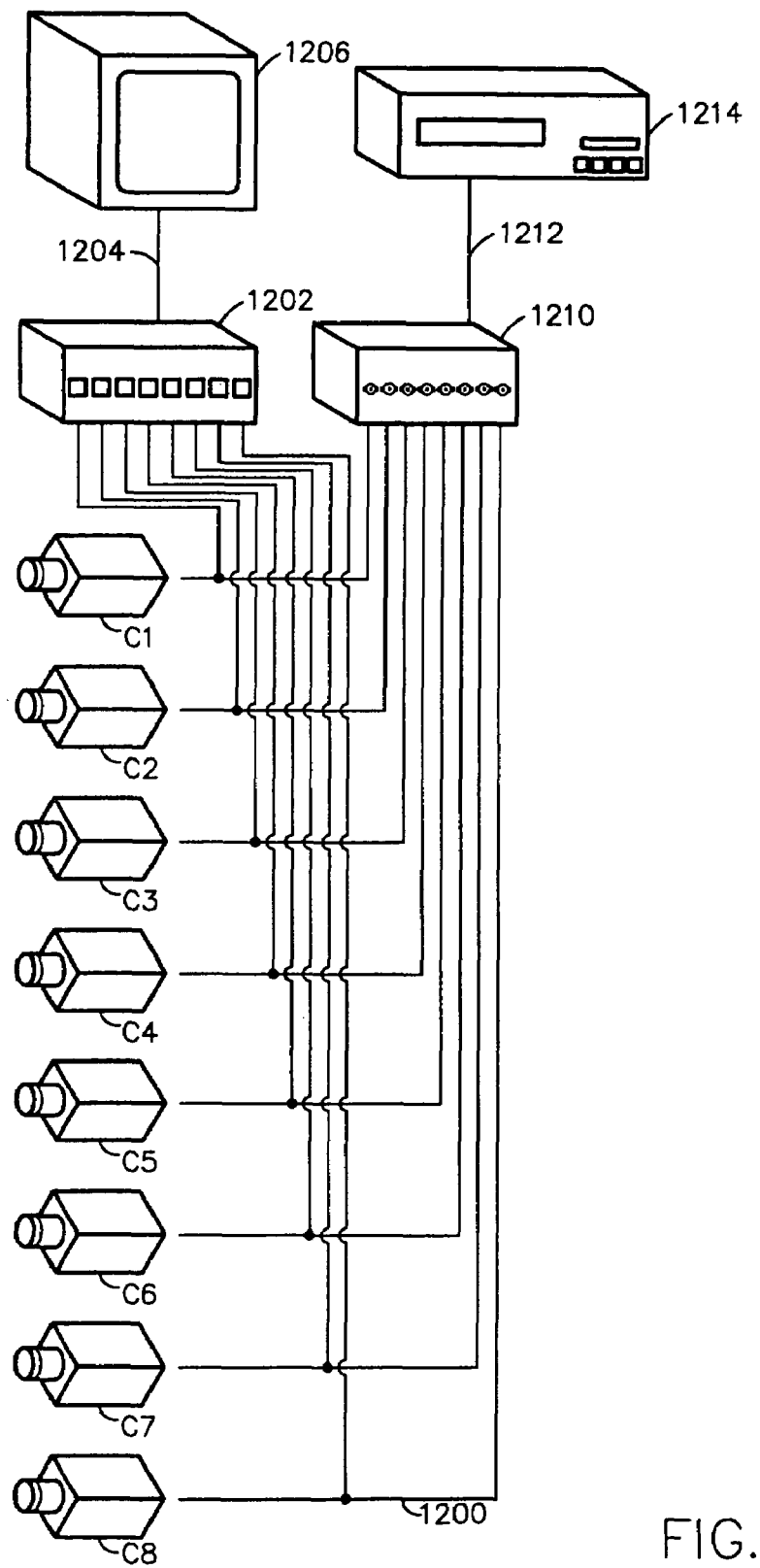
FIGS. 73, 74 and 75 illustrate various means and methods for incorporating analog CCTV cameras into the digital multi-media surveillance system of the subject invention.

FIG. 73 illustrates a means and methods for incorporating analog CCTV cameras into the digital multi-media surveillance system of the subject invention. A standard CCTV system includes a plurality of analog video cameras C1–C8. In a typical installation, each camera will be connected to a monitor switching system 1202. This permits the monitor 1206 to receive the video feed from any one or more of the cameras via feed 1204. The monitor may display full screen or split screen video in live format, either by manual or programmed selection. The system also typically includes a video multiplexer 1210 for producing a combined feed 1212 for storing the video in recorded format on a VCR tape at VCR 1214. In some applications it is also possible to play the tape back through the monitor 1206.

Figure 73A:
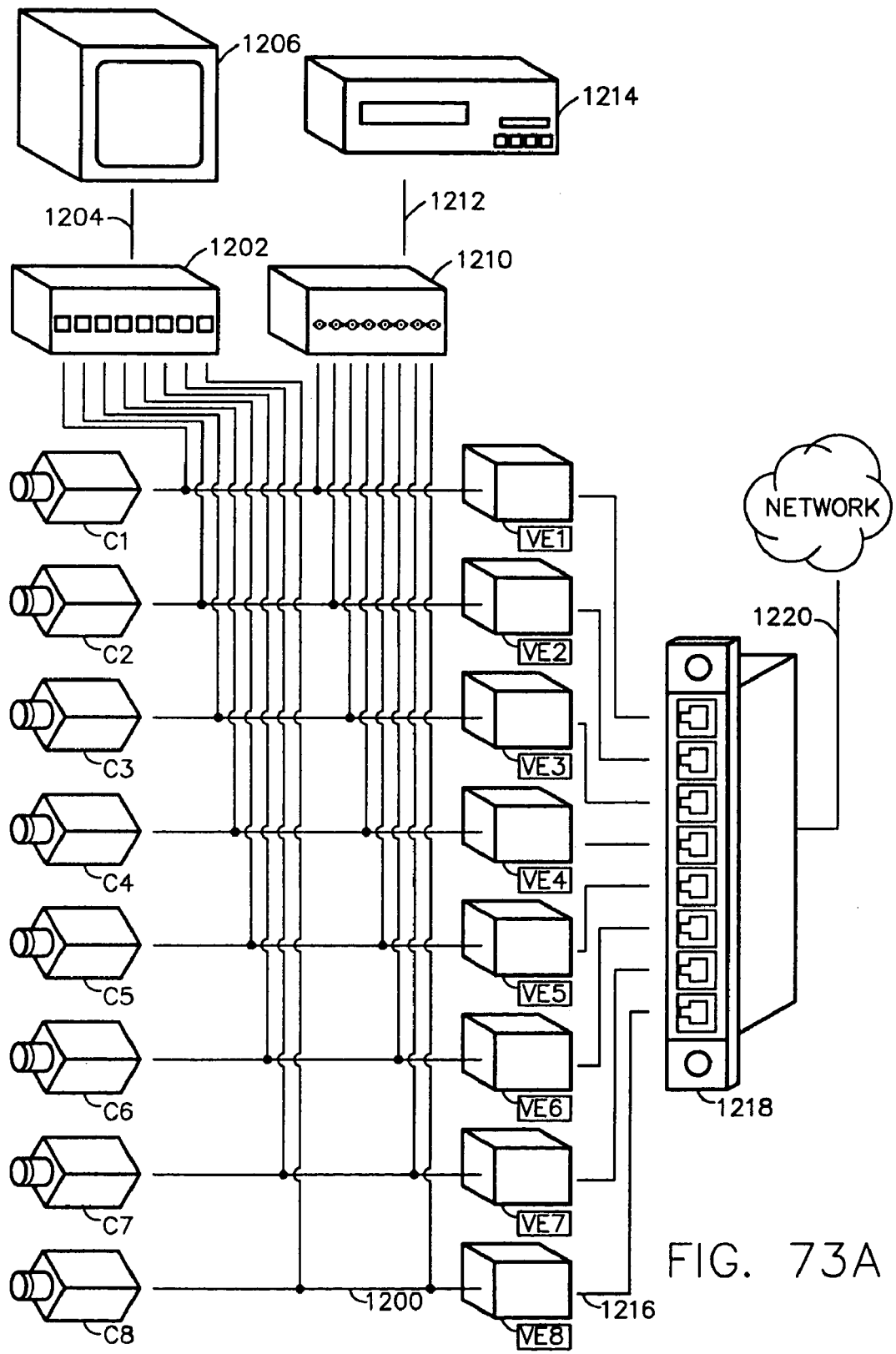

FIG. 73A depicts an enhancement to this system. Each camera feed 1200 is additionally sent to a video encoder, VE1 through VE8. These encoders digitize and compress the respective camera's video. The individual digitized and compressed video streams are then passed via feeds 1216 to a switching hub 1218, thence via line 1220 to the network. This permits the analog signal produced by each camera to be digitized for introduction into and management by the network-supported system of the subject invention. While permitting much broader use of the video signals, this configuration permits substantial cost reduction over the installation of all new digital cameras.

Figure 74:
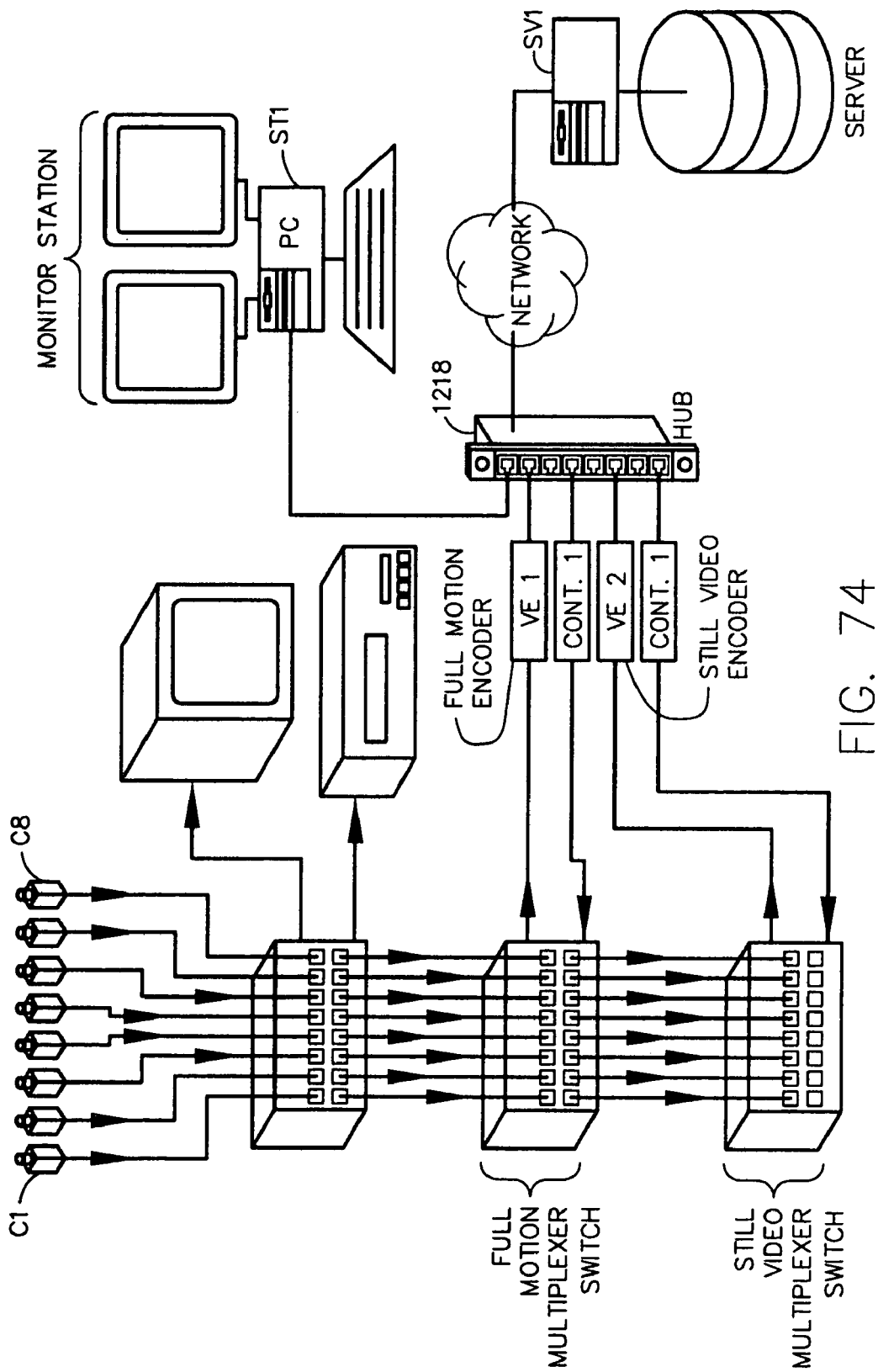

In the alternative embodiment shown in FIG. 74, the plurality of cameras C1–C8 are shown connected to two additional multiplexers M1 and M2, which are connected to two video encoders VE1 and VE2, respectively, and two controllers CONT1 and CONT2, respectively. The network hub 1218 connects the feed from the two controllers to a monitoring station ST1 and a remote server SV1 via the network. Control messages generated by the monitoring station are sent to the additional multiplexers via the hub and the controllers CONT1 and/or CONT2. These control messages select which of the cameras C1–C8 are to be routed to the video encoders VE1 and/or VE2. The encoders VE1 and VE2, in turn, digitize and compress the analog composite video, and generate a digital compressed video stream which may be transported to the monitoring station and remote server. The system is operable to digitize and compress motion video via encoder VE1, which digitizing and encoding higher-resolution still-frame video via encoder VE2, for example. Thus, it is possible to share the video from any camera across the local network, or indeed across a wide-area network if desired. It is further possible to archive captured video streams on an image server for later retrieval and analysis.

Figure 75:
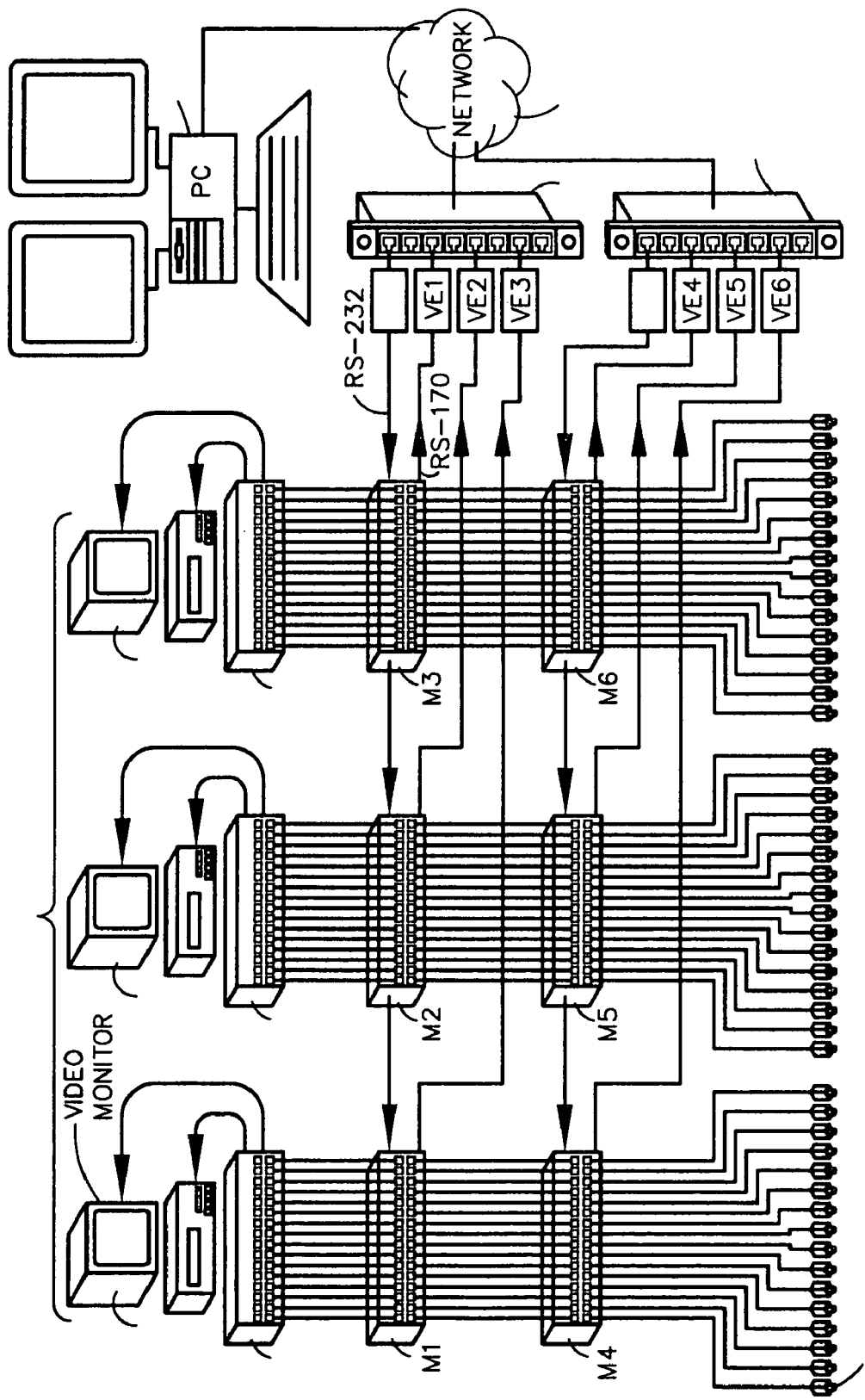
Figure 76:
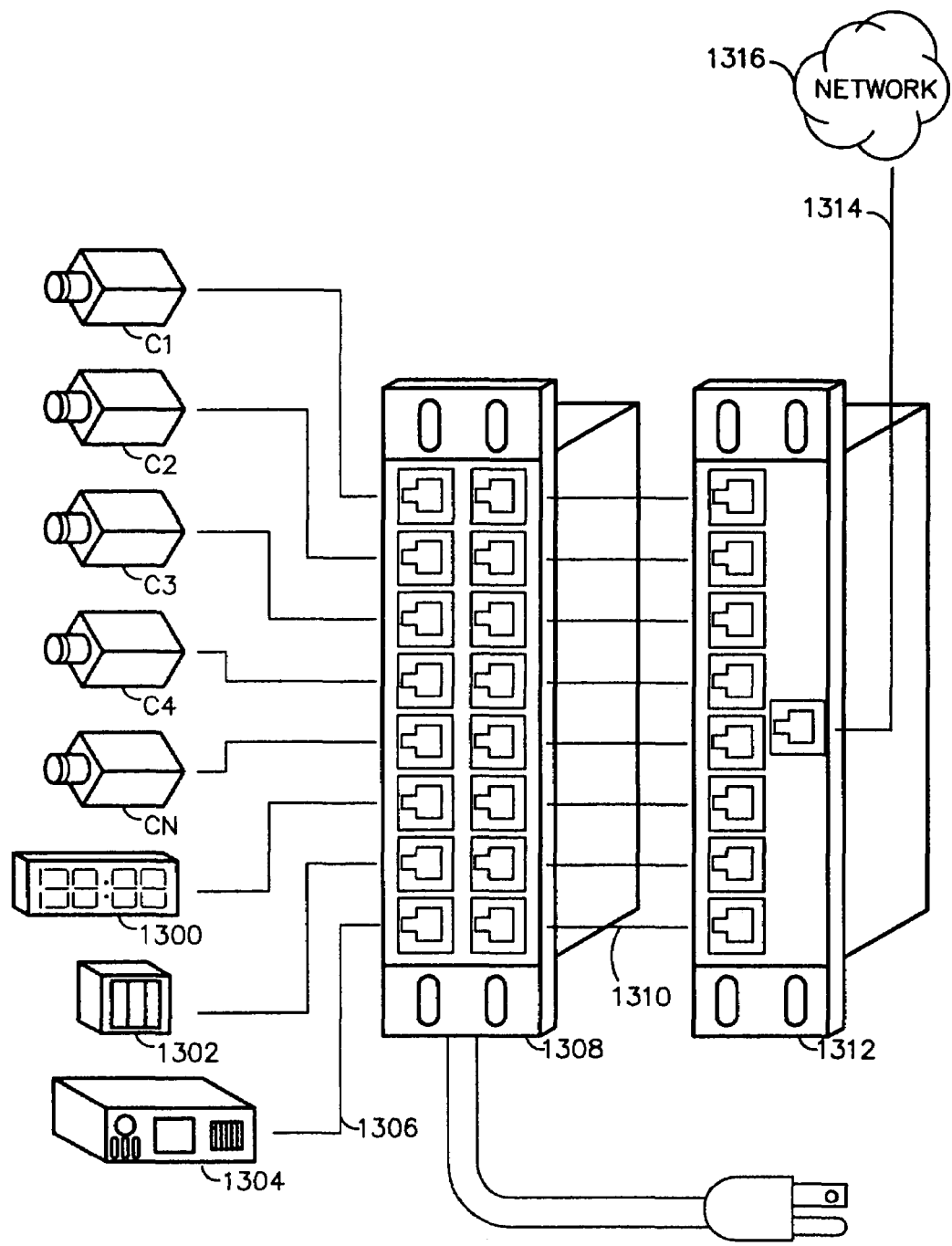
FIGS. 76 and 77 illustrate an enterprise management system for connecting, providing power to and managing a plurality of system appliances.
Figure 77:
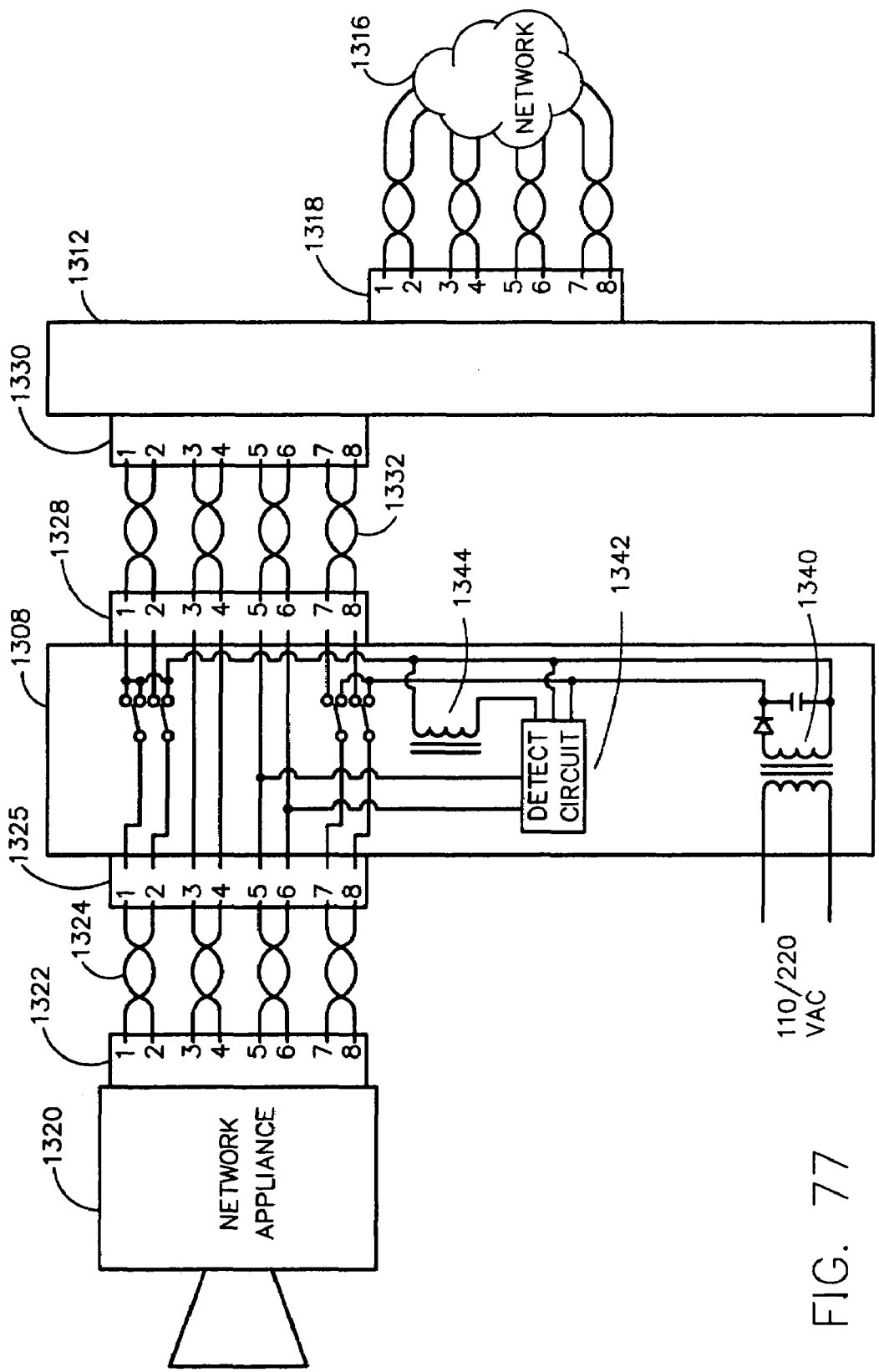

FIG. 75 depicts this concept on a broader scale. As there shown, the pre-existing monitoring station ST1 comprises three multiplexers of sixteen inputs each, and three respective monitors for viewing the multiplexer outputs. Following the previously described method in connection with FIG. 74, three additional multiplexers M1, M2 and M3 are added which accept the analog video from the plurality of cameras C1–C8. The encoders VE1, VE2 and VE3 are disposed to capture the multiplexer outputs and digitize and compress the video for streaming over the network as compressed motion video. Three additional multiplexers M4, M5, M6 and respective encoders VE4, VE5, and VE6 similarly capture, digitize and compress higher-resolution still-frame images for transmission across the local or wide-area network. As before, the images may be archived on a server for later retrieval and analysis.

It is also possible to place a single video encoder off line 1204 or off line 1210 to further reduce the cost of providing a digitized signal. However, this arrangement may reduce the overall flexibility of use of the camera video signals.

Use of Enterprise Management and Power Unit

An enterprise management system for connecting, providing power to and managing a plurality of system appliances is shown in FIGS. 74(76?) and 75(77?). Cameras, sensors and other devices to be connected to the network are often installed in inconvenient locations such as in ceilings, high on wall, in hard to reach places and the like. In such instances it may be difficult to provide the required AC power to these devices. The refinement to the system as depicted in FIGS. 74(76?) and 75(77?) ameliorates this problem. As shown in FIG. 74(76?), all of the wiring 1306 leading to the installed appliances C1–Cn and 1300, 1301 and 1302 are connected to one side of a connector or patch panel 1308. The ports on the opposite side of the panel 1308 are connected to respective ports on a destination hub or switching hub 1312 via wires 1310. The switching hub is then connected to a network 1316 via wires 1314. The patch panel 1308 includes an AC-operated power supply of sufficient capacity to power the attached network appliances C1–Cn, 1300, 1301 and 1302.

As specifically shown in FIG. 74(76?), the system includes a plurality of cameras C1–Cn and appliances 1300, 1301 and 1302. Each camera is connected to the enterprise control or patch panel 1308 via a CAT-5 wire 1306. The CAT-5 wire carries the compressed digital image and video signals, digital commands and other digital sensor data to and from the respective camera and sensor appliances. In the preferred embodiment the CAT-5 wire is a four pair cable. At least one pair is designated for carrying power to the camera and other powered appliances. In the illustrated example and additional pair is designated for power out, a third pair 10BaseT data in and the final pair for 10Base T data out. The appliance 1300 is a multifunction clock appliance. A motion detector 1302 is also included. A control appliance 1302 may also be incorporated for local control of certain functions such as access control via pass card, door strike controls and the like.

The patch panel or enterprise appliance management and power unit 1306 supplies power to the various cameras and sensor appliances and provides the pass through connection to the switching hub 1312 or gateway such as an Ethernet hub, router or switch, to the network 1316.

FIG. 75(77?) depicts the scheme used to supply power to the attached appliances. An AC-operated power supply 1340 generates an appropriate DC voltage, usually 24 or 28 volts DC. A detector circuit 1342 is attached to a selected one of the pairs in cable 1324. When the detector circuits determines that a suitable device is connected, such as camera 1320 via connector 1322, the detector operates a relay 1344 which then feeds the required DC power to the remote device via connector 1326. In this embodiment the camera 1320 includes an RJ-45 interface to the network for power and data transmission and reception. The connector strip 1322 represents an RJ-45 plug. The CAT-5 wiring 1324 carries the compressed digital images, digital video, commands and other sensor data to a mated RJ-45 connector 1325 on the enterprise panel 1308. The data signals are patched through to another RJ-45 connector 1328 for transmitting the data signals on a CAT-5 cable 1332 to a mated RJ-45 connector 1330 on the hub 1312. The hub includes an RJ-45 connector 1318 for connecting the system to the network 1318.

The invention provides a comprehensive surveillance scheme permitting both local and remote monitoring and management. While certain features and embodiments of the invention have been described in detail herein, it will be readily understood that the invention encompasses all modification and enhancements with the scope and spirit of the following claims.

What is claimed is:

1. A comprehensive, IP network compatible, multimedia surveillance and security system comprising a plurality of sensor appliances adapted to connected to a network based server for monitoring, logging, and transmitting data to the server in order to permit comprehensive surveillance of a predetermined area, the system comprising:
   a. a conventional security sensor which is activated by the occurrence of an activating event and upon activation generates a signal;
   b. a convertor for converting the conventional sensor signal into a network compatible signal and adapted for sending the converted signal via the network to the server;
   c. a surveillance sensor appliance controlled by the server for monitoring an area and generating a signal indicating a condition in the monitored area in a programmed response mode controlled by the server, whereby the server receives and logs data transmitted by both the conventional sensor and the sensor appliance.

2. The system of claim 1, the sensor appliance comprising:
   a. a monitoring device for monitoring an area;
   b. an activation mechanism for activating the sensor appliance to generate a monitoring signal;
   c. a transmitter for ending the monitoring signal to the server.

3. The system of claim 2, the sensor appliance further comprising:
   a. an on-board memory for collecting and storing monitoring signal data as it is generated;
   b. a transmission control device for selectively transmitting the collected and stored transmission data to the server.

4. The system of claim 3, the transmission control device adapted for responding to a send signal generated by the server.

5. The system of claim 3, the transmission control device adapted for responding to a preselected event within the zone monitored by the sensor appliance.

6. The system of claim 3, the transmission control device adapted for transmitting data to the server upon the occurrence of an event.

7. The system of claim 6, the transmission control device adapted for transmitting both pre-event and post-event data upon the occurrence of an event.

8. The system of claim 1, the sensor appliance comprising an imaging sensor for collecting and generating an image signal.

9. The system of claim 8, the sensor appliance adapted for generating full motion video images.

10. The system of claim 8, the sensor appliance adapted for generating still frame images.

11. The system of claim 8, the sensor appliance adapted for generating both full motion video and still frame images.

12. The system of claim 1, the sensor appliance comprising an audio sensor for collecting and generating an audio signal in the zone of operation of the sensor appliance.

13. The system of claim 1, the sensor appliance comprising an environmental condition sensor for collecting and generating and environmental condition signal in the zone of operation of the sensor appliance.

14. The system of claim 13, the sensor appliance comprising a heat sensor.

15. The system of claim 13, the sensor appliance comprising a smoke detector.

16. The system of claim 13, the sensor appliance comprising a fire detector.

17. The system of claim 13, the sensor appliance comprising a chemical detector.

18. A comprehensive, IP network compatible, multimedia surveillance and security system comprising a plurality of sensor appliances adapted to connected to a network based server for monitoring, logging, and transmitting data to the server in order to permit comprehensive surveillance of a predetermined area, the system comprising:
   a. a multi-function image sensor appliance adapted for generating an image signal representing the visual condition of a monitored zone of operation, the image signal comprising both still frame image data and motion video image data;
   b. a transmitter for sending image data to the server.

19. The system of claim 18, wherein the multi-function image sensor appliance is responsive to an event in order to begin transmitting image data to the server.

20. The system of claim 18, wherein the multi-function image sensor appliance is responsive to a signal generated by the server in order to begin transmitting image data to the server.

21. The system of claim 18, wherein the multifunction image sensor appliance is responsive to a signal generating and transmission activation signal for transmitting both pre-event and post-event data to the server.

22. The system of claim 18, the server is adapted for mining the image data stored in the sensor memory.

23. The system of claim 18, wherein the sensor appliance further includes a receiver for receiving control signals from the server for activating the sensor, initiating and terminating transmission of data to the server and for managing control functions.

24. The system of claim 1, wherein said sensor appliance includes a wireless transmitter and said server includes a wireless receiver, whereby data transmission is over a wireless system.

25. A comprehensive, IP network compatible, multimedia surveillance and security system comprising a plurality of sensor appliances adapted to connected to a network based server for monitoring, logging, and transmitting data to the server in order to permit comprehensive surveillance of a predetermined area, the system comprising:
  a. a plurality surveillance sensor appliances controlled by the server for monitoring an area and generating a data signal indicating a condition in the monitored area controlled by the server, whereby the server receives and logs signal data;
  b. each sensor appliance adapted for transmitting the generated signal;
  c. a network for communicating the plurality of sensor appliances with a central server;
  d. the central server adapted for collecting and managing the data transmitted by the plurality of sensor appliances.

26. The system of claim 25, wherein the data from each of the various sensor appliances is transmitted to the server as it is created, wherein there is further included a monitor associated with the server for displaying the data, the server adapted for showing image data in a step video format.

27. The system of claim 25, wherein a plurality of the plurality of sensor appliances are image data generators and wherein the sensor is adapted for managing the simultaneous receipt of data from a plurality of sensors.

28. The system of claim 25, wherein the data generated by each of the sensor appliances is stored in memory at each appliance and is transmitted to the server upon occurrence of an event within the zone of operation of each sensor.

29. The system of claim 28, wherein the event is created by the server.

30. The system of claim 28, wherein the event is an action occurring at the location of the sensor appliance.

31. The system of claim 28, wherein each sensor is adapted for transmitting both pre-event and post-event data.

32. The system of claim 25, the system further including a dispatch generator whereby the occurrence of a specified event generates a dispatch signal to a predetermined response team.

33. The system of claim 25, wherein the sensor appliance includes a location identifier component in the data signal.

34. The system of claim 33, wherein the system further includes a dispatch generator, whereby the occurrence of a specified event generates a dispatch signal to a predetermined response team based on location of the response team.

* * * * *

(12) INTER PARTES REVIEW CERTIFICATE (68th)
United States Patent                           (10) Number:        US 6,970,183 K1
Monroe                                          (45) Certificate Issued:   Mar. 24, 2015

(54) MULTIMEDIA SURVEILLANCE AND MONITORING SYSTEM INCLUDING NETWORK CONFIGURATION

(75) Inventor:  David A. Monroe

(73) Assignee:  e-Watch, Inc.

Trial Number:
  IPR2013-00255 filed Apr. 26, 2013

Petitioner:  Mobotix Corp.

Patent Owner:  e-Watch, Inc.

Inter Partes Review Certificate for:
  Patent No.:  6,970,183
  Issued:      Nov. 29, 2005
  Appl. No.:   09/594,041
  Filed:       Jun. 14, 2000

The results of IPR2013-00255 are reflected in this inter partes review certificate under 35 U.S.C. 318(b).

INTER PARTES REVIEW CERTIFICATE
U.S. Patent 6,970,183 K1
Trial No. IPR2013-00255
Certificate Issued Mar. 24, 2015

AS A RESULT OF THE INTER PARTES REVIEW PROCEEDING, IT HAS BEEN DETERMINED THAT:

Claims 1-25 and 32-34 are cancelled.

* * * * *